United States Patent
Schupbach et al.

(10) Patent No.: US 12,446,495 B2
(45) Date of Patent: Oct. 21, 2025

(54) INJECTION SYSTEMS, INJECTION TOOLS AND METHODS FOR SAME

(71) Applicant: Invaio Sciences International GmbH, Basel (CH)

(72) Inventors: Lukas Rudolf Schupbach, Basel (CH); Urs Widmer, Dornach (CH); Michael Christian Oehl, Reinach (CH); Antony Mathai Chettoor, Apex, NC (US)

(73) Assignee: Invaio Sciences International GmbH, Basel (CH)

( * ) Notice: Subject to any disclaimer, the term of this patent is extended or adjusted under 35 U.S.C. 154(b) by 0 days.

(21) Appl. No.: 18/504,139

(22) Filed: Nov. 7, 2023

(65) Prior Publication Data

US 2024/0260513 A1 Aug. 8, 2024

Related U.S. Application Data

(63) Continuation of application No. 17/263,101, filed as application No. PCT/EP2019/070119 on Jul. 25, 2019, now Pat. No. 11,844,318.

(30) Foreign Application Priority Data

Jul. 25, 2018 (CH) .................................... 00917/18
Apr. 17, 2019 (CH) .................................... 00526/19

(51) Int. Cl.
 *A01G 7/06* (2006.01)
(52) U.S. Cl.
 CPC .................................... *A01G 7/06* (2013.01)
(58) Field of Classification Search
 CPC .......... A01G 7/06; A01G 23/12; A01G 23/14; A01G 23/09; B65D 5/74;

(Continued)

(56) References Cited

U.S. PATENT DOCUMENTS

| 523,977 | A | | 8/1894 | Donaldson |
| 2,687,598 | A | * | 8/1954 | Calhoun ............. A01M 21/043 |
| | | | | 111/7.3 |

(Continued)

FOREIGN PATENT DOCUMENTS

| CL | 200601468 | 11/2006 |
| CL | 201700510 | 12/2017 |

(Continued)

OTHER PUBLICATIONS

Chinese Search Report and Opinion received for Chinese Patent Application No. 201980061741.1 issued on Feb. 11, 2022, 3 pages.
(Continued)

*Primary Examiner* — Zoe Tam Tran
(74) *Attorney, Agent, or Firm* — Harness, Dickey & Pierce, P.L.C.

(57) ABSTRACT

A plant injection system includes an injection tool configured to penetrate a plant and distribute a liquid formulation to the plant. The injection tool includes a base having an inlet port and a penetrating distribution body extending along a longitudinal body axis. The penetrating distribution body includes a penetrating element and one or more distribution ports in communication with the inlet port. The one or more distribution ports are spaced from the penetrating element. The injection tool includes penetrating and distribution configurations. In the penetrating configuration the penetrating element is configured to penetrate the plant along the longitudinal body axis. In the distribution configuration the one or more distribution ports are configured to distribute the liquid formulation to the plant transversely relative to one or more penetrating directions, at least one of the penetrating directions corresponding to the longitudinal body axis.

15 Claims, 14 Drawing Sheets

(58) Field of Classification Search
CPC .... B65D 2251/0056; B65D 2251/0015; B65D 5/748; B65D 2251/0093; B65D 2251/0096; B65D 5/746; B65D 5/749; B65D 75/5883; B65D 77/28; B65D 2231/02; B65D 2251/0025; B65D 2547/066; B65D 47/10; A61J 1/201; A61J 1/1418; A61J 1/1406; A61J 1/10; A61J 1/2096; A61J 15/00; A61J 15/0026; B67B 7/26; B67B 7/28; B67B 7/24
USPC .......................................................... 47/57.5
See application file for complete search history.

(56) References Cited

U.S. PATENT DOCUMENTS

| | | | |
|---|---|---|---|
| 2,927,401 | A | 3/1960 | Winfred |
| 3,295,254 | A | 1/1967 | Schoonman |
| 3,461,588 | A | 8/1969 | Johnson |
| 3,992,813 | A | 11/1976 | Freshsel |
| 4,848,028 | A | 7/1989 | Johnson et al. |
| 5,046,281 | A | 9/1991 | Murphy |
| 5,239,773 | A | 8/1993 | Doolittle, Jr. |
| 5,355,620 | A | 10/1994 | Newbanks |
| 5,956,894 | A | 9/1999 | Eldridge |
| 7,462,695 | B2 | 12/2008 | Dunse et al. |
| 8,671,614 | B1 * | 3/2014 | Doolittle ............. A01G 7/06 47/57.5 |
| 8,677,684 | B1 | 3/2014 | Doolittle |
| 9,775,697 | B2 | 10/2017 | Buckley et al. |
| 11,297,776 | B2 | 4/2022 | Nunez Hughes et al. |
| 11,844,318 | B2 | 12/2023 | Schupbach et al. |
| 2002/0169426 | A1 | 11/2002 | Takagi |
| 2004/0255512 | A1 | 12/2004 | Burgess |
| 2005/0166450 | A1 | 8/2005 | Wild et al. |
| 2005/0224137 | A1 | 10/2005 | Tribble et al. |
| 2006/0200095 | A1 | 9/2006 | Steube |
| 2007/0266628 | A1 | 11/2007 | Doolittle |
| 2009/0260283 | A1 | 10/2009 | Blake |
| 2010/0312261 | A1 * | 12/2010 | Suzuki ............... A61J 15/0023 606/153 |
| 2011/0252511 | A1 | 10/2011 | Van den Berghen |
| 2014/0345194 | A1 | 11/2014 | Vue et al. |
| 2015/0296801 | A1 | 10/2015 | Brahm et al. |
| 2015/0351327 | A1 | 12/2015 | Davis, Jr. |
| 2016/0081308 | A1 | 3/2016 | Cary et al. |
| 2016/0360709 | A1 | 12/2016 | Shang et al. |
| 2020/0015429 | A1 | 1/2020 | Fabry |
| 2021/0337739 | A1 | 11/2021 | Schupbach et al. |
| 2022/0201940 | A1 | 6/2022 | Schupbach et al. |
| 2023/0084693 | A1 | 3/2023 | Widmer et al. |

FOREIGN PATENT DOCUMENTS

| | | | |
|---|---|---|---|
| CN | 2572757 | Y | 9/2003 |
| CN | 201444781 | U | 5/2010 |
| CN | 202713995 | U | 2/2013 |
| CN | 202958264 | U | 6/2013 |
| CN | 104221784 | A | 12/2014 |
| CN | 105009969 | A | 11/2015 |
| CN | 105325106 | A | 2/2016 |
| CN | 105613073 | A | 6/2016 |
| CN | 205727231 | U | 11/2016 |
| EP | 111254 | A1 | 6/1984 |
| EP | 187124 | A1 | 7/1986 |
| EP | 1205103 | A1 | 5/2002 |
| ES | 2 101 207 | T3 | 7/1997 |
| FR | 2509123 | A1 | 1/1983 |
| JP | S4847774 | U | 6/1973 |
| JP | H06169643 | A | 6/1994 |
| JP | H1156137 | A | 3/1999 |
| JP | 2000041486 | A | 2/2000 |
| JP | 2017131249 | A | 8/2017 |
| WO | WO96/38033 | | 12/1996 |
| WO | WO-9638033 | A1 * | 12/1996 ............... A01G 7/06 |
| WO | WO-2009124707 | A1 | 10/2009 |
| WO | WO-2009126473 | A1 | 10/2009 |
| WO | WO-2012114197 | A1 | 8/2012 |
| WO | WO-2013010909 | A1 | 1/2013 |
| WO | WO-2013149993 | A1 | 10/2013 |
| WO | WO-2015110535 | A1 | 7/2015 |
| WO | WO-2015112027 | A1 | 7/2015 |
| WO | WO-2016034756 | A1 | 3/2016 |
| WO | WO2017/072608 | | 5/2017 |
| WO | WO-2020021041 | A1 | 1/2020 |
| WO | WO-2020212612 | A1 | 10/2020 |
| WO | WO-2021152093 | A1 | 8/2021 |
| WO | WO-2022023436 | A1 | 2/2022 |
| WO | WO-2022165248 | A1 | 8/2022 |
| WO | WO-2022189386 | A1 | 9/2022 |
| WO | WO-2022221535 | A1 | 10/2022 |
| WO | WO-2022264053 | A1 | 12/2022 |
| WO | WO-2023137383 | A1 | 7/2023 |

OTHER PUBLICATIONS

Girelli et al., (2019). "1 H-NMR Metabolite Fingerprinting Analysis Reveals a Disease Biomarker and a Field Treatment Response in Xylella fastidiosa subsp. pauca-Infected Olive Trees," Plants, 8(5):115, 17 pages.

International Search Report and Written Opinion received for International Patent Application No. PCT/EP2019/070119 mailed on Oct. 18, 2019, 18 pages.

International Search Report and Written Opinion received for International Patent Application No. PCT/EP2020/060928 mailed on Jun. 30, 2020, 9 pages.

International Search Report and Written Opinion received for International Patent Application No. PCT/EP2021/052111 mailed on Jun. 25, 2021, 18 pages.

Scortichini et al., (2018). "A zinc, copper and citric acid biocomplex shows promise for control of Xylella fastidiosa subsp. pauca in olive trees in Apulia region (southern Italy)," Phytopathologia Mediterranea, 57(1):48-72.

Switzerland Search Report mailed on Jan. 21, 2020, for Swiss Patent Application No. CH000526/2019 filed on Oct. 25, 2019, 8 pages. English translation.

Switzerland Search Report mailed on Nov. 26, 2018, for Swiss Patent Application No. CH000917/2018 filed on Jul. 25, 2018, 8 pages. English translation.

U.S. Appl. No. 18/007,673, internationally filed on Jun. 2, 2021, titled "Tip Setters and Tip Adapters for Installing Injection Tools to Plant Parts," (Copy not submitted herewith pursuant to the waiver of 37 C.F.R. § 1.98(a)(2)(iii)).

U.S. Appl. No. 18/172,850, filed Jun. 2, 2021, titled "Mobile Applications for Controlling Xylella Fastidiosa in Olive Trees," (Copy not submitted herewith pursuant to the waiver of 37 C.F.R. § 1.98(a)(2)(iii)).

Youtube, (2021). "Protect your palms with Syngenta micro tree-injection. Watch the video to find out how," available online at <https://www.youtube.com/watch?v=UwYiblhq7m8>, 1 page.

* cited by examiner

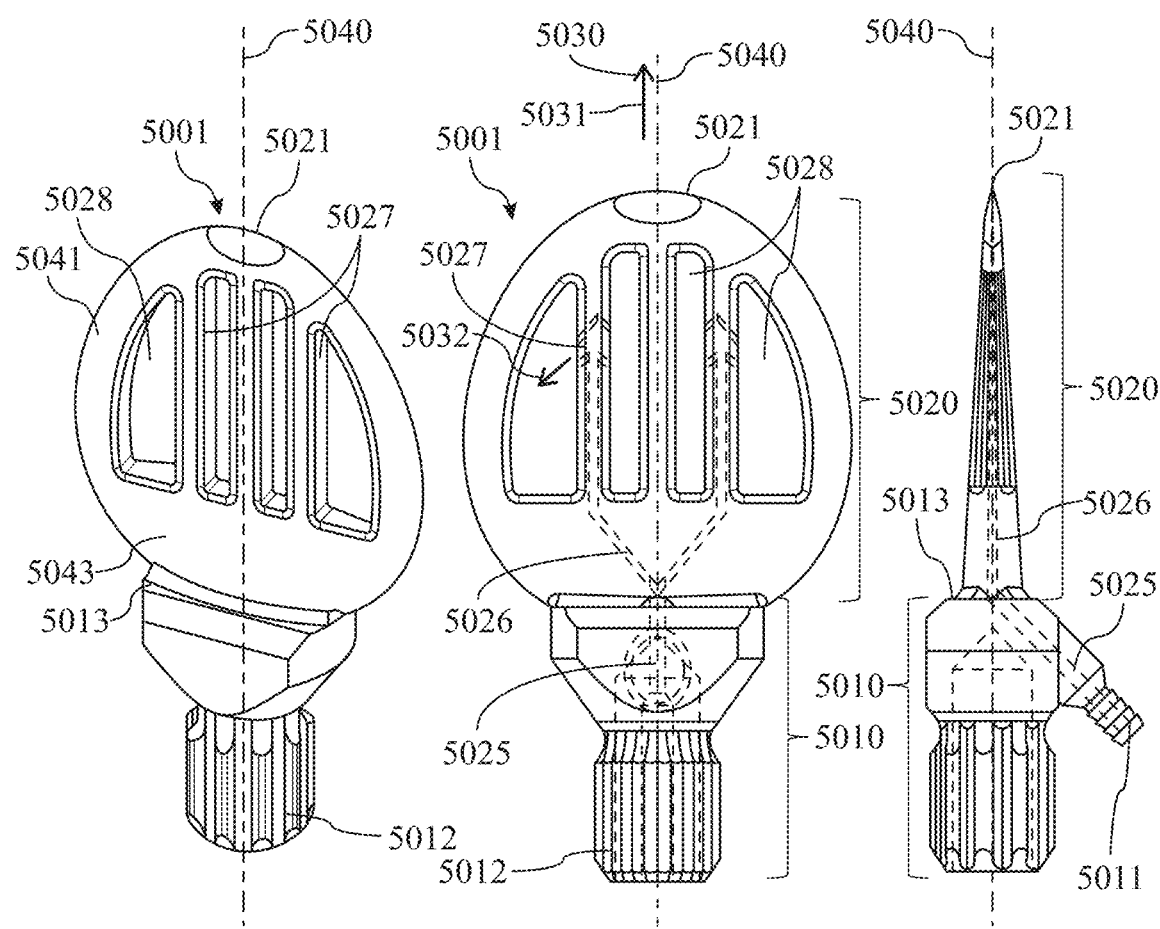

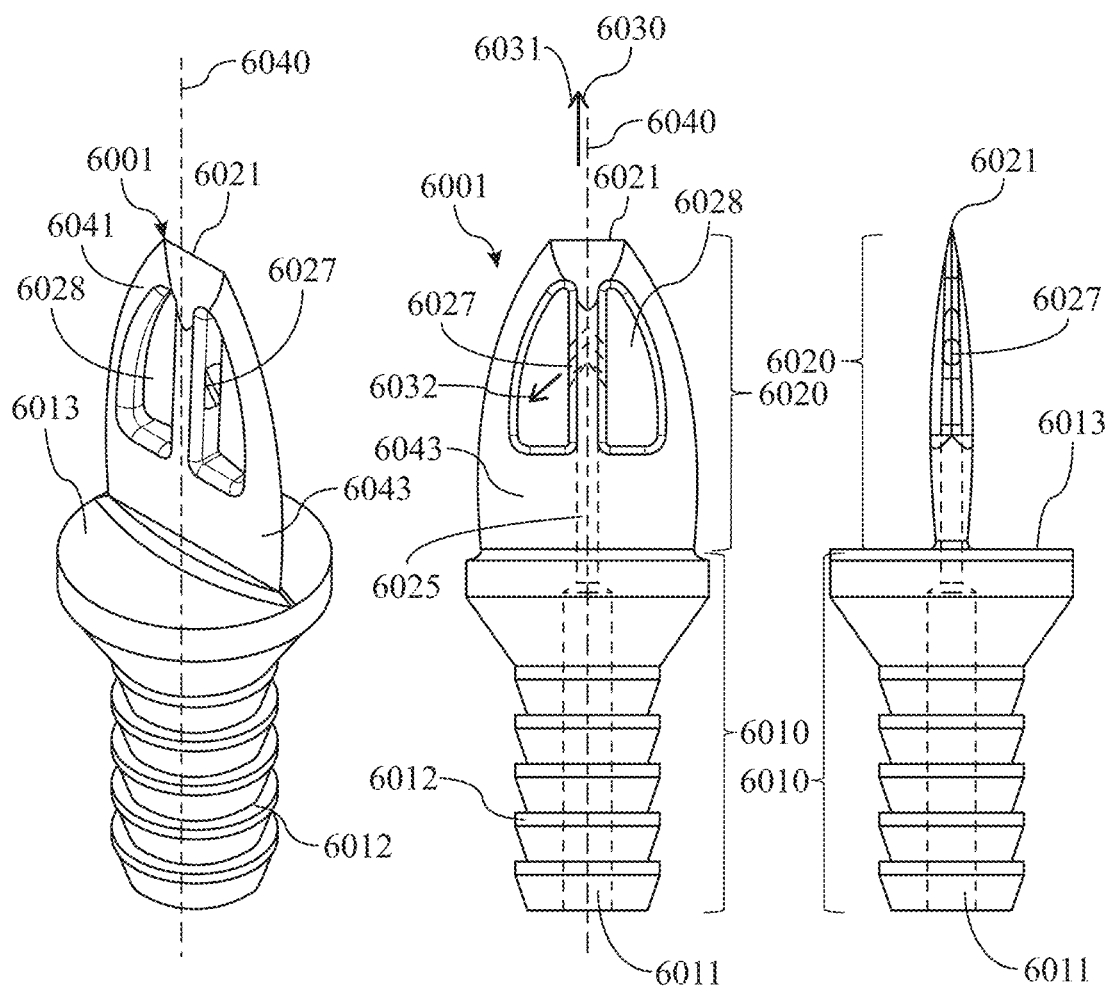

INJECTION SYSTEMS, INJECTION TOOLS AND METHODS FOR SAME

CROSS-REFERENCE TO RELATED APPLICATIONS

This application is a continuation of U.S. patent application Ser. No. 17/263,101, which adopts the international filing date of Jul. 25, 2019, which is a National Phase application under 35 U.S.C. § 371 of International Application No. PCT/EP2019/070119, filed Jul. 25, 2019, which claims priority benefit to CH Application No. 00917/18, filed Jul. 25, 2018 and CH Application No. 00526/19, filed Apr. 17, 2019.

TECHNICAL FIELD

Penetration of plants and administration of formulations to plants at the penetration.

BACKGROUND

Liquid active ingredient formulations, for example insecticides, fungicides, nutrients or growth promoters are in various examples injected into a plant, such as the cambium of a tree trunk. The liquid formulations are administered to maintain or improve the health of the tree. This procedure is practiced in other examples on other (partially ligneous) plants, such as grape vines.

Documents WO 2012/114197 A1 and WO 2015/110535 A1, for example, describe methods and corresponding systems for injecting active ingredient formulations into trees. In these systems, a hole is drilled into the sapwood as far as the cambium of the tree, and the outer end of this hole is closed with a peg. An injection needle is inserted through the peg into the inner part of the hole. A dosed quantity of the active ingredient formulation is administered through the injection needle by a dosing device. The active ingredient formulation is gradually taken up by the cambium. In one configuration, a peg having an axial channel and lateral outlet openings is provided in the hole. The active ingredient formulation is delivered through the axial channel and passes through the lateral outlet openings into the cambium. In another configuration, a needleless dosing device is used with a peg having an integrated non-return valve. In each of the configurations, the peg is removable or remains in place in the tree trunk, for example for further treatments.

Overview

The present inventors have determined that a problem to be solved includes minimizing the system profile (size or shape) for injection tools to minimize damage to a subject plant while at the same time minimizing labor for penetration and administering fluid formulations to plants (e.g., formulation including one or more of a liquid, gas, gel, vapor, aerosol or the like). Previous example systems are laborious in the sense that the treated plant parts, in particular tree trunks, are first drilled and pegs are inserted into the drilled out holes. The liquid formulation is delivered through the peg, for instance by way of a syringe type device having a cylinder and plunger for driving the fluid into the tree. Precision filling of the hole with a specified quantity of the active ingredient formulation is difficult. The plant tissue preferentially moves into the hole for the peg or the syringe orifice, for instance along an axis of insertion and delivery of the liquid formulation, and clogs the hole or orifice. Administration of the liquid formulation requires, in some examples, significant pressure by way of a driven plunger to penetrate the grown plant tissue and infiltrate the plant. In some examples, the pressurized liquid formulation damages the plant tissue, thereby frustrating the treatment otherwise delivered with the liquid formulation. In other examples, the plant is drilled again to bore out the previous hole or form a new hole causing additional trauma to the plant.

In still other examples, previous systems including drill bits, pegs or the like are robust and used with correspondingly robust trees that support the weight of the pegs and endure the drilling of the hole and reception of the peg. These systems are difficult to use with plants having smaller profiles including, but not limited to, saplings, younger trees, vines or the like because drilling of holes and supporting the weight of pegs decreases the structural integrity of the plant and may cause bowing, buckling or the like.

The present inventors have developed injection tools, injection systems having the injection tools, and methods that address at least these problems. The example injection tools described herein include a penetrating distribution body configured to penetrate a plant and administer liquid formulations in a manner that distributes the formulations to the plant tissue while at the same time minimizing damage to the plant. The injection tools include a penetrating element that penetrates the plant, for instance, along a longitudinal body axis of the penetrating distribution body. The penetrating distribution body includes a distribution element, such as one or more distribution ports, along the body. The one or more distribution ports open laterally along the penetrating distribution body, in one example, relative to the longitudinal body axis. As the plant moves around the penetrating element, for instance during insertion in a reversed direction along the longitudinal body axis and toward the proximal portion of the body, the one or more distribution ports are recessed from the distal portion and remain open for delivery of the liquid formulation. Additionally, as described previously the plant tissue may move into syringe ports, peg holes or the like provided along the longitudinal body axis. Because the one or more distribution ports administer liquid formulations along a different vector relative to the longitudinal body axis of the penetrating distribution body open the ports remain open and minimal pressure (relative to pressure applied with a driven plunger and cylinder) administers the liquid formulation. For example, the one or more distribution ports open, extend laterally, distribute the liquid formulation or the like in a misaligned orientation (e.g., transverse, along an offset angle, orthogonal, greater than 5 degrees, greater than 10 degrees or more) relative to the longitudinal body axis to thereby minimize clogging from plant tissue.

In other examples, the one or more distribution ports are recessed from an exterior of a body profile of the penetrating distribution body, and accordingly remain clear of plant tissue. For example, the one or more distribution ports are provided along the troughs of anchor elements (e.g., threading, flutes, serrations, cleats, scalloped surfaces or the like), within distribution reservoirs within the body profile of the penetrating distribution body or the like. The one or more distribution ports are within the body profile and with penetration of the plant tissue the ports are not engaged with plant tissue in a manner that promotes clogging. Instead, the one or more distribution ports are recessed from the penetrating element and, at least in some examples, the plant tissue itself. Accordingly, liquid formulations delivered to the injection tool are readily received in the plant and delivered with minimal pressure or effort. Further, in examples including reservoirs as described herein the proximate walls, surfaces or the like of the injection tool in combination with the surrounding plant tissue provide cavities within the plant, and the liquid formulations reside in these cavities for gradual uptake by the plant.

The injection tools, injection systems having the injection tools, and methods described herein facilitate the continuous application of liquid formulations including active ingredients to a large variety of plants, including, but not limited to, perennial plants with any kind of trunk or stem size. The use of chemical agents as active ingredients for pests and diseases is a controversial topic. Today pesticides are often applied either by foliar application (sprays) and/or treatment of propagation material (e.g., seed care). A high amount of the employed chemicals is thereby not reaching the target plant or pest but is release into the environmental where it may effect beneficial organism (e.g., bees) and or causes environmental pollution (e.g., ground water). It is therefore one problem of the present disclosure to minimize the untargeted release of active ingredients. Especially when it comes to the treatment of trees and other plantation plants like banana the foliar application of especially conventional pesticides is a substantial environmental issue. In some embodiments, the present disclosure describes environmentally acceptable compositions and methods that provide solutions of the aforementioned problem and to reduce the dosage rates of the active ingredient in order to reduce or avoid unfavourable environmental or toxicological effects whilst still allowing effective pest control. Because the injection tools described herein distribute liquid formulations to the interior of the plant, and allow the formulations to reside within the plant without pressure from a plunger, pump or the like the formulations remain within the plant with minimal risk (e.g., minimal or none) of formulation leakage.

Another problem is the fact pest control in fruit and other food plants is legally restricted. Conventional chemical pesticides can only be used during certain times of the vegetation period to avoid accumulation of chemical residues in the fruits or plant produce. It is therefore desired to replace chemical pesticides with biological control agents which are approved for human consumption. However, these control agents normally have high costs of goods which make a foliar use by spray applications in plantations of trees and other plants like banana, coffee, or cocoa punitively expensive. It is therefore desired to substantially reduce the amount of biological active ingredients in the treatment of especially trees, bushes and other plantations plants.

Therefore, a further problem addressed with the present disclosure relates to a process for modulating the phenotype of a plant or a multitude of plants by installing a plant injection system according to the disclosure in the plant or multitude of plants and administering a liquid formulation of an active ingredient to modulate the phenotype of the plant. A further problem address with the present disclosure relates to a method to modulate phenotypes of plants, for instance to treat, prevent, protect and immunize, which means induce local and systemic resistance to plants from pathogenic attacks and pest attacks. The injection tools described herein distribute liquid formulations directly to the interior of the plant without spraying and the commensurate loss of errantly applied sprayed formulations. The subject matter described herein places the formulations in direct contact with plant tissues and the formulations are selectively administered at appropriate times to minimize (e.g., eliminate or minimize) the accumulation of chemical residues in fruits or crops as mandated.

BRIEF DESCRIPTION OF THE DRAWINGS

The disclosure is explained in more detail below on the basis of illustrative embodiments depicted in the drawings.

FIG. 17 shows a perspective view of a fifth embodiment of the injection tool according to the disclosure;

FIG. 18 shows a front view of the injection tool of FIG. 17;

FIG. 19 shows a side view of the injection tool of FIG. 17;

FIG. 20 shows a perspective view of a sixth embodiment of the injection tool according to the disclosure;

FIG. 21 shows a front view of the injection tool of FIG. 20;

FIG. 22 shows a side view of the injection tool of FIG. 20;

DESCRIPTION OF EMBODIMENTS

Figure 1:
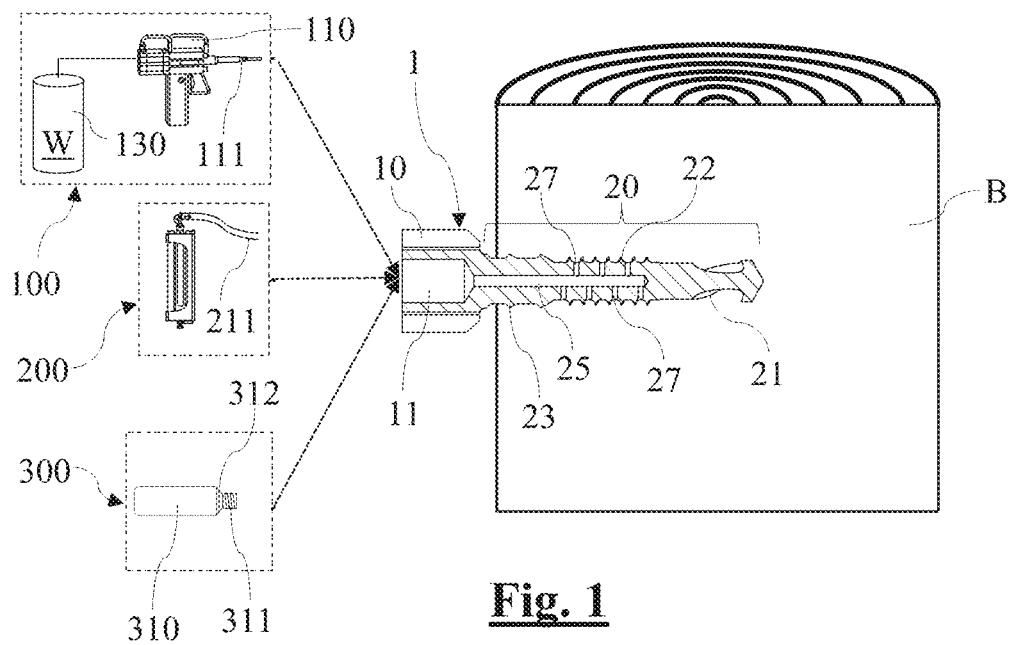
FIG. 1 shows a schematic view of an embodiment of an injection system with a first embodiment of an injection tool in axial cross-section and inserted into a tree trunk, as well as first, second and third embodiments of delivery devices.

In the following description certain terms are used for reasons of convenience and are not intended to limit the disclosure. The terms "right", "left", "up", "down", "under" and "above" refer to directions in the figures. The terminology comprises the explicitly mentioned terms as well as their derivations and terms with a similar meaning. Also, spatially relative terms, such as "vertical", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that some features are common to plural aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

The problems described herein are addressed by the injection systems, injection tools and methods described herein. Further, embodiments of the injection systems, injection tools or methods according to the disclosure are the subject matter of the dependent claims.

In one aspect, the disclosure is an injection tool for a plant injection system configured to introduce an active ingredient formulation (e.g., a fluid including one or more of a liquid, gas, gel, vapor, aerosol, colloids, micro/nanoparticles, biological organisms or the like) into a plant. The injection tool is configured to be inserted into the plant. It has a penetrating structure configured to generate a hole into the plant to insert the injection tool into the plant.

In a further aspect, the disclosure is a process for modulating the phenotype of a plant or a multitude of plants by installing a plant injection system according to the disclosure in the plant or multitude of plants and applying a liquid formulation of an active ingredient to modulate the phenotype of the plant.

The term "penetrating structure" or "penetrating element" as used herein relates to any arrangement being suitable or appropriate for generating the hole while advancing the insertion tool into the plant. Some embodiments include a self penetrating feature, such as cutting elements, that automatically form the penetrating hole insertion of the injection tool into the plant. The penetrating structure or penetrating element includes the examples described herein as well as their equivalents.

The term "hole" in this connection relates to a cavity, channel or similar structure provided into the plant, which is suitable for receiving the insertion tool or a portion, particularly a front or distal portion, thereof.

By "plants" is meant all plants and plant populations such as desirable and undesirable wild plants, cultivars and plant varieties (whether or not protectable by plant variety or plant breeder's rights). Cultivars and plant varieties can be plants obtained by conventional propagation and breeding methods which can be assisted or supplemented by one or more biotechnological methods such as by use of double haploids, protoplast fusion, random and directed mutagenesis, molecular or genetic markers or by bioengineering and genetic engineering methods.

"Plant" includes whole plants and parts thereof, including, but not limited to, shoot vegetative organs/structures (e.g. leaves, stems and tubers), roots, flowers and floral organs/structures (e.g. bracts, sepals, petals, stamens, carpels, anthers and ovules), seed (including embryo, endosperm, and seed coat) and fruit (the mature ovary), plant tissue (e.g. vascular tissue, ground tissue, and the like) and cells (e.g. guard cells, egg cells, and the like), and progeny of same. "Fruit" and "plant produce" are to be understood as any plant product which is further utilized after harvesting, e.g. fruits in the proper sense, nuts, wood etc., that is anything of economic value that is produced by the plant.

As used herein, "plant pathogen" refers to an agent capable of infecting and/or invading a plant, whole or in part, and causing infection or disease or symptoms thereof therein.

As used herein, "activity" means a component or components of fermented products that can be extracted therefrom in an aqueous solvent and exerts an effect of mitigating, ameliorating, treating, preventing and inhibiting growth of a plant pathogen when applied to a plant part and/or soil.

The term "bactericidal", as used herein, refers to the ability of a substance to increase mortality or decrease health (e.g., decrease growth rate, viability, proliferation, metabolism, longevity, etc.) of bacteria.

Biological control: As used herein, "biological control" is defined as control of a pathogen or insect or any other undesirable organism by the use of a second organism. An example of a known mechanism of biological control is the use of enteric bacteria that control root rot by out-competing fungi for space on the surface of the root. Bacterial toxins, such as antibiotics, have been used to control pathogens. The toxin can be isolated and applied directly to the plant or the bacterial species may be administered so it produces the toxin in situ.

"Fungicides" as well as the terms "fungicidal" and "acting in a fungicidal fashion" refer to the ability of a substance to increase mortality or decrease health (e.g., decrease growth rate, viability, proliferation, metabolism, longevity, etc.) of phytopathogenic fungi. As used herein, the term "phytopathogenic fungi" comprises all organisms of the kingdom of fungi including Oomycetes, which can cause damage of plants and/or damage of plant parts and/or losses in harvested fruits or vegetables.

The term "fungus" or "fungi", as used herein, includes a wide variety of nucleated spore-bearing organisms that are devoid of chlorophyll. Examples of fungi include yeasts, molds, mildews, rusts, and mushrooms. "Fungal pathogen" includes fungi of the following phylums: Myxomycota, Plasmodiophoromycota, Hyphochytriomycota, Labyrinthulomycota, Oomycota, Chytridiomycota, Zygomycota, Ascomycota and Basidiomycota. "Fungal inhibition" includes both fungicidal and fungistatic activity, as measured by reduction of fungal health (e.g., decrease growth rate, viability, proliferation, metabolism, longevity, etc.) compared to a control. A "susceptible fungus" is a fungal strain that demonstrates a beneficial or desired response separately to a component of the system provided herein or by a combination of both components.

"Insecticides" as well as the term "insecticidal" refers to the ability of a substance to increase mortality or decrease health (e.g., decreased growth rate, viability, proliferation, metabolism, longevity, etc.) of insects. As used herein, the term "insects" comprises all organisms in the class "Insecta".

"Nematicide" and "nematicidal" refers to the ability of a substance to increase mortality or decrease health (e.g., decrease growth rate, viability, proliferation, metabolism, longevity, etc.) of nematodes. In general, the term "nematode" comprises eggs, larvae, juvenile and mature forms of said organism.

"Acaricide" and "acaricidal" refers to the ability of a substance to increase mortality or decrease health (e.g., decrease growth rate, viability, proliferation, metabolism, longevity, etc.) of ectoparasites belonging to the class Arachnida, sub-class Acari.

Microbicidal: "Microbicidal", as used herein, refers to the ability of a substance to increase mortality or decrease the health (e.g., decreased growth rate, viability, proliferation, metabolism, longevity, etc.) of microorganism.

The term "health of a plant" or "plant health" is defined as a condition of the plant and/or its products which is determined by several aspects alone or in combination with each other such as yield, plant vigor, quality of harvested plant parts, tolerance to abiotic and/or biotic stress, viability, proliferation, metabolism, longevity, etc.).

"Preventing infection" in the present context, means that the plants treated with the system disclosed herein, avoid infection (e.g., such as pathogen infection) or disease symptoms or all of the above, or exhibit reduced or minimized or less frequent infection or disease symptoms or all of the above, or induce or increase defense/immune responses to stimuli in the plants to avoid or reduce or minimize infection or disease symptoms or all of the above, that are the natural outcome of plant interactions with infectious or disease-causing pathogens when compared to plants not treated by the methods, tools, and system of the disclosure. That is to say, infectious or disease-causing pathogens are prevented or reduced from causing disease and/or the associated disease symptoms. Infection and/or symptoms are reduced at least about 10%, 20%, 30%, 40%, 50, 60%, 70% or 80% or greater as compared to a plant not so treated with the system taught herein.

Pesticidal: The term "pesticidal", as used herein, refers to the ability of a substance to decrease the health (e.g., decrease rate of growth of a pest, i.e., an undesired organism, viability, proliferation, metabolism, longevity, etc.) or to increase the mortality of a pest. In general "pesticidal" means the ability of a substance to increase mortality or decrease the health (e.g., growth rate, viability, proliferation, metabolism, longevity, etc.) of phytopathogenic fungi. The definition also comprises the ability of a substance to increase mortality or decrease the health (e.g., decrease growth rate, viability, proliferation, metabolism, longevity, etc.) of phytopathogenic fungi and/or plant pests. The term is used herein, to describe the property of a substance to exhibit activity against phytopathogenic fungi, insects, mites and/or nematodes. Plants are exposed to many microbes, including bacteria, viruses, fungi, and nematodes. Diseases of ornamental plants, forests, and other plants caused by such plant pathogens, particularly bacterial pathogens, are a worldwide problem with enormous economic impact. The severity of the destructive process of disease depends on the aggressiveness of the phytopathogen and the response of the host.

The tools, system and methods of the disclosure enable a systemic or directed application of active ingredients into the vascular system of a plant, such as into the stem of a plant. The disclosure can be applied to large variety of plants, included but not limited to those listed below, as well as any and all other pathogenic diseases and/or complexes that are encountered in agriculture especially in horticulture.

Another problem underlying the present disclosure is the desire for compositions that improve plants, a process which is commonly and hereinafter referred to as "plant health". Healthier plants are desirable since they result among others in better yields and/or a better quality of the plants or crops, specifically better quality of the harvested plant parts. Healthier plants also better resist to biotic and/or abiotic stress. A high resistance against biotic stresses in turn allows the person skilled in the art to reduce the quantity of pesticides applied and consequently to slow down the development of resistances against the respective pesticides.

Increased yield can be characterized, among others, by the following improved properties of the plant: increased plant weight; and/or increased plant height; and/or increased biomass such as higher overall fresh weight (FW); and/or increased number of flowers per plant; and/or higher grain and/or fruit yield; and/or more tillers or side shoots (branches); and/or larger leaves; and/or increased shoot growth; and/or increased protein content; and/or increased oil content; and/or increased starch content; and/or increased pigment content; and/or increased chlorophyll content (chlorophyll content has a positive correlation with the plant's photosynthesis rate and accordingly, the higher the chlorophyll content the higher the yield of a plant), increased quality of a plant. According to the present disclosure, the yield is increased by at least 4%. In general, the yield increase may even be higher, for example 5 to 10%, for example 10 to 20%, or even 20 to 30%

Another indicator for the condition of the plant is the plant vigor. The plant vigor becomes manifest in several aspects such as the general visual appearance. Another indicator for the condition of the plant is the "quality" of a plant and/or its products and/or the plant's tolerance or resistance to biotic and/or abiotic stress factors. Biotic and abiotic stress, especially over longer terms, can have harmful effects on plants.

According to one embodiment, the injection tool of the disclosure is part of an injection system which can enable a central supply of the active ingredient to one or more plants. All the different components of such system can be provided in form of a kit supplied to the farmer or professional application person. Such kit may comprise the following components: (1) one or more injection tools and/or (2) one or more delivery devices which may be configured to be connected to the injection tool and/or (3) one or more active ingredients. Said kit may comprise components (1) and (2), or said kit may comprise the components (1) and (3) or said kit may comprise the components (2) and (3).

By having the penetrating structure or penetrating element, the injection tool can be inserted, such as screwed, driven or knocked, into the plant without previous formation of a receiving recess. Rather, the injection tool according to the disclosure more or less automatically generates the required hole while being advanced into the plant. It can therefore be inserted into the plant in a single work step. Thus, the injection tool allows for reducing the amount of work involved which can make the complete process considerably more efficient.

The injection tool is configured to be inserted into a ligneous region of the plant, particularly into a tree trunk, or configured to be inserted into a non-ligneous region of the plant, particularly into a pseudo-stem.

In embodiments of the injection tool the penetrating structure or penetrating element includes a cutting edge configured to cut the hole into the plant when inserting the injection tool into the plant. In this context, the term cutting is to be widely understood as any structure facilitating carving, cutting, or opening of the plant at the position where the injection tool is inserted. It includes, but is not limited to, cover puncturing, drilling, sawing, slicing, milling, wedging or any similar arrangements. Such a cutting edge allows for efficiently generating the hole into the plant for generating a cavity into which the injection tool is placed. In particular, such cutting edge allows the inserting tool to efficiently self-generate the hole to be accommodated in.

In an embodiment, the cutting edge of the penetrating structure includes one or more cutting elements, similar in some regards to a drill bit, wound along a longitudinal axis of the injection tool. Such a drill bit portion allows for efficiently driving the injection tool into the plant. Thereby, the drill bit portion of the cutting edge of the penetrating structure includes a chip groove extending along and limited by the cutting edge. Such chip groove allows for eliminating chips of the plant tissue generated when driving the injection tool into the plant such that a proper advancing of the injection tool is achieved.

The cutting elements of the penetrating structure optionally include threading wound along a longitudinal axis of the injection tool. Threading or other anchor elements described herein (collectively as anchor elements) facilitate coupling and retention of the injection tool in the plant. In one example, in combination with the cutting elements the injection tool consolidates penetration of the plant, positioning of the injection tool and retaining of the injection tool in the plant.

The injection tool includes a base or head and a shaft (or generally a penetrating distribution body including, but not limited to, a shaft body profile, wedge body profile or the like). Optionally, the penetrating element of the penetrating distribution body includes the cutting element, such as a drill bit portion, and the screw portion, and the screw portion is closer to the head than the drill bit portion. An external diameter (or more generally, profile) of the threading or other anchor element is optionally larger than an external diameter (or profile) of the cutting element. The shaft optionally includes a bead portion (e.g., one or more closure beads) located between the cutting element and the base, and on which at least one closure bead is formed. An external profile of the peripheral bead is larger than the external diameter of the threading or remainder of the penetrating distribution body. The closure bead forms a seal between the injection tool and the plant to the interior of the plant, and in some examples facilitates the visual assessment of the depth of penetration of the injection tool.

In another embodiment, the penetrating element includes a wedge body profile (e.g., tapering from a proximal portion to a distal portion, such as a spike, nail, wedge or the like). A wedge body profile allows for efficiently advancing the injection tool into the plant, for instance with a hammering or driving action. In this example, the injection tool includes a penetrating distribution body including one or more of a wedge or shaft profile have a tapered shape. For instance, the penetrating distribution body is conical and includes with external longitudinal furrows or flutes (e.g., examples of distribution reservoirs). The injection tool includes a strike head (optionally as a feature of the base). Optionally, a conical portion of the penetrating distribution body is closer to the base than the nail tip portion (or cutting element). In another example, the penetrating distribution body includes one or more a closure beads located between the conical portion and the strike head having at least one peripheral bead. The profile of the peripheral bead is, in an example, larger than a profile of the conical portion of the penetrating distribution body.

In still another embodiment, the injection tool has a wedge portion (wedge body profile) in a lance tip shape equipped with the penetrating element including a leading end or cutting edge at its front end or distal portion. In this convention the term "front end" can relate to a distal portion of the penetrating distribution body directed toward the plant and engaging with the plant at penetration. This example wedge body profile is an alternative wedge profile allowing efficient advancing of the injection tool into the plant. In particular, the wedge body profile opens the plant by spreading apart cut plant tissue. In some examples, the wedge body profiles accesses interior of the plant with minimal impairment (e.g., little or no damage) of the plant interior structure. For instance, spreading with a wedge body profile leaves the liquid transport structure of the plant, such as capillaries or the like, minimally impaired (including unimpaired or minimally impaired).

In one example, the wedge body profile includes a flat lance tip or leading edge having two or more lateral wing-like portions. Optionally, the wedge body profile, is chosen based on the plant for treatment. For instance, the robustness of the wedge body profile is adapted to the intended application or plant. Depending on the plant, the cutting element is selected with a nail tip type wedge (e.g., a circular or conical type wedge) or wedge body profile having two or more wings extending from a leading edge of the penetrating distribution body.

The injection tool optionally includes a strike head, for instance as part of the base. A strike head allows for efficiently advancing of the injection tool into the plant, e.g., by hammering on the strike head.

Optionally, the penetrating distribution body including one or more of the profiles described herein includes one or more openings, such as distribution reservoirs. The distribution reservoirs provide one or more spaces, cavities, recesses, pockets or the like inside the plant when the injection tool is inserted. The distribution reservoirs facilitate the distribution of liquid formulations, for instance by retaining the formulations in the cavities of the reservoirs and at the same time engaging the formulations with the plant tissue. In other examples, the distribution reservoirs include distribution channels that facilitate delivery of the liquid formulations within the channels and along the body profile of the penetrating distribution body. The injection tools described herein include one or more inlet passages and associated distribution ports. Optionally, the injection tools include plural inlet passages that provide liquid formulations to a plurality of distribution ports. For example, the injection tools include at least one inlet passage or passages each ending in at least one distribution port. Optionally, the injection tools include one or more of the previously described distribution reservoirs (sometimes referred to as openings), and the distribution ports open into the distribution reservoirs.

The injection tools described herein include a channel (e.g., an inlet passage) and at least one distribution port connected to the channel. The inlet passages (or channels) provide a distributed network of outlets or distribution ports for the injection tool for efficient distribution of the liquid active ingredient formulation at one or more locations within the plant.

The at least one distribution port extends from the main channel. The at least one distribution port (also referred to as an outlet channel) facilitates the delivery of the liquid active ingredient formulation to one or more locations relative to the injection tool.

In some examples, when inserting an injection tool into a plant, the material of the plant such as plant tissues including, but not limited to, wood, fibres or the like advance into the distally opening or located orifices. The plant tissue in these examples plugs the distal opening or orifice thereby preventing or frustrating delivery of the active ingredient formulation into the plant. In some examples, significant pressure is applied to the formulation (e.g., through a piston, plunger or the like) to unclog the distal opening or orifice. The pressure in some instances causes trauma to the plant tissue.

The distribution ports described herein (alternatively, outlet channels) are oriented transversely relative to the penetrating direction of the injection tools (e.g., corresponding to a longitudinal body axis of the tools). For instance, the transverse distribution ports are oriented at angle relative to the penetrating direction. In one example, the distribution ports are oriented to open at 90 degrees relative to the penetrating movement direction. In another example, the distribution ports are oriented at angles between around 100 to 180 degrees relative to the penetrating movement direction (e.g., the longitudinal body axis of the injection tools).

In connection with the orientation of the distribution ports one or more of the following three directions are considered, an insertion direction, a penetrating movement direction and an outlet (or distribution) direction. In an example, the insertion direction is the general direction the injection tool is inserted or advanced into the plant (e.g., from the exterior of the plant toward the interior). The insertion direction generally conforms with an axis of the injection tool, for instance the longitudinal body axis described herein. Accordingly, the longitudinal body axis is used as a reference location corresponding to the insertion direction when discussing the orientation of the distribution ports.

The penetrating movement direction is the direction the injection tool is to be moved (e.g., rotated) in order to penetrate the plant for insertion. In embodiments of injection tools having cutting elements in the manner of a drill bit portion or threading, the penetrating movement direction lies along the thread of the drill bit portion or the screw portion (and in some examples is indicated with a circle and dot in the figures indicating the penetrating movement direction into and out of the page). The distribution ports, for instance provided between threads, extend in a transverse orientation relative to the penetration movement direction in addition to the insertion direction. With the injection tool embodiments herein having wedge body profiles that are tapped or struck for penetration of the plant, such as injection tools with a nail tip portion or a wedge portion (e.g., example wedge profiles), the penetrating movement direction corresponds with the insertion direction. In each of the embodiments described herein (e.g., shaft or wedge profiles) the one or more distribution ports are transverse (include an outlet or opening direction at a different angle) to the longitudinal body axis and the corresponding insertion direction. Additionally, in the example embodiments including a shaft profile, for instance having threading or drill bit type cutting elements, the one or more distribution ports (e.g., the outlet direction or opening direction of the ports) are transverse (at a different angle) to the penetrating movement direction. Accordingly, each of the insertion direction and the penetrating movement direction are referred to collectively as penetrating directions, and the outlet or opening directions of the distribution ports of the injection tools are transverse to the respective penetrating directions of the embodiments.

In some examples, the opening direction or outlet direction of the one or more distribution ports extends backward relative to the penetrating direction including the penetrating movement direction described herein. The term "backwardly extending" or the like in this context relates to an extension of the at least one distribution port in a converse or opposed orientation relative to the penetrating movement direction. Backwardly extending is not limited to an extension opposite to the penetrating movement direction, i.e. a rearward direction in the narrow sense, but rather to an extension at an angle to the penetrating movement direction different from a right or larger angle. For example, in some examples the distribution ports are oriented 105 degrees relative to the penetrating movement direction.

In embodiments including linear distribution ports, an open end of a distribution port (the opening facing to the exterior of the tool) is remote relative to the leading end of the injection tool (e.g., the penetrating element) than the connection of the distribution port to the inlet passage. Stated another way, the distribution port at least proximate to its open end is backward facing relative to the leading end of the tool. In other examples including distribution ports, the one or more of the distribution ports include the opening directed backward (e.g., another example of transverse orientation) to prevent plugging during penetration (e.g., one or more insertion direction or penetrating movement direction, collectively penetrating directions). For example such outlet channel can have a curve backwardly turning the outlet channel towards its outlet opening.

In another example, by orienting the one or more distribution ports more than 90 degrees relative to the penetrating movement direction clogging of the distribution ports with plant tissue is minimized (e.g., eliminated or minimized). Accordingly, plugging is minimized and the liquid active ingredient formulations are effectively and efficiently provided through one or more distribution ports.

Additionally, the injection tools described herein include distal portions, for instance having a front end (leading end) or tip for the penetrating element. The one or more distribution ports are spaced from the front end. Because the distribution ports are spaced from the leading end the liquid active ingredient formulation is distributed remotely relative to the leading end, and in some examples is distribution peripherally around the injection tool without centralizing distribution of the fluid to the distal portion, such as a tip.

The liquid formulation is thereby optimally distributions to the plant with minimal risk of clogging of the distribution ports.

The injection tool has an inlet port (e.g., a socket opening or the like) connected to the inlet passage or the at least one distribution port. The inlet port is configured for connection to a delivery device of the plant injection system. Such socket opening allows for efficiently connecting a source of the liquid active ingredient formulation.

The socket opening of the injection tool is arranged in the head of the injection tool or in the strike head of the injection tool. This allows for efficiently connecting the injection tool since such head typically projects out of the plant when the injection tool is inserted.

The injection tools described herein are in various examples constructed with or include metal or an alloy of metals. The injection tools described herein may be constructed with or include polymers or polymer alloys that may be used with any of the manufacturing methods described herein. In production methods, the method of milling, casting, or other similar methods may be used. The injection tools described herein may be constructed with or include polymers or polymer alloys that may be used with any of the manufacturing methods described herein. In production methods, the method of milling, casting, or other similar methods may be used. In an example production method, the injection tools are produced by a 3D printing method or 3D printed. This allows, on the one hand, sufficient stability and, on the other hand, cost-effective production of the injection tool. Also, 3D printing allows for manufacturing the injection tool with comparably complex shapes at comparably small dimensions. For example, 3D printing facilitates the constructions of one or more passages, ports, reservoirs or the like of the distribution channel system in the injection tool at comparably small dimensions. More specifically, 3D printing allows for efficiently generating backwardly extending outlet channels as described above.

The injection tool is equipped with an abutting face configured to contact the plant at the end of inserting the injection tool into the plant. Such abutting face can be embodied by a step, flange, bracket arms or a similar structure provided to the injection tool, for instance as a component of the injection tool base. The abutting face can be flat or even. It can also have a corresponding shape (e.g., arcuate, flat or the like) to a portion of the plant where the insertion tool is intended for insertion. For example it can be curved in accordance with a stem of a plant. The abutting face limits advancing of the injection tool into the plant. Particularly, when the plant is comparably soft such as is the case in comparably small or non-woody plants, the abutting face constrains penetration to prevent penetration through the opposed side of the plant while facilitating precise position of the distribution element within a specified plant tissue. Additionally, the abutting face enhances the connection between the injection tool and the plant. For instance, the surface to surface contact between the abutting face of the base and the plant further closes the interior of the plant from the exterior environment and allows for generating an elevated pressure inside the plant, e.g. by a plant injection system as described below, in order to provide the liquid active ingredient formulation into the plant. Additionally, the abutting face of the base restricts escape of the active ingredient formulation through the slot or opening generated by the injection tool.

In another aspect, the disclosure is a plant injection system for introducing a liquid active ingredient formulation into a plant. The system comprises an injection tool as described above and a delivery device. The delivery device is configured to be connected to the injection tool to deliver the active ingredient formulation to the injection tool. Such system allows for efficiently providing the liquid active ingredient formulation into the plant for treating it.

The delivery device is designed as a pneumatically or hydraulically operated dosing pump configured to administer a fluid formulation (e.g., a fluid including one or more of a liquid, gas, gel, vapor, aerosol or the like). Alternatively, the delivery device is designed as a pneumatic or hydraulic delivery pump configured to provide one or more pressures. In some examples, the pressures provided are proximate to but greater than ambient pressure to provide gradual low pressure delivery of the formulation to a plant. In another example, the delivery device provides the liquid formulation in a passive manner, for instance by way of hydrostatic pressure or capillary action.

The delivery device is, in one example, designed as a two-chamber assembly, wherein two chambers are arranged in a container, of which one chamber contains a pressure medium and the other contains an active ingredient formulation which can be expelled from the two-chamber assembly through a valve by the pressure medium.

As mentioned above, the injection system according to the disclosure is suitable for being applied to various different plants. Thereby, the shape and dimensions of the injection tools involved advantageously are adapted to the intended application. More specifically, the injection tool can be designed for being applied to comparably large plants and specifically to trees, bushes or other woody plants. Or, it can be designed for being applied to comparably small or smaller plants. For example, injection tools suitable for woody plants may have a total length of more than 50 millimeter (mm) or in a range of between 60 mm and 200 mm. The respective penetrating distribution bodies (e.g., shaft or wedge body profiles) include lengths of 35 mm or more and in some examples are in a range of between approximately 35 mm and 160 mm, and/or a width of 30 mm or more or are in a range of between approximately 35 mm and 150 mm. In contrast, injection tools intended for comparably small plants optionally have a total length of between approximately 3 mm and 20 mm, between approximately 6 mm and 16 mm, or less than 10 mm.

In a further other aspect, the disclosure is a process of modulating the phenotype of a plant or a multitude of plants, said process including the steps of (i) installing a plant injection system according to the disclosure provided herein in the plant or multitude of plants, and (ii) applying a liquid formulation of an active ingredient to modulate the phenotype of the plant.

The active ingredient is selected from the group consisting of (i) pesticides, (ii) growth regulators. The active ingredient is a biological compound or composition approved for food and feed application. In one example, the process is carried out by one or more of a) to e):

a) the active ingredient is applied/transferred to the plant in an automatically controlled scheme/method over the vegetation period (growing season),
  b) the active ingredient is transferred from a deposit to the plant by a pneumatic (Takt-Schub) conveying system, which minimizes the amount of active ingredient/active ingredient formulation in the fluid lines of the system and passages and distribution ports of the injection tools, c. a multitude of plants is supplied the active ingredient from a central deposit, while, optionally, the transference to each plant is individually controlled,
d. the active ingredient can be automatically selected from a group of deposits to achieve a different effect, such as different phenotype modulation,
e. water can be provided in between applications of one or more active ingredients; the plant is a tree or plants with pseudostems, such as banana plants; trees can include, for example, fruit trees, cocoa trees, coffee trees, or ornamental trees (the term "tree" is further discussed below);

modulating the phenotype of the plant or a multitude of plants is selected from the group consisting of controlling and/or preventing plant diseases, controlling and/or preventing pest attacks, improving and/or controlling plant health, improving and/or controlling plant growth and/or the quantity and/or quality of plant produce, such as fruits.

The disclosure further relates to a multitude of plants, plant plantation, or field of plants, wherein plants are connected to a plant injection system according to the disclosure so as to provide, in one embodiment, phenotype modulation.

A receiving recess is to be understood as any kind of cavity that is created in the ligneous region of a plant for the purpose of inserting an injection tool. In particular, a receiving recess includes a drilled hole. The term "self-drilling" in the context of the disclosure is to be understood as a self-penetrating embodiment of the injection tool by which the receiving recess, necessary for the insertion of the injection tool into the plant, can be generated directly during the insertion procedure itself, such that no receiving recess needs to be created prior to the insertion.

Figure 2:
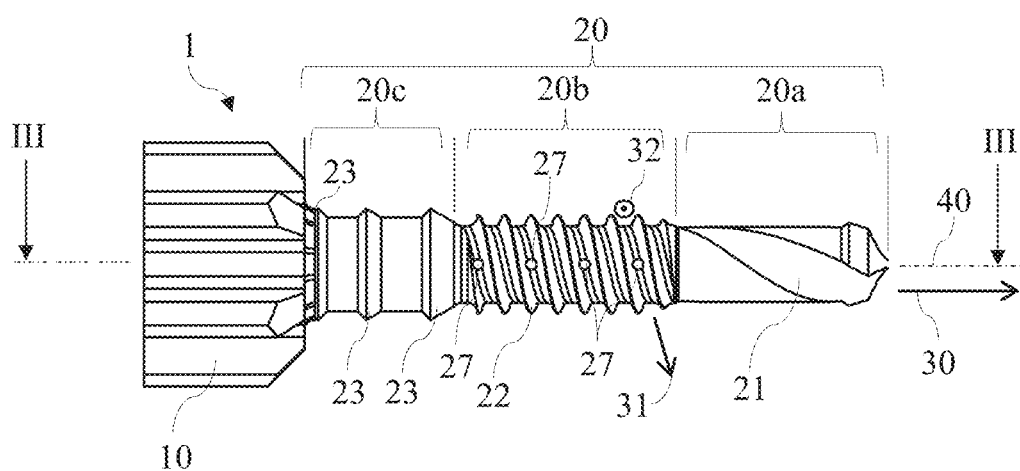
FIG. 2 shows a side view of the injection tool of the injection system of FIG. 1.
Figure 3:
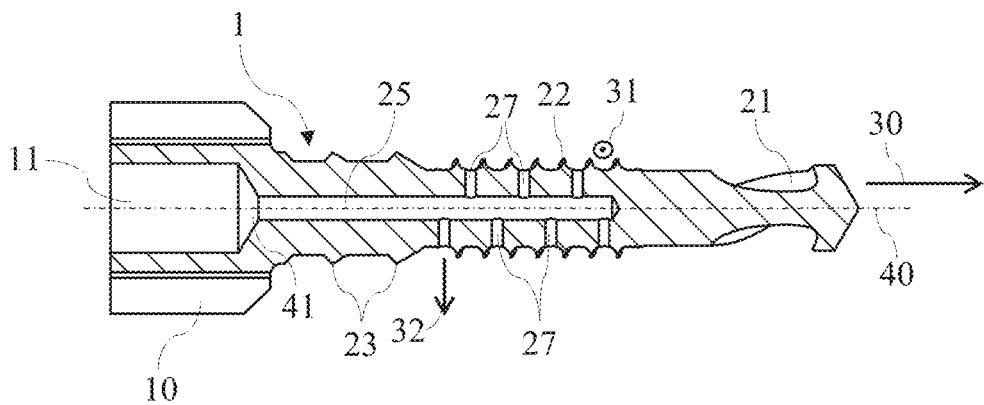
FIG. 3 shows an axial cross-section of the injection tool of the injection system of FIG. 1 along the line III-III of FIG. 2.

According to the views in FIGS. 1-3, an embodiment of an injection system according to the disclosure comprises a first embodiment of an injection tool 1 according to the disclosure, having a shaft body profile that is self-drilling. It additionally comprises a delivery device which is attachable to the injection tool 1 and by means of which an active ingredient formulation W is delivered, in a dosed quantity, to the injection tool 1. The active ingredient formulation W can then be provided to the plant that is to be treated, for example a tree, via the injection tool 1. The delivery device can be variously configured. For example, FIG. 1 shows three embodiments 100, 200 and 300 of delivery devices. When the injection system is actually in use, only one of these variants is attached at any one time to the injection tool 1. The design and function of the different variants of the delivery device are discussed in more detail below.

FIG. 2 shows a side view of the injection tool 1. In one example, the injection tool 1 (and other injection tools described herein) is a single component, for instance molded or 3D printed. In other examples the injection tools described herein are multiple components, molded or 3D printed, and then assembled. The injection tool 1 substantially has a penetrating distribution body having a body profile, in this example a shaft body profile. The injection tool includes an exterior of the body profile shaped as a screw with a head 10 (e.g., base 10) and a shaft 20 (e.g., penetrating distribution body 20). The penetrating distribution body 20 is optionally divided into three portions, i.e. a distal drill bit portion 20a (a penetrating element 20a), an intermediate screw portion 20b (a distribution element 20b) and a rear bead portion 20c (a closure element 20c). The penetrating element 20a directed away from the base 10 is designed as a (wood) drill. It comprises winded cutting elements 21 and adjoining chip grooves as components of the penetrating element 20a. The distribution element 20b (e.g., intermediate screw portion in this example) includes threading 22 as a winded cutting edge and anchor element of the penetrating structure of the injection tool 1. An external diameter of the middle portion 20b is in one example larger than that of the front portion 20a. Closure beads 23 (of which there are three in this example) are formed on the closure element (or rear portion 20c) directly adjoining the base 10. The external profile (e.g., diameter, projection relative to the remainder of the body or the like) of these peripheral beads 23 is larger than the corresponding external profile (e.g., diameter or the like) of the middle portion 20b.

As can best be seen in FIG. 3, an outwardly open, cylindrical attachment or socket opening 11 (a socket fitting) is provided in the base 10 and is connected, for communication therewith, to longitudinal channel 25 (e.g., an inlet passage 25) provided as a main channel in the penetrating distribution body 20. The longitudinal channel 25 is optionally configured as a blind hole and extends through at least the rear portion 20c and the middle portion 20b of the shaft 20 (an example of a penetrating distribution body). In the region of the middle portion 20b of the shaft 20 (the distribution element of the penetrating distribution body), laterally extending radial outlet channels 27 (e.g., one or more distribution ports) are provided which are connected to the longitudinal channel 25 for communication therewith. The radial outlet channels 27 (distribution ports) open out laterally in the region of the middle portion 20b of the shaft 20 between the thread turns 22 thereof. In an example, the thread turns provide one or more distribution reservoirs between the thread turns, and the distribution ports are within the turns. The distribution ports are accordingly recessed from an exterior of the body profile including the peripheral ends of the thread turns.

The head 10 (an example of a base) has, for example, a hexagonal outer contour, such that a screwdriver with a hexagonal socket can be plugged onto it. The injection tool 1 is, in one example, made of metal (including metal alloys) and is produced by 3D printing.

In use, the injection tool 1 is inserted into a ligneous region B of a plant that is to be treated, such as a tree trunk, as shown in FIG. 1. More specifically, the injection tool 1 penetrates the plant along an insertion direction 30 (e.g., an example of a penetration direction) into which it is forwarded into the tree trunk. The insertion direction 30 extends along the axis of the insertion tool 1, the longitudinal body axis 40. This embodiment of the injection tool 1 includes a self-drilling design with the cutting elements 21 of the injection tool 1, and insertion conducted in a single work step by screwing in (e.g. by means of an electric or manual screwdriver), without drilling a pilot hole. The drill portion 20a (an example of the penetration element) of the shaft 20 drills a hole, the screw portion 20b of the shaft (in this embodiment the distribution element and the anchor element) causes the further advancing and secure retention of the injection tool 1. The peripheral beads 23 of the third portion 20c (the closure element) additionally mate the injection tool 1 to the outside and enclose the penetration to the plant. Additionally, the depth of penetration of the injection tool 1 is visually monitored with the peripheral beads 23. For instance, as each of the peripheral beads 23 reaches the plant exterior the operator recognizes the penetrating element 20a (also referred to as the drill portion) is at a corresponding penetration depth.

While advancing the injection tool 1 by means of the screw portion 20b, the insertion tool 1 is rotated and thereby moved along the threading 22 a penetrating movement direction 31 shown in FIG. 2 with an arrow parallel relative to the threading. A pitch or angle of the thread 22 in one example defines the penetrating movement direction 31 (another example of a penetration direction). The screwing of the injection tool 1 (e.g., rotation of the tool) and movement of the threading 22 along the penetrating movement direction 31 axially moves the injection tool 1 along the insertion direction 30.

Referring now to FIG. 3 and FIG. 2, the outlet channels 27 (examples of distribution ports) are linear and extend in an outlet direction 32 transverse (at a relative angle) to the penetrating movement direction 31. For instance, the outlet channels 27 extending in the outlet direction 32 are at an angle of 90 degrees or less relative to the penetrating movement direction 31 (e.g., the outlet channels are perpendicular to or open in a reversed direction relative to the penetrating movement direction 31). In FIG. 3, the outlet direction 32 is along the plane of the page and transverse to each of the penetrating movement direction 31, the insertion direction 30 (collectively the penetration directions) and the longitudinal body axis 40 corresponding to at least the insertion direction. In FIG. 2, the outlet direction is shown extending into and out of the page with the circle and point symbol, and is again transverse to the penetrating movement direction 31, the insertion direction 30 and the longitudinal body axis 40. For example, the outlet channels 27 extending in the outlet direction 32 are at an angle of 90 degrees or less relative to the insertion direction 30 (e.g., the outlet channels are perpendicular to or open in a reversed direction relative to the insertion direction 30). The transverse orientation of the outlet channels 27 isolates the outlet channels 27 from plant tissues during insertion and accordingly minimizes engagement with the tissues and potential clogging of the outlet channels.

With the injection tool 1 inserted into the plant (as part of a penetrating configuration), one of the delivery devices 100, 200, 300 (or a delivery device of another configuration) is attached sealingly to the injection tool 1 at an inlet port, in this example the attachment opening 11. A dosed quantity of active ingredient formulation W (a fluid including one or more of a liquid, gas, gel, vapor, aerosol, colloid, micro/nanoparticles, biological organism or the like) is delivered for a predefined period of time. The active ingredient formulation W passes through the attachment opening 11, the longitudinal channel 25 (an example of an inlet passage) and the outlet channels 27 (example distribution ports) into the plant tissue surrounding the injection tool 1. The formulation W is gradually taken up and transported by the nutrient pathways of the plant. The thread turns 22 and transverse distribution ports (outlet channels 27) relative to the penetration directions promote the dispensing of the active ingredient formulation to the surrounding plant tissue. For example, the distribution ports are recessed within the threading acting as the walls of a distribution reservoir and accordingly within the body profile of the penetrating distribution body (in this example, the shaft 20). Further, the distribution ports open and are accordingly oriented transverse relative to the penetration directions (including the insertion direction and the penetrating movement direction) and correspondingly transverse relative to the longitudinal body axis 40. The transverse orientation of the outlet channels 27 in combination with the distribution reservoirs isolates the outlet channels 27 from plant tissues during insertion.

To facilitate the communication of the delivery device with the injection tool 1, the delivery devices 100, 200, 300 are provided with an attachment part 111, 211, 311 corresponding to the attachment opening 11 (a socket fitting) of the head 10 of the injection tool 1. The attachment parts permit sealed communication with the injection tool 1. The attachment part includes, but is not limited to, a tip 111, a hose 211, an attachment nipple 311 or the like each of which is sealingly coupled with the injection tool 1 at the attachment opening 11 (an example of a socket fitting) having an inlet port 41 in communication with the outlet channels 27 (example distribution ports).

Figure 4:
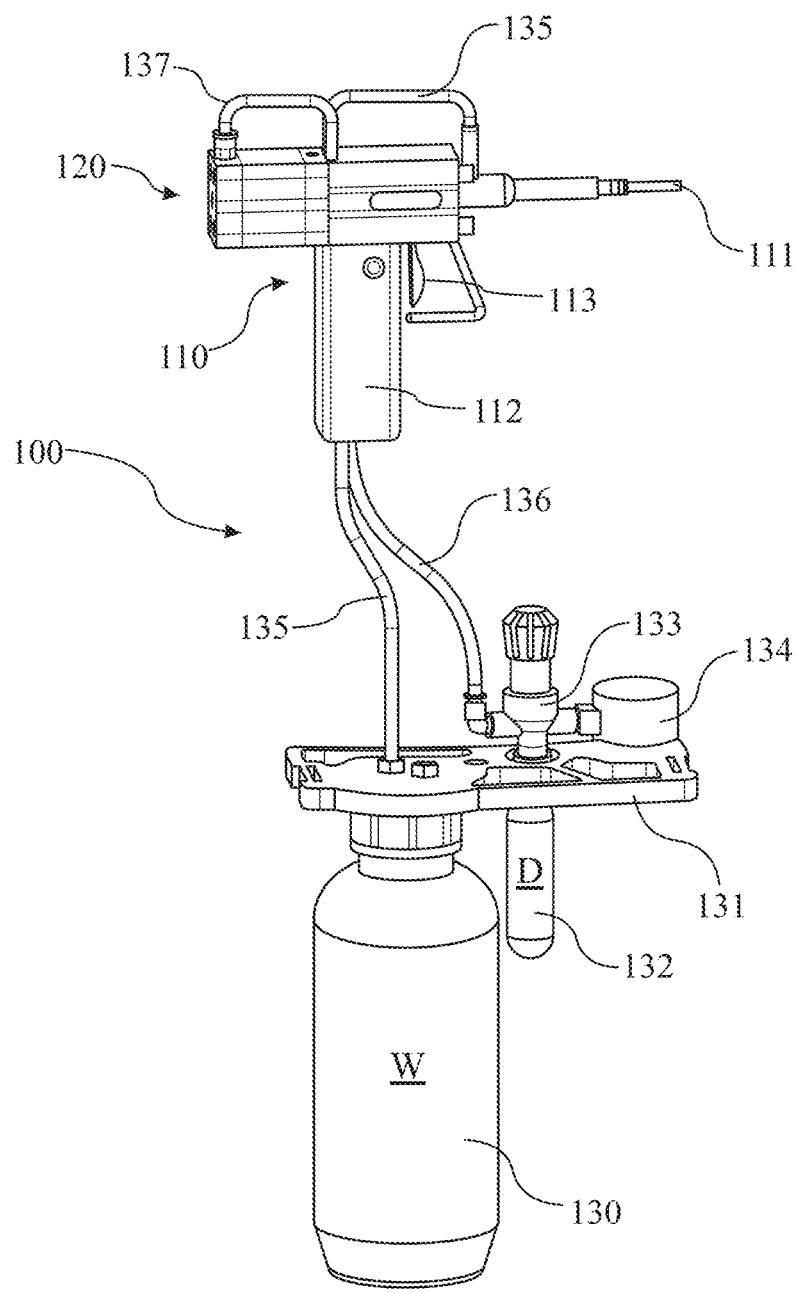
FIG. 4 shows an overall view of the first embodiment of the delivery device of the injection system of FIG. 1.

The first embodiment of a delivery device 100 shown by way of example in FIG. 4 comprises a container 130, in which a liquid active ingredient formulation W is kept stored, and a dosing device 110, shaped in this example in a pistol profile and with which a dosed quantity of active ingredient formulation is dispensed under pressure into the injection tool, for instance one or more of the injection tools described herein.

In the example shown in FIG. 4, a carrier plate 131 is secured on the container 130, on which carrier plate 131 a cartridge 132 with a pressurized gas D, e.g. $CO_2$, is mounted. An adjustable pressure-reducing valve 133 and a manometer 134 are attached to the cartridge 132. The container 130, with the active ingredient formulation, and the pressure-reducing valve 133 are each connected to the dosing device 110 via a respective hose line 135, 136.

Figure 5:
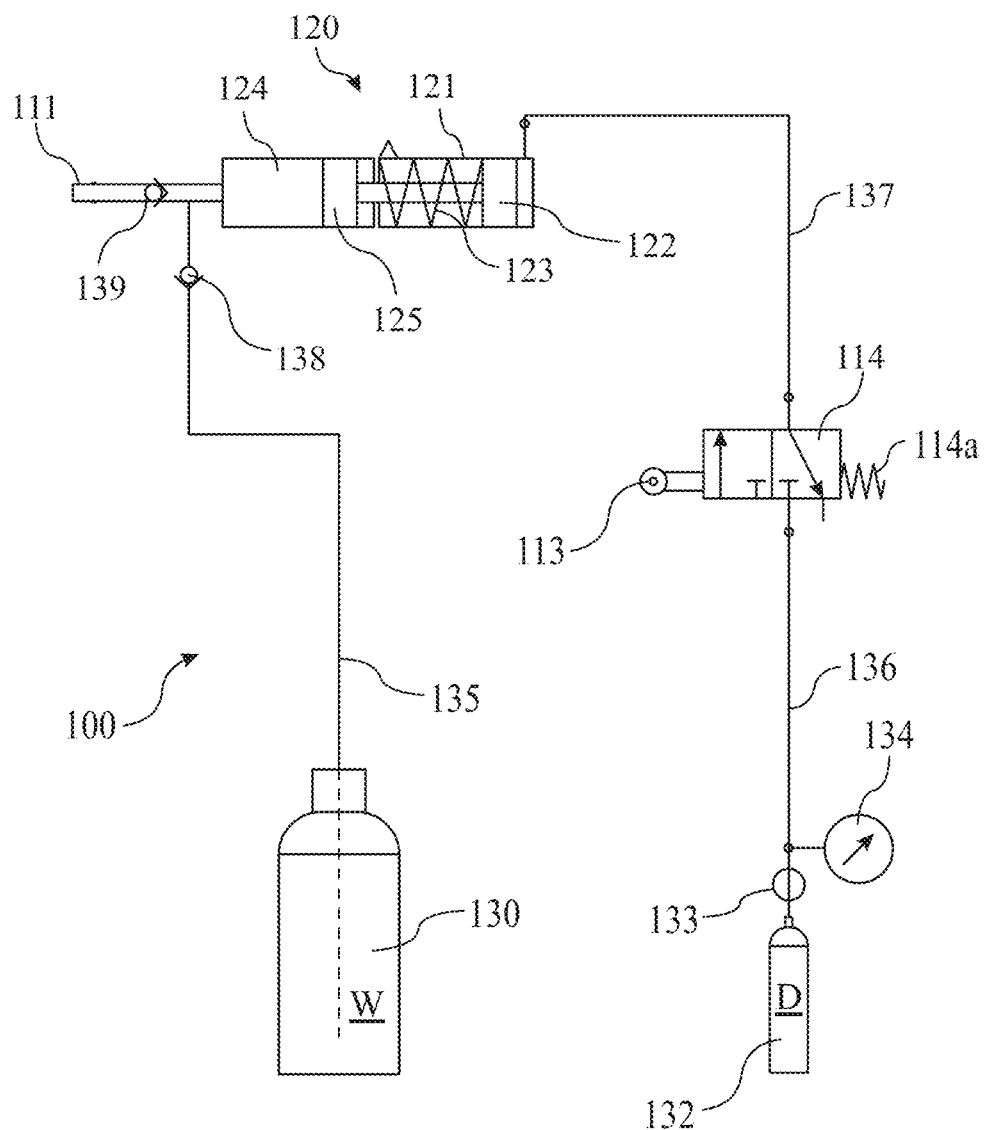
FIG. 5 shows a schematic hydraulics diagram of the delivery device of FIG. 4.

The dosing device 110 comprises a handle 112 having a trigger 113 for toggling a spring-loaded ³⁄₂ valve 114 contained in the handle 112. The valve 114 is attached to a hose line 136 (also shown in FIG. 5) and a pneumatic pump assembly 120 for aspiration of the formulation from the container 130. The formulation is dispensed under pressure through the attachment tip 111 into the injection tool, such as the tool 1 shown in FIGS. 1-3. FIG. 5 shows these components schematically.

As shown in FIG. 5, the pneumatic pump assembly 120 comprises a pressure cylinder 121, with a pressure piston 122 movable therein and a restoring spring 123. The pump assembly 120 further includes in this example a dosing cylinder 124 with a dosing piston 125 movable therein. The delivery device 100 in this example is a pneumatically operated dosing pump. The dosing piston 125 is coupled kinematically to the pressure piston 122. The aforementioned attachment tip 111 is mounted on the dosing cylinder 124 and is connected to the latter for communication therewith. The pressure cylinder 121 is connected to the ³⁄₂ valve 114 via a hose line 137. A non-return valve 138 (e.g., a check valve, unidirectional valve or the like) is in the hose line 135 connecting the dosing cylinder 124 to the container 130 (with the intervening attachment tip 111). Another non-return valve 139 is located in the attachment tip 111.

In the position of the components as shown in FIG. 5, the pressure cylinder 121 is free of pressure; its pressure piston 122 and the dosing piston 125 are located at their rear limit stops (to the right in the figure) based on restoring force from the restoring spring 123. The space of the dosing cylinder located in front of the dosing piston 124 is filled with active ingredient formulation. By actuation of the trigger 113, the ³⁄₂ valve 114 in a rest position with the restoring spring 114a is actuated to connect the hose lines 136 and 137. In this way, pressurized gas D acts on the pressure piston 122 and pushes the latter, together with the dosing piston 125, forward (to the left in the figure). The active ingredient formulation W located in the dosing cylinder 124 is dispensed with movement of the dosing piston 125 through the attachment tip 111 to the injection tool. After the trigger 113 is released the restoring spring 114a resets the ³⁄₂ valve 114 to its rest position and the hose line 137 is open (or closed depending on a vented or unvented configuration relative to the cylinder 121). The pressure cylinder 121 is rendered free of pressure, and its restoring spring 123 moves the pressure piston 122, together with the dosing piston 125, as far as their rear limit stops. In this way, active ingredient formulation W is aspirated out of the container 130 into the dosing cylinder 124 via the hose line 135 and the non-return valve 138.

The delivery device 100 is equipped with an example single-action pressure piston 122 moved back to its starting position by means of the restoring spring 123. In other examples, the delivery device 100 includes a double-action pressure piston and a corresponding control valve. In this example, the pressure piston is moved pneumatically in both directions and accordingly provides dosed quantity of the formulation W with each movement.

Figure 6:
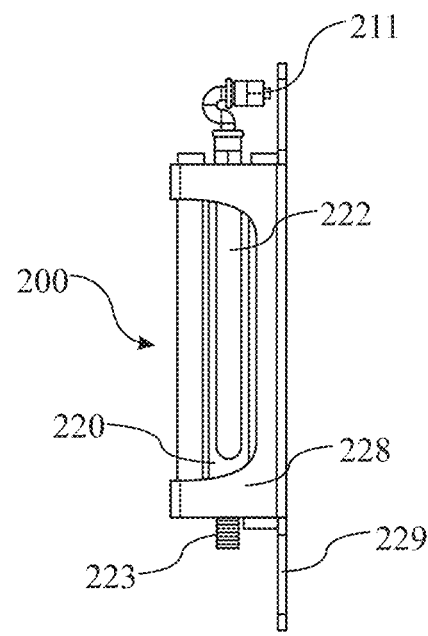
FIG. 6 shows a side view of the second embodiment of the delivery device of the injection system of FIG. 1.
Figure 7:
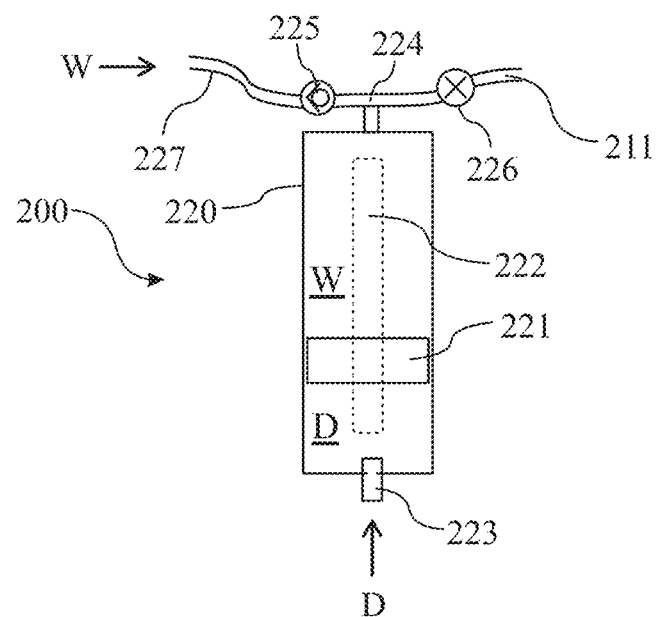
FIG. 7 shows a schematic hydraulics diagram of the delivery device of FIG. 6.

FIGS. 6-7 show a second embodiment of a delivery device 200. The delivery device 200 is configured as a pneumatic feed pump. As shown in the schematic representation in FIG. 7, the delivery device 200 includes a pump cylinder 220 with a pump piston 221 movable therein. A viewing window 222 is optionally included to identify the position of the pump piston 221. A pressurized gas delivery valve 223 (e.g., similar to a bicycle tube valve) is arranged in a lower portion of the pump cylinder 220. Arranged on the lid of the pump cylinder 220 opposite the lower portion there is a T-piece 224 (such as a T-junction), a non-return valve 225 (check valve, unidirectional valve or the like) and, on an opposed side of the T-piece, a shut-off valve 226. Attached to the shut-off valve is a hose line. The hose line in this example, is an attachment part 211 for connection to the injection tool 1 including but not limited to a corresponding socket fitting, pliable hose configured for retention on cleats or the like. A hose line 227 in communication with the active ingredient formulation W is attached to the non-return valve 225.

The pump cylinder 220 is held in a frame 228 shown in FIG. 6. The frame 228 optionally includes a mounting plate 229 to facilitate coupling of the delivery device 200 to a tree trunk, mount or the like.

The pump cylinder 220 is filled with active ingredient formulation W (e.g., a fluid formulation including one or more of a liquid, gas, gel, vapor, aerosol or the like) through the hose line 227 and the non-return valve 225. The pump piston 221 is pressed toward an opposed end (downward in the drawing). A cushion of pressurized gas provided on the opposed side of the pump cylinder 220 through the pressurized gas delivery valve 223. When the shut-off valve 226 is opened the pressurized gas drives the pump piston 221 (upward in the Figure) thereby driving the active ingredient formulation W located in the pump cylinder 220 out of the pump cylinder 220, through the attachment part 211 and into the injection tool 1. The dispensing of the active ingredient formulation W from the delivery device 200 in one example does not take place abruptly, and instead occurs gradually, for instance in an ongoing manner including one or more hours (one hour, two hours or the like). The shut-off valve 226 is optionally omitted if the filling of the pump cylinder 220 with active ingredient formulation W occurs with the attachment part 211 already coupled to the injection tool 1. In another example, the restoring force or bias for the pump piston 221 is provided with a mechanical mechanism including, but not limited to, an actuator motor, biasing element such as a spring or the like.

In another example, a deflectable membrane is provided in the pump cylinder 220. The membrane separates the active ingredient formulation W from the pressurized fluid (e.g., air, hydraulic fluid or the like). In another example, a fluid, such as a hydraulic fluid is included in the pump cylinder 220 for delivery of the formulation, for instance to drive the pump piston 221.

Figure 8:
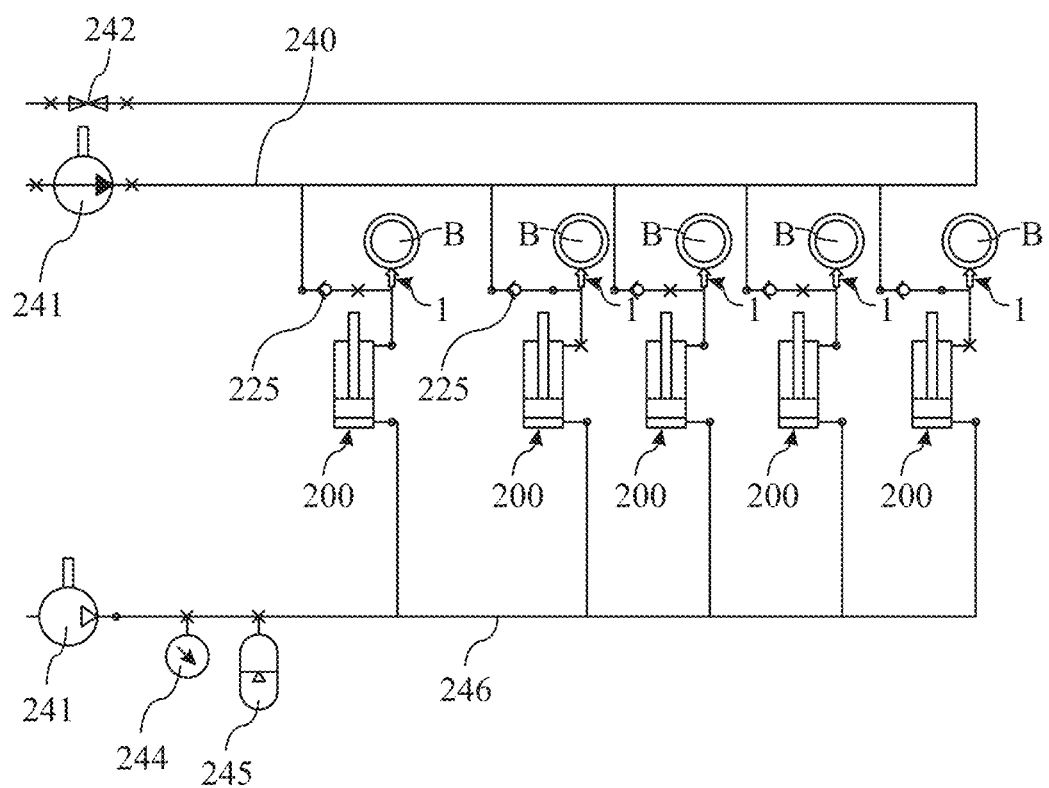
FIG. 8 shows a schematic hydraulics diagram of an assembly of several delivery devices according to FIG. 6.

FIG. 8 is a schematic representation of five delivery devices 200 (of the type shown in FIGS. 6 and 7) are attached to one injection tool 1 inserted into a tree trunk B. The filling of the pump cylinders 220 with active ingredient formulation takes place via an annular line 240 (e.g., a header or main line) including a feed pump 241 connected to a container with active ingredient formulation. A shut-off valve 242 for the line 240 and non-return valves 225 for the five delivery devices 200 are included. A pneumatic pump 243, in combination which a manometer 244 and a pressure reservoir 245, is in communication with the five delivery devices 200 via a hose line 246. The pump 243 provides compressed air or a pressurized fluid (if hydraulic) to the devices 200 to facilitate distribution of the formulation from the respective pump cylinders to the tree trunk B. In another example, the pump 243 is a hydraulic pump that similarly operates the delivery devices 200.

The third embodiment of a delivery device 300 is shown in FIG. 1. The delivery device 300 includes a two-chamber container, or cartridge, having separated chambers. The chambers are arranged in a cartridge-like container 310. One of the separated chambers includes a pressurized medium, such as a pressurized gas. The other separated chamber includes the active ingredient formulation for dispensing through a valve 312. The chambers are optionally separated with a piston or deflectable membrane movable to pump the formulation. The valve 312 is provided with an adapter 311 configured for communication with the attachment opening 11 (e.g., a socket fitting) of the injection tool 1. With coupling of the adapter 311 to the attachment opening 11 the valve 312 is opened, and the pressurized medium in the first chamber of the housing 310 expands and drives the active ingredient formulation in the opposed chamber through the valve 312 and out of the two-chamber package into the injection tool 1. In another example, the valve 312 is a tilt valve such. After coupling of the adapter 311 with the attachment opening 11 the two-chamber container or cartridge tilts downward under its weight and automatically opens the tilt valve.

Alternative embodiments of injection tools according are included herein. In the embodiment shown in FIGS. 9 and 10, the injection tool 2001 has a wedge body profile similar to a nail having a tapered tip. The injection tool embodiment shown in FIGS. 11-13 includes another example of a wedge body profile (e.g., a lance tip or wedge). A common for the injection tools are the self-penetrating capability corresponding to the variations in body profiles. For instance, each of the injection tools described herein is penetrates or is inserted (e.g. hammered, pressed or pushed) into the plant, such as a tree trunk or a stem, without previously provided drilled hole or other recess.

Figures 26, 27:
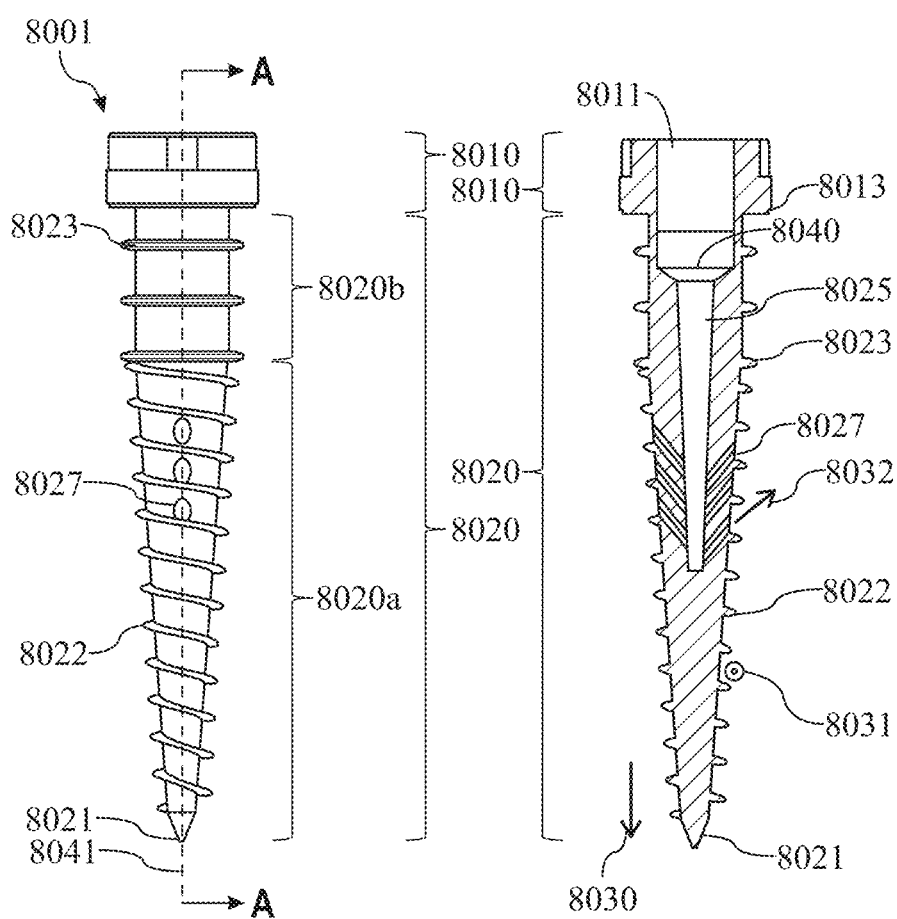
FIG. 26 shows a side view of an eighth embodiment of the injection tool according to the disclosure.
FIG. 27 shows a cross-sectional view along the line A-A of FIG. 26.

FIGS. 26 and 27 show another embodiment of an injection tool 8001 having a shaft type body profile, for instance with a threaded feature. The injection tool has a head 8010 (an example of base) and a shaft 8020 (an example of a penetrating distribution body) having a front screw/drill portion 8020a (a penetrating element) and a rear bead portion 8020b. The front portion 8020a of the shaft 8020 is a penetrating element tapering from the head 8010 (base) toward a distal portion of the tool 8001. The penetrating distribution body includes features of a self-cutting screw. The penetrating element of the injection tool 8001 includes a sharp tip 8021 and threading with a winded or spiral cutting edge 8022. Peripheral beads 8023 (examples of closure beads) are formed on the rear portion 8020*b* (an example closure element) adjoining the head 8010 (the base). The external profile of these peripheral beads 8023 is larger than the external profile of the thread cutting edges 8022 of the front portion 8020*a* to enhance sealing between the tool 8001 and the plant.

As shown in FIG. 27, an outwardly open, cylindrical attachment or socket opening 8011 (e.g., an example of a socket fitting including one or more of an opening or a plug for an opening) is in the head 8010 and is connected by way of an inlet port 8040 with a longitudinal main channel 8025 (an example of an inlet passage). In this example, the main channel 8025 is tapered hole extend toward the tip 8021. Towards its bottom end the main channel 8025 is connected to a plurality of axially and circumferentially spaced outlet channels 8027 (examples of distribution ports). Each of the outlet channels opens between two neighbouring sections of the spiral cutting edge 8022. As previously described the outlet channels 8027 open (e.g., extend, are oriented or the like) transversely relative to a longitudinal body axis of the tool 8001 corresponding to a penetration direction, such as an insertion direction, and are also transverse to the penetrating movement direction (another example of the penetration direction) as the tool 8001 is rotated. Distribution reservoirs are included between the reading 8022 to space the outlet channels 8027 from the body profile of the tool 8001 corresponding to the tapered and threaded profile shown in FIGS. 26, 27. The transverse orientation of the outlet channels 8027 in combination with the distribution reservoirs isolates the outlet channels 8027 from plant tissues during insertion.

The head 8010 (an example of a base) is equipped with a slit, opening or the like for receiving a driver tool. For example, a screw driver is used for rotating the injection tool 8001 for insertion it into a plant along the insertion direction 8030. The insertion direction 8030 extends along a longitudinal body axis 8041 of the injection tool 8001. The injection tool 8001 is made of metal or metal alloy and is optionally produced by a 3D printing method. A lower portion of the head 8010 forms a flange or step including an abutting face 8013, as shown in FIG. 27. In one example, the abutting face 8013 acts as a depth stop and limits insertion of the injection tool 8001 into the plant. Additionally, the abutting face 8013 encloses the penetration of the plant in a similar manner to the peripheral beads 8023 (examples of closure beads) if the tool 8001 is fully inserted into the plant.

While advancing the injection tool 8001 by means of the driver tool, the insertion tool 8001 is rotated and moved along its thread or spiral cutting edge 8022 in another example of a penetrating movement direction 8031. In this example a pitch or angle of the thread 8022 defines the penetrating movement direction 8031. The screwing of the injection tool 8001 also axially moves the injection tool 8001 in the insertion direction 8030.

The outlet channels 8027 are straight and extend in an outlet direction 8032 shown in FIG. 27. The outlet direction 8032 is transverse to the longitudinal body axis 8041 (corresponding to the insertion direction) as well as the penetrating movement direction 8031. For example the outlet direction 8032 of the outlet channels is around 135 degrees relative to the penetrating movement direction 8031 (and the insertion direction 8030). The transverse orientation of the outlet channels 8027 relative to one or both of the penetration directions (e.g., the insertion direction or the penetrating movement direction) isolates the outlet channels from plant matter and accordingly minimizes plugging or clogging of the channels. Accordingly, the outlet channels 8027 (example distribution ports) remain open and ready to distribute formulations after the injection tool transitions from a penetrating configuration (during insertion) to a distribution configuration for treatment of the plant.

Figure 9:
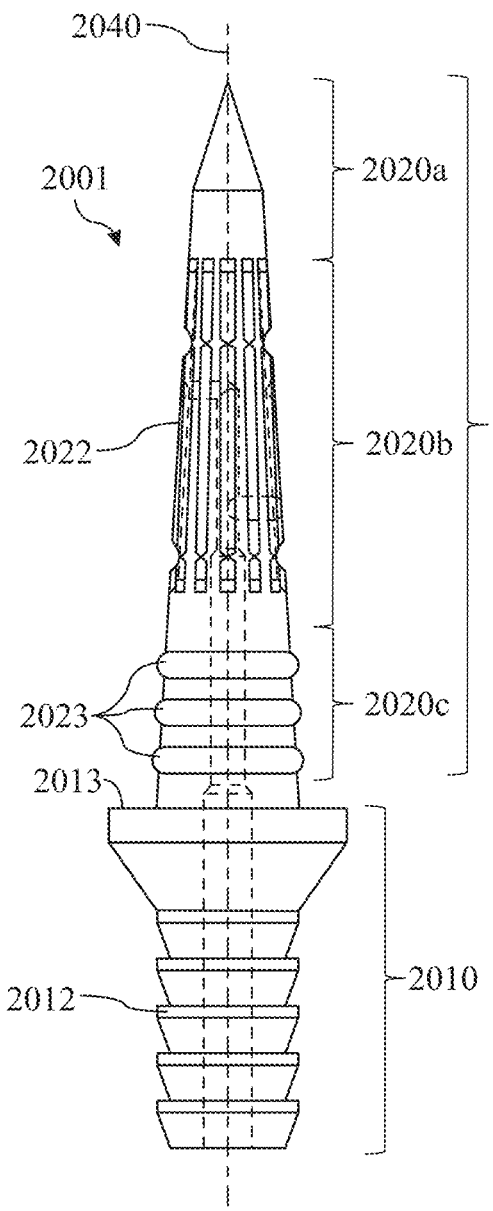
FIG. 9 shows a view of a second embodiment of the injection tool according to the disclosure.
Figure 10:
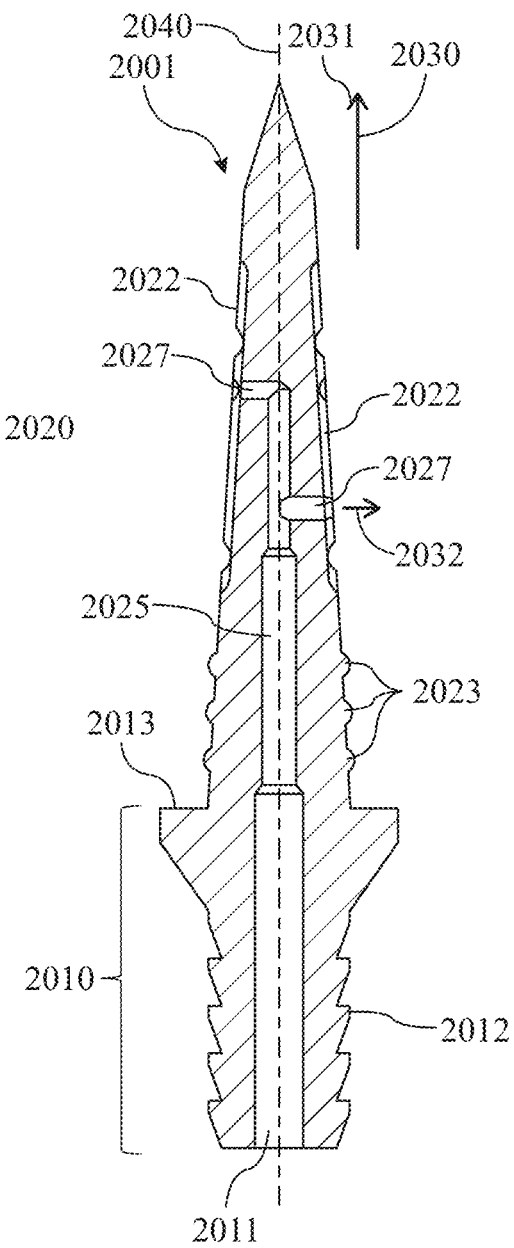
FIG. 10 shows a longitudinal cross-sectional view of the injection tool of FIG. 9.

Another injection tool 2001 having a wedge type body profile (e.g., in this example a tapered nail) is shown in FIGS. 9-10. The injection tool 2001 includes a strike head 2010, for instance a base, and a shaft 2020 or penetrating distribution body divided into three portions. In the example shown in FIGS. 9 and 10, the penetrating distribution body includes a front nail tip portion 2020*a* (an example penetration element), a middle conical portion 2020*b* (an example of a distribution element), and a rear bead portion 2020*c* (an example of a closure element).

The front portion 2020*a* is remote relative to the strike head 2010 with the intervening elements therebetween. The front portion 2020*a*, or penetrating element of the penetrating distribution body tapers from a proximal portion proximate to the strike head 2010 toward a distal portion of the body. In the injection tool 2001 the front portion 2020*a*, or penetrating element, includes a tapered tip (in the manner of a nail) as a cutting element of the penetrating element.

The middle portion 2020*b*, or distribution element in this example tool, is tapered and has one or more furrows or flutes 2022. As described herein, distribution ports are recessed relative to the body profile (e.g., extending along the distal edges of the flutes) to minimize clogging of the ports.

Peripheral beads 2023 (there are three in this example) are formed on the rear portion 2020*c*, or closure element. The rear portion 2020*c* adjoins the strike head 2010. The peripheral profile of the peripheral beads 2023 is, in one example, larger than the corresponding profile of the distal elements, such as the distribution element and penetration element (2020*b*, 2020*a*). The peripheral beads 2023 with the larger profile close the penetration through a plant through engagement of the peripheral beads with the surrounding plant material.

As shown in each of FIGS. 9 and 10, at a transition between the rear portion 2020*c* of the shaft 2020 (e.g., an example penetrating distribution body) and the strike head 2010 (or base) a flange-like step or abutting face 2013 is provided with the strike head 2010. The abutting face 2013 circumferentially extends around the shaft 2020. When the shaft or penetrating distribution body of the injection tool 2001 is inserted into the plant, the abutting face 2013 contacts the plant (with sufficient penetration of the shaft) and limits further advancement of the injection tool 2001 into the plant. Further, the abutting face 2013 provides a larger profile feature than the distribution element 2020*b* and in some examples encloses the interface between the plant and the injection tool 2001 thereby minimizing the ingress of contaminants, pests or the like, while also minimizing leaking of formulation.

As can best be seen in FIG. 10, an outwardly open, cylindrical attachment opening 2011 (an example of an inlet port) is provided in the strike head 2010 and is in communication with a longitudinal main channel 2025 (or inlet passage) of the shaft 2020. Optionally, the strike head 2010 includes a ribbed outer structure 2012 (e.g., attachment cleats) or other example attachment cleats as an alternative to insertion of a corresponding socket fitting into the attachment opening 2011 (e.g., in this example a socket fitting or socket opening). For instance, a hose, tube or the like is coupled with the strike head 2010 and the attachment cleats, such as the ribbed structure 2012, provide a firm hold of the hose.

The longitudinal channel 2025 is, in one example, configured as a blind hole and extends through the rear portion 2020c and the middle portion 2020b of the shaft 2020. In the region of the middle portion 2020b (an example distribution element) of the shaft 2020, radial outlet channels 2027 (an example of distribution ports) extend from the longitudinal channel 2025 and open out laterally in the region of the middle portion 2020b of the shaft 2020 between the furrows 2022 thereof. In one example, the outlet channels 2027 are within a body profile of the injection tool 2001, such as the wedge or tapered shaped of the tool 2001. For instance, the furrows 2022 corresponding to an exterior of the body profile proximate to the outlet channels 2027, and the channels are accordingly recessed relative to the exterior. Optionally, the furrows or flutes 2022 extend around distribution reservoirs (the spaces between flutes) with the outlet channels 2027 therein. The distribution reservoirs promote the distribution of the emerging active ingredient formulation into the surrounding plant tissue, for instance by isolating the outlet channels 2027 from plant material during penetration. In another example, the distribution reservoirs along with proximate plant tissue form cavities, pockets or the like for reception of formulations and to enhance residence of the formulations proximate to the plant tissue (e.g., for enhanced uptake).

The operation of the injection tool 2001 shown in FIGS. 9-10 is similar in some regards to the operation of injection tool 1. In contrast to injection tool 1 (rotated along the threading 22), the injection tool 2001 is driven into the plant such as a tree trunk, for instance with a hammer, pneumatic hammer, by hand or the like. An insertion direction 2030 of the tool 2001 is shown along the longitudinal body axis 2040. While advancing or hammering the injection tool 2001 into the plant, the striking causes a motion along a penetrating movement direction 2031 (an example of a penetration direction) corresponding to the longitudinal body axis 2040. The penetration movement direction 2031, in this example injection tool 2001, also corresponds to the insertion direction 2030 (in contrast to the tool 1 having different directions shown in FIGS. 2 and 3).

As shown in FIG. 10, the outlet channels 2027 (examples of distribution ports) extend laterally or radially from the main channel 2025. For example, the outlet channels 2027 extend or open in a transverse direction relative to the longitudinal body axis 2040 (and the penetration direction or insertion direction 2030). In the example shown in FIG. 10, the outlet channels 2027 open transversely at an angle of approximately 90 degrees relative to the longitudinal body axis 2040. Accordingly, in the example shown in FIG. 10 the outlet channels 2027 extend in an outlet direction 2032 orthogonal (as well as transverse) to the penetrating movement direction 2031 and the insertion direction 2030. In other examples, outlet channels (as shown and described herein) are transverse to one or more penetration directions and a corresponding longitudinal body axis, for instance extending at an angle relative to the longitudinal body axis to isolate the outlet channels and thereby enhance distribution of formulations to the plant.

Figure 11:
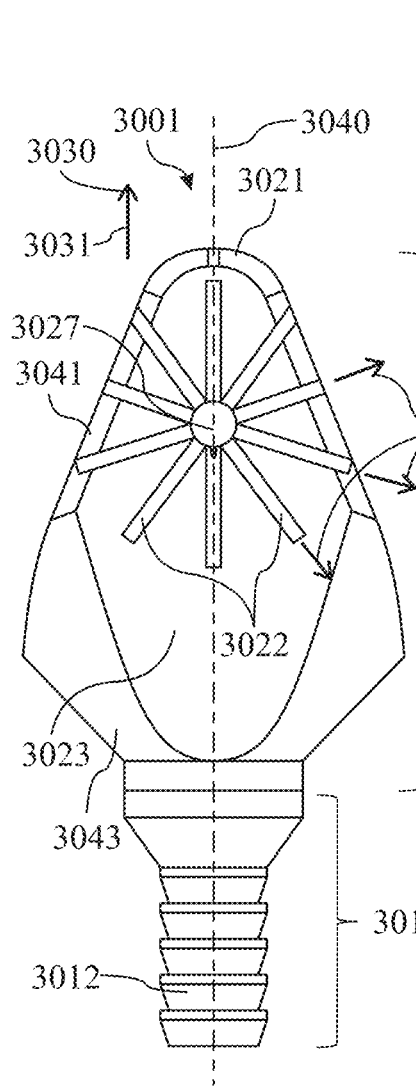
FIG. 11 shows a front view of a third embodiment of the injection tool according to the disclosure.
Figure 12:
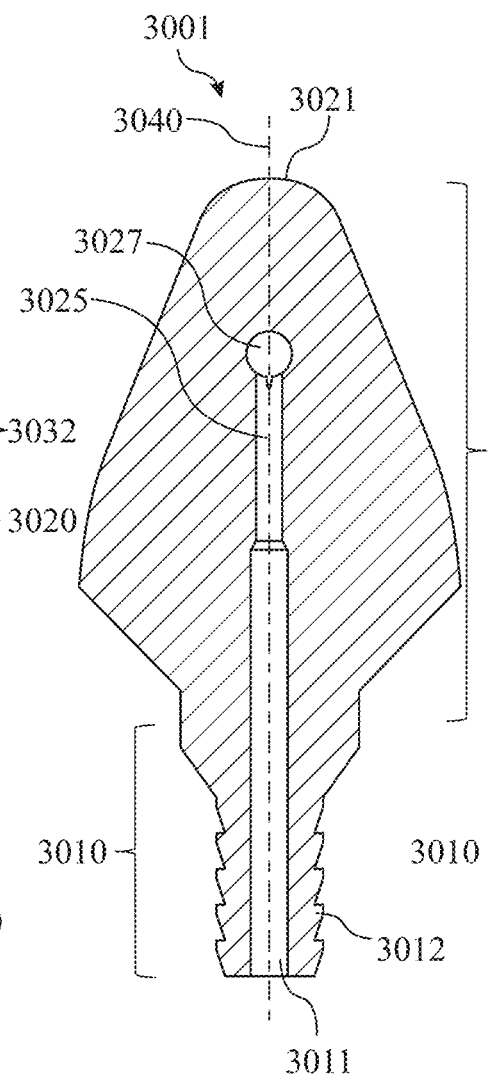
FIG. 12 shows a longitudinal cross-sectional view of the injection tool of FIG. 11.
Figure 13:
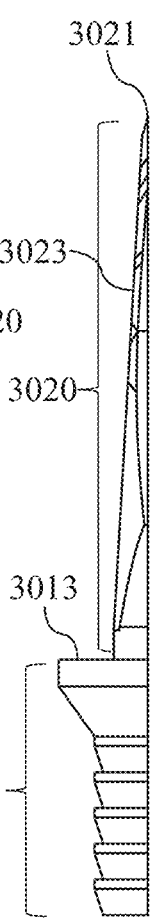
FIG. 13 shows a left hand half of a side view of the injection tool of FIG. 11.

Another injection tool 3001 is shown in FIGS. 11-13. The injection tool 3001 includes another example body profile corresponding to a wedge. In this example, the wedge body profile includes planar surfaces that taper from a proximal portion 3043 (proximate to the base) of a penetrating distribution body toward a distal portion 3041 (proximate to a penetrating element). The injection tool 3001 includes a strike head 3010 (an example of a base) and a wedge portion 3020 (another example of a penetrating distribution body) configured as a lance tip or blade. The wedge portion 3020 includes a penetrating element, such as a cutting element penetrating structure at its front tip 3021. The cutting element includes a cutting edge extending along a leading end of the of the penetrating distribution body (e.g., the wedge portion 3020). As shown in FIG. 13, the cutting element of the penetrating distribution body (the wedge portion 3020) tapers from the proximate the strike head 3010 and accordingly includes the wedge portion having a distribution element (e.g., the portion of the body proximate to the outlet channel 3027 and distribution channels) and a profile similar to a prism. Optionally, the penetrating distribution body includes one or more anchor elements configured to retain the body in a plant after insertion. With a wedge body profile, the anchor elements include the proximal tapered (e.g., tapering toward the base) surfaces, edges or faces of the body.

An attachment opening 3011 (e.g., an example of an inlet port) is provided in the strike head 3010. The attachment opening is in communication with a longitudinal main channel 3025 (an example of an inlet passage) provided in the wedge portion 3020. The strike head 3010 optionally includes a ribbed outer structure 3012 (an example of attachment cleats), to facilitate coupling of a hose onto the strike head 3010.

Referring again to the distribution features of the injection tool 3001, the longitudinal channel 3025 is, in this example, a blind hole and extends approximately into a distal portion 3041 of the wedge portion 3020 (e.g., the penetrating distribution body). An outlet channel 3027 (an example of a distribution port) communicates with the longitudinal channel 3025. The outlet channel 3027 opens on a bevelled facet 3023 of the wedge portion 3020. A star-shaped arrangement of flutes 3022 or channels (e.g., another example of distribution reservoirs) extends along the bevelled flat side 3023 of the wedge portion 3020. As shown in FIG. 11, the outlet channel 3027 opens at a medial location relative to these flutes 3022 and the flutes spread away from the outlet channel. The flutes 3022 extend in various directions across the wedge portion 3020 (e.g. the penetrating distribution body). For instance, some of the flutes 3022 extend rearward toward the strike head 3010 while others extend peripherally (to the sides) and still others extend forward toward the leading end of the wedge portion 3020. The flutes 3022 promote the distribution of the emerging active ingredient formulation into the surrounding plant tissue. For instance, the flutes 3022, example distribution reservoirs, promote the distribution of the emerging active ingredient formulation into the surrounding plant tissue, for instance by isolating the outlet channel 3027 from plant material during penetration. The outlet channel 3027 is recessed within the flutes 3022 and the flutes are proximate an exterior of the wedge body profile. In another example, the flutes 3022 (e.g., distribution reservoirs) along with proximate plant tissue after penetration form cavities, pockets or the like for reception of formulations and to enhance residence of the formulations proximate to the plant tissue (e.g., for enhanced uptake).

As shown in FIG. 13, at a transition between the wedge portion 3020 and the strike head 3010 a step or flange is included. The step or flange is described in some examples as an abutting face 3013. The abutting face 3013 extends laterally relative to the wedge portion 3020. As the injection tool 3001 is inserted into the plant, the abutting face 3013

(with sufficient penetration of the wedge portion) engages the plant and arrests further advancement of the injection tool 3001 into the plant. In one example, the abutting face 3013 engages with the plant and establishes a closed connection between the injection tool 3001 and the plant, for instance to enclose or cover the penetration to the plant.

The third injection tool 3001 functions similarly to the injection tools described herein. In operation, the injection tool 3001 is driven into a plant, for instance with a hammer, pneumatic hammer, manually by hand or the like. The strike head 3010 (e.g., the base) is in one example struck with a hammer into the plant, such as a tree trunk.

The injection tool 3001 is driven in an insertion direction 3030 (an example of a penetration direction) extending along a longitudinal body axis 3040 of the insertion tool 3001. While advancing or hammering the injection tool 3001 into the plant, the striking moves the injection tool 3001 along a penetrating movement direction 3031 (another example of a penetration direction) identical, in this example, to the insertion direction 3030. The wedge body profile of the of the wedge portion 3020 spreads the plant tissue apart with movement of the injection tool. The spreading of the plant tissue, in some examples, minimizes damage to the plant tissue (e.g., removal), and instead biases the plant tissue aside while otherwise maintaining the tissue with the plant. For instance, the capillary system of the plant is maintained with minimal (e.g., no or minimal) trauma to facilitate enhanced update of the active ingredient formulation into the plant.

Referring again to FIG. 11 (and FIG. 12), the outlet channel 3027, a distribution port, is transverse relative to the longitudinal body axis 3040 corresponding to the insertion direction 3030 (and the penetrating movement direction 3031). The transverse orientation of the outlet channel 3027 minimizes the engagement of plant material with the outlet channel 3027 during penetration, and accordingly maintains the channel in an open configuration. As shown in FIG. 11, the flutes 3022 (e.g., elongate distribution reservoirs) of the outlet channels 3027 are linear and extend peripherally in this example from the outlet channel 3027. The flutes 3022 provide various outlet directions 3032 as shown in FIG. 11. For instance, the outlet directions 3032 extend at different angles transverse to each of the penetrating movement direction 3031 and the insertion direction 3030 as well as the longitudinal body axis 3040. Some of the angles are less than 90 degrees, equal to 90 degrees, or larger than 90 degrees (for instance 100 degrees or more). Further, the flutes 3022 that appear parallel to the longitudinal body axis 3040 and the insertion direction 3030 in FIG. 11, are in fact at a transverse angle relative to these features because of the taper of the wedge portion 3020.

Figure 14:
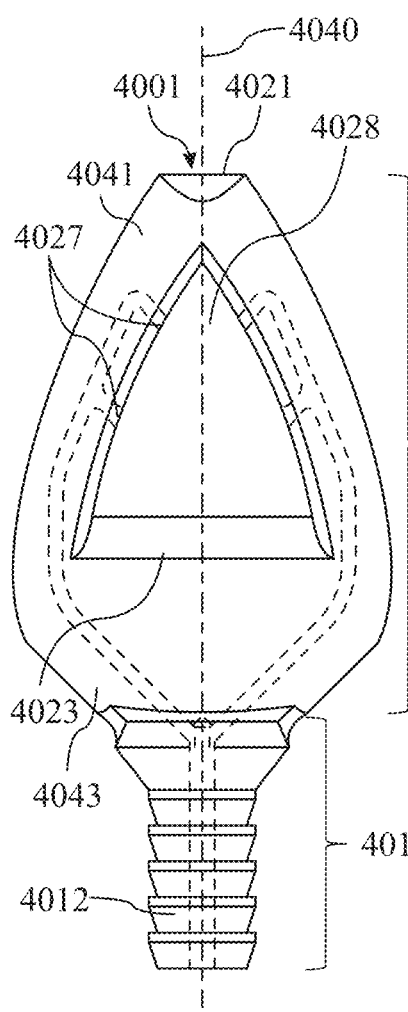
FIG. 14 shows a front view of a fourth embodiment of the injection tool according to the disclosure.
Figure 15:
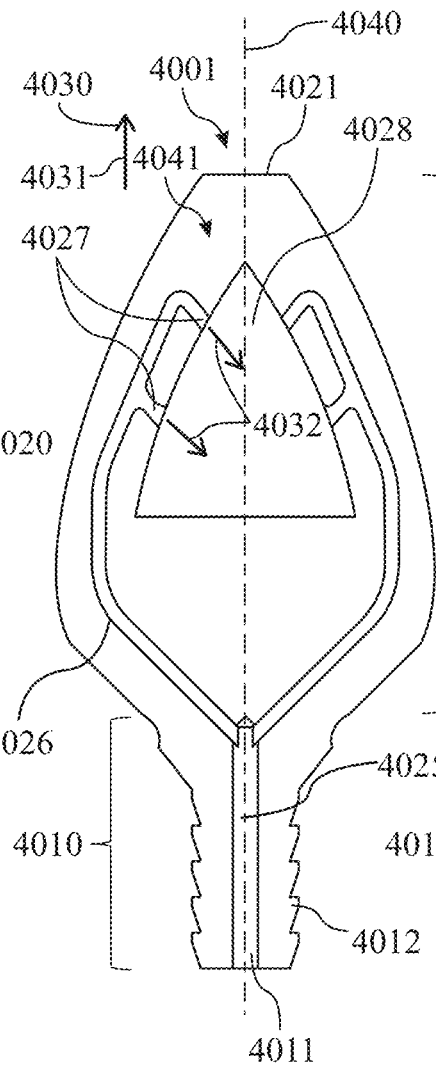
FIG. 15 shows a longitudinal cross-sectional view of the injection tool of FIG. 14.
Figure 16:
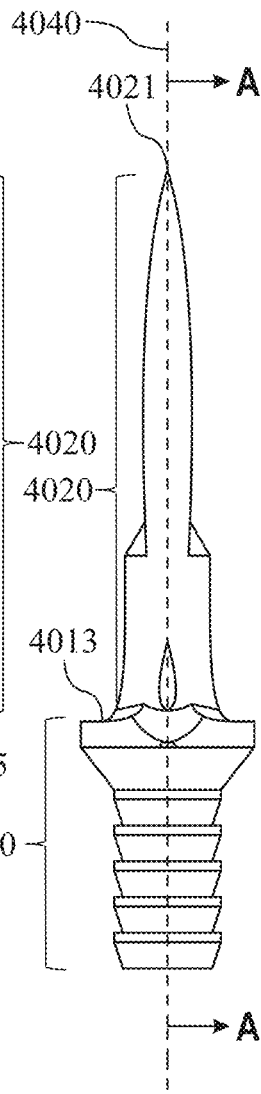
FIG. 16 shows a side view of the injection tool of FIG. 14.

FIGS. 14-16 show another injection tool 4001. The injection tool 4001 includes a wedge type body profile and outlet channels (e.g., distribution ports) transverse to one or more penetrating directions, such as an insertion direction 4030 corresponding to the longitudinal body axis 4040. It has a strike head 4010 (an example of a base) and a wedge portion 4020 (an example of a penetrating distribution body) having a wedge body profile, for instance of a lace tip. The wedge portion 4020 is formed with a sharp edge as cutting edge of a penetrating structure at its front face 4021 or leading end. The wedge portion tapers from a proximal portion 4043 toward a distal portion 4041 of the penetrating distribution body (e.g., toward the front face 4021). The wedge portion 4020 (penetrating distribution body) increases in thickness toward the strike head 4010. The wedge portion 4020 accordingly has a penetrating element corresponding to a tapering part of the wedge between the distal and proximal portions 4041, 4043. As shown in FIGS. 14, 15, the wedge portion 4020 includes a distribution opening 4028 (an example of a distribution reservoir) having a triangular or tapered shape. The distribution opening 4028 is in communication with a plurality of distribution ports (e.g., outlet channels), and the distribution ports are transverse relative to the longitudinal body axis 4040 (and one or more of the penetration directions). In the example tool 4001 shown in FIGS. 14-16 the wedge portion 4020 includes two wing-like portions or legs proximate to the distribution opening 4028 (e.g., connecting the proximal and distal portions 4043, 4041), in other embodiments the wedge portion 4020 includes three, four or more wing-like portions proximate to the opening 4028.

An attachment opening 4011 (an example of an inlet port) is provided in the strike head 4010 and communicates with a main channel 4025 (an inlet passage). The strike head 4010 has a ribbed outer structure 4012, for instance including one or more attachment cleats, configured for coupling a holes with the strike head 4010 (e.g., the base of the tool 4001).

At a transition from the strike head 4010 to the wedge portion 4020 the main channel 4025 splits into intermediate channels 4026. Each intermediate channel 4026 extends along one of the wing-like portions proximate to the opening 4028 toward outlet channels 4027.

As shown in FIG. 14 and the sectional view in FIG. 15, the outlet channels 4027 are provided along the intermediate channels 4026 and open transversely into the distribution opening 4028 (e.g., transverse relative to the longitudinal body axis 4040 and the corresponding penetration direction). For instance, the outlet channels 4027 and the distribution opening 4028 are provided in a portion of the wedge portion (e.g., the penetrating distribution body) referred to as the distribution element. In this example tool 4001 and others herein, the distribution element is at least partially coextensive with the penetration element, such as the wedge body profile of the wedge portion 4020.

The outlet channels 4027 are a distribution element or section for the tool 4001 and extend toward the opening 4028. The outlet channels 4027 extend transversely, and as shown in this example extend backward relative to a forward or insertion direction 4030 of the injection tool 4001. The main channel 4025, intermediate channels 4026 and the outlet channels 4027 form a channel system of the injection tool 4001.

At the transition between the strike head 4010 (e.g., the base of the tool 4001) and the wedge portion 4020 (e.g., the penetrating distribution body of the tool 4001) an abutting face 4013 is included. The abutting face 4013 extends relative to the wedge portion 4020. AS the injection tool 4001 is inserted into the plant the abutting face 4013 engages the plant and arrests further insertion into the plant. As previously described, the abutting face 4013 encloses (at least partially) the opening made in the plant with the wedge portion 4020.

The operation of the injection tool 4001 of FIGS. 14-16 is similar to the other injection tool examples described herein. For instance, the injection tool 4001 is optionally driven into the plant (e.g., is struck with a hammer, manually pushed into the plant or the like), such as a tree trunk. The injection tool penetrates and moves into the plant along the insertion direction 4030 corresponding to the longitudinal body axis 4040 of the tool 4001. Movement of the injection tool 4001 into the plant, for instance with striking, causes motion along a penetrating movement direction 4031, that is in this example, parallel to the insertion direction 4030.

Because of the wedge body profile of the wedge portion 4020, the plant material is spread with insertion of the injection tool 4001 into the plant. Spreading of the plant material minimizes (e.g., eliminates or minimizes) trauma to the interior of the plant. For instance, the capillary system of the plant is preserved or protected to enhance the distribution and update of the active ingredient formulation to the plant.

As shown in FIG. 15, the outlet channels 4027 (e.g., distribution ports) open in an outlet direction 4032 toward the central opening 4028 (e.g., a distribution reservoir). The outlet direction 4032 is transverse to the penetration directions and the longitudinal body axis 4040 corresponding to at least the insertion direction of the penetration directions. For example, as shown in FIG. 15, the outlet channels 4027 are angled approximately 135 degrees relative to the penetrating movement direction 4031. The orientation of the outlet channels 4027 minimizes the engagement of the channels with plant material by isolating the channels from the (relatively) oncoming plant material during insertion thereby maintaining the outlet channels 4027 in an open configuration. Accordingly, plant tissues or material, such as fibers or the like are diverted from the outlet channels 4027 by the wedge portion 4020 during insertion of the injection tool 4001 (e.g., a penetration configuration) into the plant to maintain the channels 4027 in an open configuration during a distribution configuration.

Additionally, the distribution reservoir (e.g., distribution opening 4028) enhances the isolation of the outlet channels from plant material by opening the body profile to facilitate positioning of the openings in a recessed location relative to the exterior of the body profile. Further, the distribution reservoir (e.g., distribution opening 4028) provides a cavity for reception of the formulations. In combination with surrounding plant tissue the distribution reservoir maintains the formulation in close proximity or engagement with the plant tissue surrounding the reservoir.

FIGS. 17-19 show an injection tool 5001 having another example of a wedge body profile. The injection tool 5001 has a strike head 5010 (an example of a base) and a wedge portion 5020 (an example of a penetrating distribution body) configured, in this example, as a lance tip. As shown in FIG. 17, The wedge portion 5020 includes a penetrating element having a sharp edge as a cutting element. The cutting element is provided along the front face 5021 (e.g., a leading edge) and the penetrating element in this examples extends from the distal portion 5041 to the proximal portion 5043. For instance, the wedge body profile of the wedge portion increases, increases in thickness toward the strike head 5010, as shown in FIG. 19.

The strike head 5010 has an axially ribbed outer structure 5012 to facilitate grasping of the strike head 5010, and optionally coupling with a corresponding fitting (e.g., of a hose, dispensing device or the like). At the transition between the strike head 5010 (the base) and the wedge portion 5020 (the penetrating distribution body) a step or flange is provided, an abutting face 5013. The abutting face 5013 extends relative to the wedge portion 5020, and limits insertion of the tool and engages with the plant material to facilitate covering of the penetration of the plant.

Referring again to FIG. 19, the strike head 5010 in this example includes an inlet port, such as the attachment opening 5011. The attachment opening 5011 in this example is a separate component relative to the remainder of the base (e.g., the strike head 5010). For example, the attachment opening 5011 is provided as a port for the base. As shown in FIG. 19, the attachment opening 5011 communicates with distribution ports, such as the outlet channels 5027 through a main channel 5025 (e.g., an inlet passage). The main channel 5025 extends from the attachment opening 5011 diagonally in an upward direction to intermediate channels 5026 provided in the wedge portion 5020. Each intermediate channel 5026 vertically extends between two adjacent distribution reservoirs (e.g., openings 5028). The left intermediate channel 5026 is between the left-hand openings 5028 and the right intermediate channel 5026 is between the right-hand openings 5028.

Plural outlet channels 5027 (in this example two) are provided with each of the intermediate channels 5026. The outlet channels 5027 open (e.g., extend, direct formulations or the like) in a transverse direction relative to an insertion direction of the tool 5001, for instance corresponding to the longitudinal body axis 5040. Like this, liquid active ingredient formulation are delivered from the openings 5028 into the plant. For instance, the openings 5028 (examples of distribution reservoirs) are in communication with respective outlet channels 5027. Formulations delivered from the outlet channels 5027 fill the openings 5028. The openings 5028 are surrounded by plant tissue in a distribution configuration (after penetration) and the injection tool 5001, including the openings 5028, accordingly retains the formulation in engagement with the surrounding plant tissue for uptake. The injection tool 5001, including those portions of the penetrating distribution body (the wedge portion 5020) surrounding the openings 5028 and the surrounding plant tissue thereby retain the formulation in pockets or cavities to facilitate update of the formulation.

As further shown in FIG. 18, the outlet channels 5027 extend transverse relative to the a forward or insertion direction 5030 of the injection tool 5001 corresponding to the longitudinal body axis 5040 (and the intermediate channels 5026). For instance, the outlet channels 5027 are directed toward the strike head 5010 (also referred to as the base of the tool 5001). The main channel 5025, the intermediate channels 5026 (collectively inlet passages) and the outlet channels 5027 (e.g., distribution ports) form a channel system of the injection tool 5001.

The operation of the injection tool 5001 shown in FIGS. 17-19 is similar to the operation of the other injection tools described herein. In a penetrating configuration, the injection tool 5001 is driven into the plant, such as a tree trunk, with striking from a hammer, manual insertion, an introducer configured to install the tool 5001 or the like. As shown in FIG. 19, with separate connection nozzle (e.g., the attachment opening 5011) provided, the strike head 5020 is isolated from the opening and is suitable (e.g., is mechanically robust) for receiving comparably strong strikes, for instance for penetration of plants having organized or robust materials, tissues or the like.

An insertion direction 5030 is shown in FIG. 18 and is an example of a penetration direction. The insertion direction 5030 extends along (e.g., is parallel to, or within a few degrees) of the longitudinal body axis 5040 of the insertion tool 5001. Driving of the injection tool 5001 into the plant moves the injection tool 5001 along a penetrating movement direction 5031, and in this example, the penetrating movement direction 5031 corresponds to the insertion direction 5030. Because of the wedge body profile of the tool 5001 the plant material is spread apart by the injection tool 5001. As mentioned above, by spreading the plant material trauma to the interior structure of the plant is minimized.

In the distribution configuration (e.g., after penetration and installation of the tool 5001) the outlet channels 5027 receive and distribution the formulation transversely relative to the longitudinal body axis 5040 and relative to the insertion direction (e.g., corresponding to the axis). As shown in FIG. 18, the outlet channels 5027 open into and correspondingly direct the formulation into the distribution openings 5028 (e.g., distribution reservoirs). As shown in FIG. 18, the outlet channels 5027 extend in an outlet direction 5032 toward the openings 5028. In this example injection tool 5001, the outlet direction 5032 is transverse, for instance at an angle of approximately 125 degrees relative to the penetrating movement direction 5031, the insertion direction 5030 (collectively penetration directions) and the corresponding longitudinal body axis 5040. The transverse configuration of the outlet channels 5027 in addition to the position of the channels within the distribution openings 5028 isolates the channels 5027 from engagement with the plant material during insertion, and accordingly minimizes plant material, such as fibres or the like, from plugging the outlet channels 5027, for instance during insertion of the injection tool 5001 into the plant.

The injection tools 6001, 7001 shown in FIGS. 20-25 are, in various examples, configured for use with less robust plants (e.g., softer trees, vines, stems or the like) typically having a softer shell. For instance, the previously described injection tools may have length of 50 mm or greater. In one example, these injection tools include penetrating distribution bodies (e.g., wedge or shaft body profiles) with a length of 35 mm or greater and a width of 30 mm or greater. In contrast, the example injection tools 6001, 7001 shown in FIGS. 20-25 in some examples have total lengths of between around 6 mm and 16 mm.

FIGS. 20-22 show an injection tool 6001 having a wedge portion 6020, such as a penetrating distribution body having a wedge type body profile. The injection tool 6001 includes a strike head 6010 (an example of a base) and the wedge portion 6020 (an example of a penetrating distribution body). The wedge portion 6020 includes a cutting element. For example the wedge portion 6020 includes a cutting edge along the front face 6021 directed distally away from the strike head 6010. The wedge portion 6020 includes at least partially coextensive penetration and distribution elements. For example, the penetrating element extends from the cutting edge along the front face 6021 and proximate to a distal portion 6041 to a proximal portion 6043 of the wedge portion 6020. Similarly, the distribution element 6012 (including the outlet channels 6027 and distribution openings 6028) are within the penetrating element of the wedge portion 6020. As shown in the side view of FIG. 22, the penetrating element of the wedge portion 6020 increases in thickness from the distal portion 6041 toward the proximal portion 6043 and the strike head 6010.

The strike head 6010 optionally includes a ribbed outer structure 6012, such as attachment cleats, to facilitate grasping of the strike head 6010 and to securely connect the injection tool 6001 with a delivery device. At the transition between the strike head 6010 and the wedge portion 6020 a step is provided. The step forms an abutting face 6013. The abutting face 6013 extends relative to (e.g., away from) the wedge portion 6020. During insertion of the injection tool 6001 the abutting face 6013 contacts the plant and arrests further advancement of the injection tool 6001 into the plant. In comparison to the abutting faces of other injection tools described herein the abutting face 6013 is relatively large in comparison to the associated wedge portion 6020 (e.g., they have a similar size). The larger abutting face 6013 facilitates use with smaller and less robust plants having a comparably soft shell or boundary. The relatively large abutting face distributes forces from insertion over the correspondingly large face 6013 and thereby minimizes trauma to the plant. The abutting face 60313 further provides an enclosing face for the injection tool 6001 for establishing a robust coupling with the plant.

As shown in FIGS. 21 and 22, the strike head 6010 is includes an attachment opening 6011 (e.g., an example of an inlet port). The attachment opening 6011 is in communication with the outlet channels 6027 and the distribution openings 6028, for instance with a main channel 6025 (e.g., an inlet passage). As shown in FIGS. 20 and 21, outlet channels 6027 (e.g., distribution ports) are in communication with the main channel 6025 and open transversely into the respective distribution openings 6028 (e.g., distribution reservoirs).

Fluid active ingredient formulation is delivered from the outlet channels 6027 transversely, for instance relative to the longitudinal body axis 6040 and the corresponding insertion direction 6030, into the distribution openings 6028. The distribution openings 6028 retain the formulation in residence proximate to adjacent plant tissues. In the example shown in FIG. 21, the outlet channels 6027 extend proximally toward the strike head 6010 and transverse relative to the insertion direction 6030 of the injection tool 6001. The main channel 6025 and the outlet channels 6027 form a channel system of the injection tool 6001.

The operation of the injection 6001 is similar in at least some regard to other injection tools described herein. Because of the relatively small profile of the injection tool 6001 (or contracted forms of the other tools) the injection tool 6001 is readily inserted and installed in comparably small plants or less robust plants having a softer plant material (e.g., tissues or the like). For instance, the injection tool 6001 is configured for softened striking or manual pressing of the tool 6001 into the plant, for instance into a stem.

As shown in FIG. 21, the injection tool 6001 is inserted along an insertion direction 6030 corresponding to the longitudinal body axis 6040 of the insertion tool 6001. While advancing the injection tool 6001 into the plant the tool moves along a penetrating movement direction 6031, and in the example shown the insertion direction 6030 corresponds with the penetrating movement direction 6031. In a similar manner to the other injection tools having a wedge type body profile and described herein the wedge portion 6020 of the injection tool 6001 spreads the plant material aside as the tool 6001 is inserted into the plant. Spreading of the planter material minimizes trauma to the plant material, and in some examples facilitates enhanced uptake of formulations.

As further shown in FIG. 21, the outlet channels 6027 (e.g., distribution ports) extend in an outlet direction 6032 toward the distribution openings 6028 (e.g., distribution reservoirs). The outlet direction 6032 is transverse to the to the penetrating movement direction 6031 (and the longitudinal body axis 6040). For example, the outlet direction 6032 is misaligned with the penetrating movement direction 6031, the insertion direction 6030 (collectively penetration directions) and the longitudinal body axis 6040 with an angle of 125 degrees or the like. The transverse orientation of the outlet channels 6027 isolates the outlet channels 6027 from plant material otherwise introduced into the outlet channels with insertion. Further, the distribution openings 6028 (e.g., distribution reservoirs) facilitate positioning of the outlet channels 6027 within the body profile, for instance recessing the channels 6027 from an exterior of the body profile.

Figures 23, 24, 25:
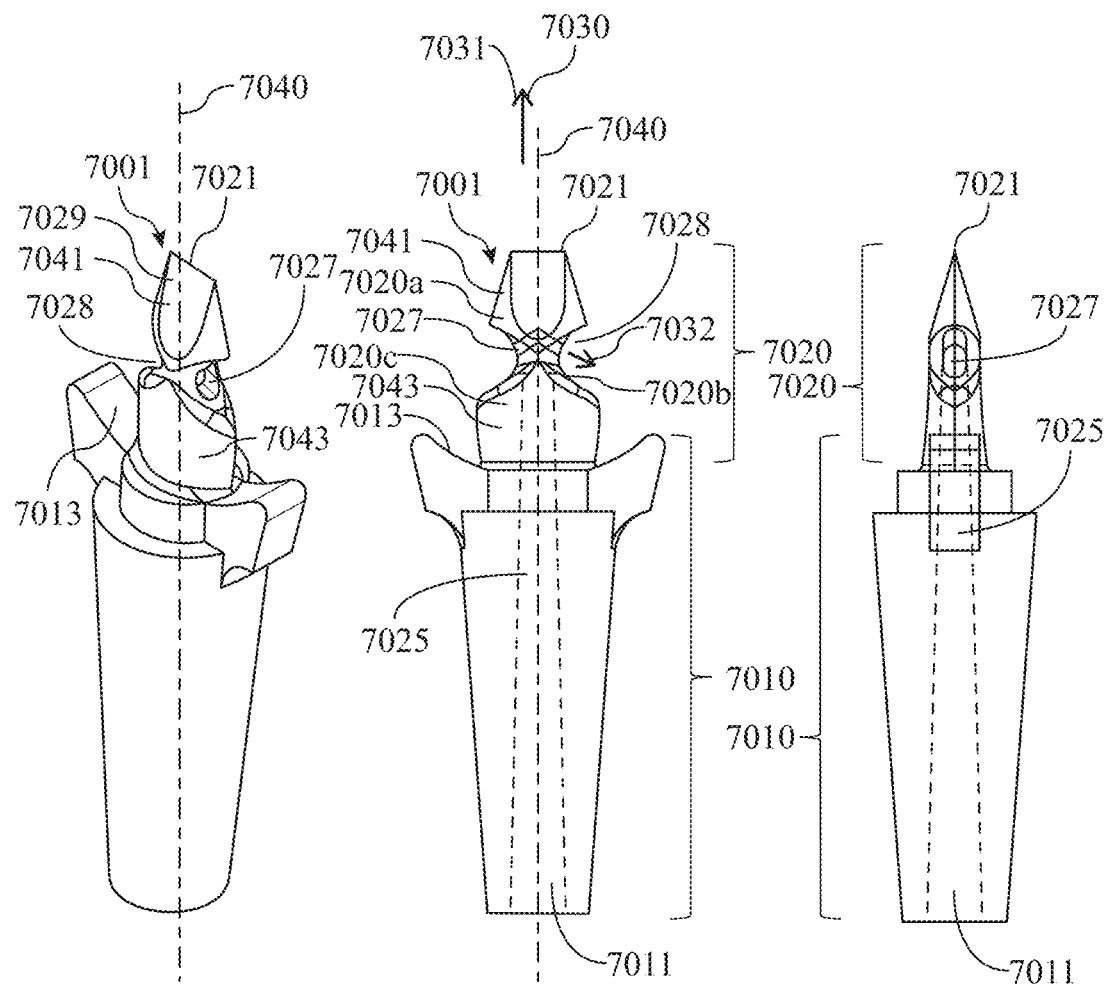
FIG. 23 shows a perspective view of a seventh embodiment of the injection tool according to the disclosure.
FIG. 24 shows a front view of the injection tool of FIG. 23.
FIG. 25 shows a side view of the injection tool of FIG. 23.

FIGS. 23-25 another embodiment of an injection tool 7001 having a wedge type body profile. In a similar manner to other injection tools described herein the injection tool 7001 includes a strike head or body 7010 (e.g., a base) and a head with a wedge portion 7020 (e.g., a penetrating distribution body). The body 7010 or base of the injection tool 7001 is conical in this example and tapers toward the attachment opening 7011. The wedge portion 7020 is formed with a sharp edge as a cutting element of a penetrating structure at its distal front face 7021 or leading end. The wedge portion 7020, as seen in FIG. 25, increases in thickness toward the body 7010. The penetrating element of the wedge portion 7020 in this example extends between the distal and proximal portions 7041, 7043, and corresponds with a distribution element of the wedge portion including the outlet channels 7027 and the lateral recesses 7028.

As shown in FIGS. 23 and 24, the wedge portion 7020 includes a distribution element having lateral recesses 7028 (examples of distribution reservoirs) forming a neck section 7020b. The neck section 7020b separates the wedge portion 7020 into an upper cutting section 7020a and a lower spreading section 7020c. The cutting section 7020a (an example of a penetrating element) includes one or more cutting elements such as the leading edge of the wedge body profile configured to cut or open the plant with insertion of the injection tool 7001 into the plant. The spreading section 7020c of the wedge portion 7020 widens the penetration provided by the cutting section 7020a to generate a cavity inside the plant for the remainder of the wedge portion 7020. In another example, the spreading section **7020*c* cooperates with the lateral recesses 7028 to spread the plant material and facilitate residence of the fluid formulations in the lateral recesses 7028** proximate to plant tissues in a similar manner to the distribution reservoirs described with other injections tools herein.

As seen in FIGS. 24 and 25, the body 7010 includes an attachment opening 7011 (an example of an inlet port) that opens into a central main channel 7025 (e.g., an inlet passage). The main channel 7025 extends from the attachment opening 7011 through the neck section **7020*b* of the wedge portion 7020. Outlet channels 7027 extend from the main channel 7025 transversely. As shown in FIGS. 23 and 24, the outlet channels 7027 open transversely into the lateral recesses 7028. The fluid active ingredient formulation is delivered transversely from the outlet channels 7027 into the lateral recesses 7028**.

As shown in FIG. 24, the outlet channels 7027 transversely extend relative to an insertion direction 7030 of the injection tool 7001 corresponding to a longitudinal body axis 7040. For instance, the outlet channels 7027 extend toward the body 7010 (e.g., the base). The main channel 7025 and the outlet channels 7027 form a channel system of the injection tool 7001.

At the transition between the body 7010 and the spreading section **7020*c* of the wedge portion 7020 a step is formed. The step is a curved abutting face 7013 in this example. The abutting face 7013 is curved in a manner corresponding with the profile of the plant, for instance a rounded stem, that receives the injection tool 7001. As the injection tool 7001 is inserted into the plant the curved abutting face 7013 couples in surface to surface contact with the stem and arrests further advancement of the injection tool 7001 into the plant. The advancement of the injection tool 7001 is arrested in a relatively gentle manner with the curved configuration of the abutting face 7013 to minimize trauma to the plant. Additionally, as with other embodiments described herein, the abutting face 7013 establishing a robust coupling between the injection tool 7001 and the plant, and encloses the penetration formed with the wedge portion 7020**.

The operation of the injection tool 7001 shown in FIGS. 23-25 is similar in some regards to the other example injection tools described herein. For example, the injection tool 7001 is inserted (e.g., struck, pressed or the like) into the plant, such as a stem. The injection tool 7001 is inserted along the insertion direction 7030 generally corresponding with a longitudinal body axis 7040 of the insertion tool 7001. The injection tool 7001 moves along a penetrating movement direction 7031, and in this example, the penetrating moving direction 7031 corresponds to the insertion direction 7030.

The penetration of the plant with the wedge portion 7020 spreads the plant material in a similar manner to other wedge type injection tools described herein. With the wedge portion 7020 (e.g., the penetrating distribution body) installed in a penetrating configuration the injection tool 7001 assumes a distribution configuration.

In the distribution configuration, the fluid formulation is distributed from the outlet channels 7027 (e.g., the distribution ports) transversely to the openings or lateral recesses 7028 (e.g., distribution reservoirs). The liquid formulation is supplied to the lateral recesses 7028 and resides within the recesses in proximity to and engagement with adjacent plant material. With the fluid formulation residing in the lateral recesses 7028, the plant may gradually update the formulation for instance without or with minimal applied delivery pressure to the formulation.

FIGS. 28, 29 and 30 show another example of an injection tool 300. As in previous examples, the injection tool 300 includes a base 302 and a penetrating distribution body 304 extending from the base. As shown in FIG. 28, the penetrating distribution body 304 includes a body profile 308 including, in this example, a wedge profile. The body profile 308 in FIG. 28 and FIG. 29 is shown in dashed lines and includes, but is not limited to, one or more of, the shape, contour, size, texture or the like of the penetrating distribution body 304. As shown, the penetrating distribution body 304 additionally includes a distribution element 312. The distribution element 312 includes one or more distribution ports 314 spaced from a penetrating element, such as the penetrating element 310 including the leading edge of body profile 308. As previously described, the one or more distribution ports 314 distribute liquid formulation transversely (e.g., in a different direction) relative to a longitudinal body axis 306 corresponding to the direction of insertion of the injection tool 300 into a plant.

Referring again to FIG. 28, the injection tool 300, as previously described, includes a body profile 308, such as the wedge profile in this example. As shown, the wedge body profile 308 tapers from the proximal portion 307 of the penetrating distribution body 304 to the distal portion 305 of the distribution body 304. The wedge profile 308 facilitates the penetration and delivery of the injection tool 300 into the plant tissue of the plant. Additionally, the penetrating distribution body 304 optionally includes one or more anchor elements 316. In this example, the body profile 308 includes one or more flanges, surfaces, corners or the like to couple the penetrating distribution body 304 with corresponding tissues of the plant and optionally retain the penetrating distribution body 304 in the plant in an ongoing manner, for instance, for distribution of liquid formulations over a plurality of hours, such as one hour, two hours or more.

As further shown in FIGS. 28 and 30, the distribution element 312, in an example, includes one or more distribution reservoirs 322 in communication with the distribution ports 314. As previously described with regard to other embodiments, the distribution reservoirs 322 are configured to receive liquid formulations administered through the distribution ports 314. The distribution reservoirs 322, in another example, facilitate the residence of the liquid formulation in the distribution reservoirs while the penetrating distribution body 304 is retained within the plant. For instance, the surfaces of the penetrating distribution body 304 surrounding the distribution reservoirs 322 as well as the adjacent plant tissue form pockets, cavities or the like within the plant and the body 304 configured to hold and retain liquid formulations therein for gradual uptake into the plant tissue. The distribution reservoirs 322 are provided in a distributed pattern across the penetrating distribution body 304, and are optionally larger than the distribution ports 314, to enhance the amount (area) of plant tissue contacted with the liquid formulations.

Figure 29:
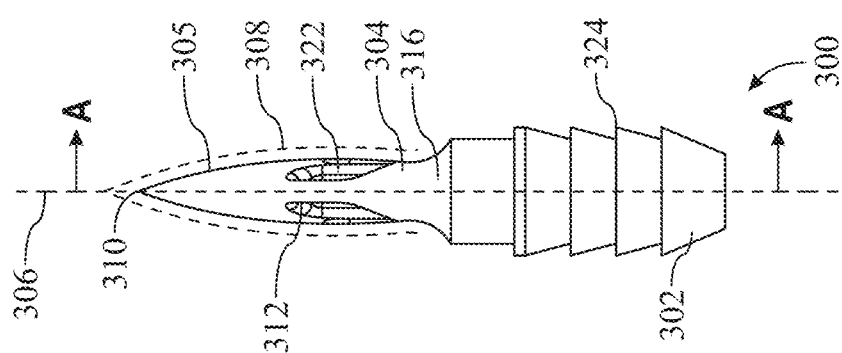
FIG. 29 shows a side view of the injection tool of FIG. 28.
Figure 28:
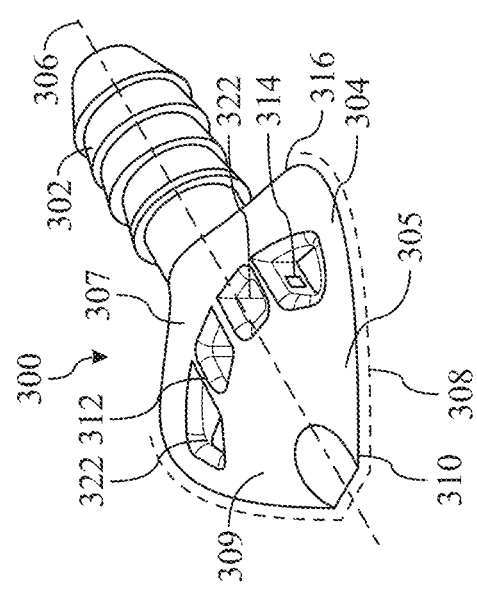
FIG. 28 shows a perspective view of a ninth embodiment of an injection tool according to the disclosure.

As shown in FIG. 28 and further shown in FIG. 29, the distribution reservoirs 322 and the distribution ports 314 are, in one example, within the body profile 308 and accordingly substantially isolated (e.g., concealed, shielded, sheltered, separated, shrouded or the like) from plant tissues during insertion of the injection tool 300 into a plant. In another example, the distribution reservoir 322, distribution ports 314 or the like are recessed from a body profile exterior 309 of the body profile 308. By recessing the distribution element 312 including, for instance, the distribution ports 314 and the distribution reservoirs 322 relative to the body profile exterior 309 during delivery or penetration of the injection tool 300 into the plant tissue, the plant tissue does not otherwise engage or infiltrate the distribution reservoirs 322 or the distribution ports 314 in a meaningful manner that would otherwise clog the distribution ports 314 or fill the distribution reservoirs 322 to prevent residence of the liquid formulation therein.

As shown in FIG. 29, the distribution reservoirs 322 are within the body profile 308 of the penetrating distribution body 304. For instance, as shown in FIG. 29, the dashed line of the body profile 308 extends around the distribution reservoirs 322 with the reservoirs 322 therein. Accordingly, the distribution reservoirs 322 are isolated from plant tissues during penetration. For instance, one or more of the penetrating element 310 or the remainder of the penetrating distribution body 304 conceals or shrouds the distribution element 312 (e.g., including one or more of the ports 314 and the reservoirs 322) from plant tissue during penetration. In one example, the penetrating element 312 provides a penetrating element profile or penetration profile. The distribution element 312 including one or more of the ports 314 or reservoirs 322 is within the penetration profile during penetration in a direction along longitudinal body axis 306. The penetration profile (e.g., shape, dimensions such as cross sectional area or the like) is larger than and axially aligned with at least one of the distribution ports 314 or distribution reservoirs 322. Accordingly, the ports 314 and reservoirs 322 within the penetration profile are isolated from the plant tissues engaged by the penetration element 310 during penetration. For example, the distribution element 312 including one or more of the distribution ports 314 and the distribution reservoirs 322 are concealed behind the penetration profile (e.g., corresponding to the cross sectional profile of the penetrating distribution body 304). Accordingly, the distribution element 312 including one or more of distribution ports 314 or distribution reservoirs 322, are isolated from engagement with plant tissues, for instance, during insertion of the injection tool 300 into the plant. Accordingly, the ports 314 and distribution reservoirs 322 remain open and are less prone to clogging and thereby facilitate administration of the liquid formulations while in a distribution configuration, for instance, with the penetrating distribution body 304 placed and retained within the plant.

Referring again to the side view of the injection tool 300 in FIG. 29, the base 302 of the tool 300 includes, in one example, one or more attachment cleats 324 including flanges, barbs or the like. The attachment cleats 324 couple with one or more features of the distribution devices described herein including, but not limited to, hoses of the distribution devices, fittings or the like. In one example, the attachment cleats 324 retain features such as fittings, hoses or the like in an ongoing manner to facilitate the ongoing administration of liquid formulations through the injection tool 300.

Figure 30:
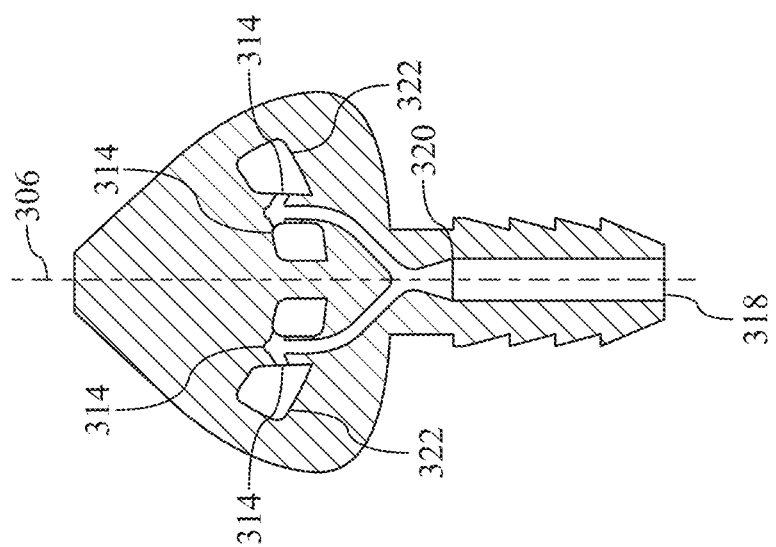
FIG. 30 shows a cross-sectional view along the line A-A of FIG. 29.

FIG. 30 is a cross sectional view of the injection tool 300 taken along the sectional line A-A in FIG. 29. As shown in FIG. 30, the injection tool 300 includes the distribution reservoirs 322 arranged in a distributed pattern across the penetrating distribution body 304. For instance, in the example shown, a plurality of distribution reservoirs 322 are interspersed between the distribution ports 314. The distribution ports 314 each open into respective distribution reservoirs 322. In one example, an inlet passage 320 provides the liquid formulation from an inlet port 318 of the injection tool 300 to the distribution ports 314 for distribution into the distribution reservoirs 322.

As further shown in FIG. 30, the distribution ports 314, in this example, have a transverse orientation (e.g., a different angular orientation) relative to the longitudinal body axis 306. For instance, as shown in FIG. 30, the example distribution ports 314 open or extend at an angle of approximately 105 degrees relative to the longitudinal body axis 306. Accordingly, in this example, the distribution ports 314 are turned or directed in a reverse manner, for instance, toward the base 302 of the injection tool 300 and away from the penetrating element 310 of the penetrating distribution body 304. In other examples, as described and shown herein, the distribution ports are arranged in a variety of configurations with the ports 314 opening in transverse directions different relative to the longitudinal body axis 306. The distribution ports shown in FIG. 30 and in other embodiments herein open, extend or are directed relative to the longitudinal body axis 306 (e.g., corresponding to a penetration direction) to facilitate the distribution of fluids in a direction different than the orientation of the longitudinal body axis 306. For instance, and as described previously herein, the liquid formulations are distributed from the distribution ports 314 along angles varying by 5 or more degrees relative to the longitudinal body axis 306. In other examples, the distribution ports 314 are spaced or recessed from the longitudinal body axis 306. In the example shown in FIG. 30, the distribution ports 314 are each spaced from the longitudinal body axis 306 (and spaced from the penetration element 310) and also directed in a transverse orientation (e.g., a different angle relative to the axis 306). In a distribution configuration, the liquid formulations are accordingly distributed in a different direction from the distribution ports 314 relative to the direction of insertion of the penetrating element 310 and the penetrating distribution body 304 in a penetrating configuration (e.g., generally along the longitudinal axis 306).

Figure 33:
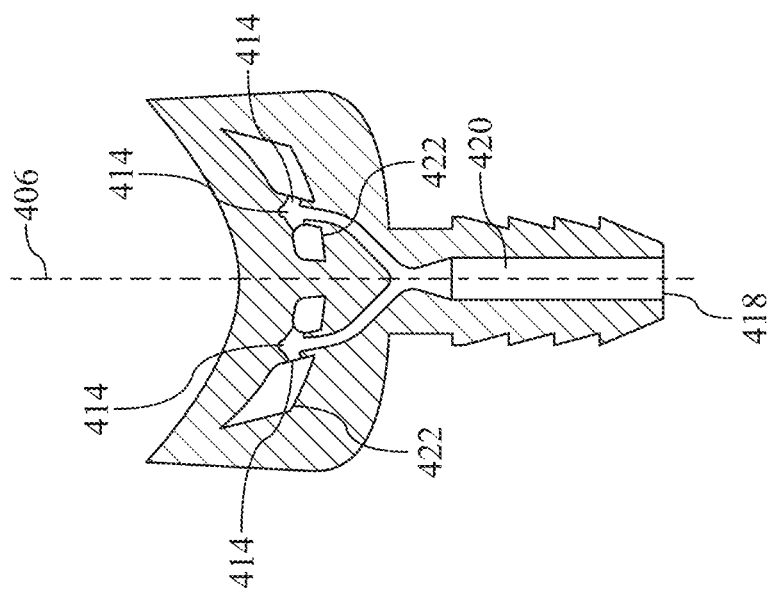
FIG. 33 shows a cross-sectional view along the line A-A of FIG. 32.
Figure 32:
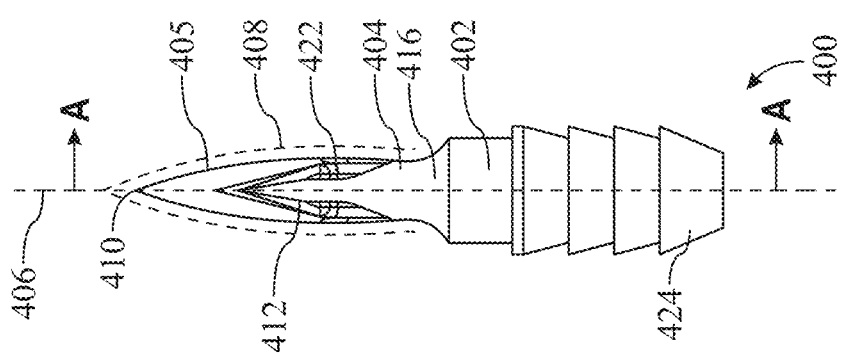
FIG. 32 shows a side view of the injection tool of FIG. 31.
Figure 31:
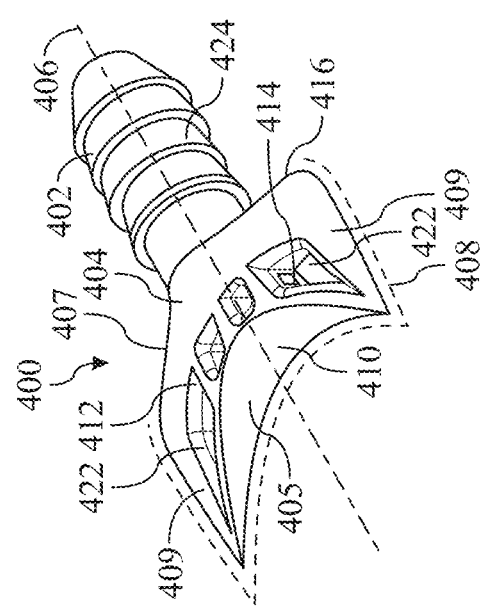
FIG. 31 shows a perspective view of a tenth embodiment of an injection tool according to the disclosure.

FIGS. 31, 32 and 33 show another example of an injection tool 400. The injection tool 400 includes one or more features similar to features of other injection tools described herein. For instance, the injection tool 400 includes a base 402 and a penetrating distribution body 404 extending from the base 402. In the example shown in FIG. 31, the penetrating distribution body 404 includes a body profile 408 having, in this example, a wedge shape or wedge profile. In this example, the wedge body profile 408 includes a curved or concave configuration including a corresponding curved (forked or concave) penetrating element 410. The penetrating distribution body 404 tapers from the proximal portion 407 of the body 404 to the distal portion 405. As described herein, the curved penetrating element 410 and corresponding curved or arcuate penetrating distributing body 404 facilitates the positioning of one or more of the distribution element 412 including one or more of distribution ports 414 or distribution reservoirs 322 adjacent to a common ring or plant tissue of the plant penetrated with the tool 400. Accordingly, the distribution of fluids from the distribution ports 414 is, in one example, localized to the corresponding ring or plant tissue extending circumferentially around the plant.

Referring to FIGS. 31 and 32, the wedge body profile 408 (shown in dashed lines) tapers from the proximal portion 407 to the distal portion 405. In FIG. 32, the penetrating distribution body 404 also tapers relative to the thickness of the tool (in contrast to the width shown in FIGS. 31 and 32). The body profile 408, shown in FIGS. 31 and 32 as a dashed line, extends around the penetrating element 410 as well as the penetrating distribution body 404. As shown in FIG. 32, the distribution ports 414 and distribution reservoirs 422 are, in this example, within the body profile 408. For instance, the distribution ports 414 are recessed from a body profile exterior 409 of the body profile 408. In a similar manner, the distribution reservoirs 422 are recessed from the body profile exterior 409 of the profile 408.

As previously described with regard to other embodiments, positioning of the distribution element 412 including (e.g., one or more of the distribution ports 414 or distribution reservoirs 422) within the body profile 408, such as within the body profile exterior 409 minimizes (e.g., eliminates or minimizes) engagement to plant tissue with the distribution element 412 and accordingly facilitates the maintenance of the ports 414, distribution reservoirs 422 or the like in an unclogged and open fashion to facilitate the distribution of liquid formulations from the ports, for instance, into the distribution reservoirs 422 for uptake into the plant tissue.

As further shown in FIG. 31 and FIG. 32, in another example the penetrating distribution body 404 includes one or more anchor elements 416. In this example, the anchor elements 416 correspond to a proximally directed surface of the penetrating distribution body 404, for instance, a flange, edge or the like of the penetrating distribution body 404. The anchor element 416, in one example, is received fully or partially within the plant tissue, for instance, immediately adjacent to the bark, exterior surface or the like of the plant and, in one example, is optionally grown over or covered by the plant tissue to retain the penetrating distribution body 404 within the plant.

As further shown in FIGS. 31 and 32, the base 402, in an example, includes one or more attachment cleats 424 including, for instance, rings, flanges, barbs or the like configured to grasp and retain one or more fittings, hoses or the like of an injection device, distribution device or the like coupled with the injection tool 400. In one example, the attachment cleats 424 facilitate the retention of the coupling of the injection tool 400 to one or more corresponding features of the distribution or injection devices including, but not limited to, containers, dosing devices or the like previously described and shown herein.

FIG. 33 is a cross sectional view of the injection tool 400 taken along section line A-A of FIG. 32. As shown in FIG. 33, the injection tool 400 includes a plurality of distribution ports 414 opening or directed in a direction different than the longitudinal body axis 406, for instance the ports 414 are transverse relative to the longitudinal body axis 406 that is generally the direction of penetration for the tool 400. For instance, as shown, the distribution ports 414, in this example, are directed in a sideways or angled direction relative to the longitudinal body axis 406. Accordingly, in a distribution configuration relative to a penetrating configuration the distribution ports 404 are configured to provide liquid formulations in a transverse or angled vector or along an angled vector relative to the longitudinal body axis 406.

In the example shown in FIG. 33, the distribution ports 414 are directed in a reversed or opposed direction relative to the penetrating direction (e.g., generally aligned with the longitudinal body axis 406). For instance, the distribution ports 414 are turned toward the base 402 of the injection tool 400 and conversely turned away from the longitudinal body axis 406. In other examples, the distribution ports 414 are arranged at differing angles relative to those shown in FIG. 33 while also at a different angle relative to the longitudinal body axis 406 and thereby turned away from the longitudinal body axis 406.

As further shown in FIG. 33, one or more distribution reservoirs 422 are in communication with the distribution ports 414. The distribution reservoirs 422 receive the liquid formulation from the ports 414 by way of an inlet passage 420 in communication with the inlet port 418. As previously described, the distribution reservoirs 422 provide a cavity, pocket or the like within the injection tool 400 and within the plant tissue that accordingly holds the liquid formulation in close proximity and adjacent to the plant tissue of the plant. Accordingly, while the liquid formulation is held within the distribution reservoir 422, the plant tissue readily absorbs the liquid formulation. Absorption or uptake is further enhanced with the arcuate configuration of the distribution reservoirs 422. The arcuate configuration of the reservoirs 422 corresponds with the profile of the most active plant tissue, such as the youngest growth ring of a tree or other perennial, and thereby provides the liquid formulation to the plant tissue most ready to absorb and transport the formulation.

In each of the injection tools described herein including, but not limited to, injection tools 300, 400, liquid formulations are delivered under passive or active pressures through the ports 414 for uptake by a plant. As previously described herein, in one example, the liquid formulations are provided by way of an 'active' pressure, for instance, by way of a pump, bladder or the like that pressurizes the liquid formulation to a specified pressure and provides the liquid formulations to one or more injection tools such as the injection tool 400 for distribution through the ports 414 and the reservoirs 422. In another example, the liquid formulations are delivered in a 'passive' manner to the injection tool 400, for instance, by way of hydrostatic pressure, capillary action or the like. The liquid formulations are received in the distribution reservoirs 422 (in FIG. 33) and the plant tissue absorbs the liquid formulation over time. In each of the designs including one or more distribution ports retained within the plant the liquid formulations are, in one example, provided passively to the plant tissue. Accordingly, pressurizing of the fluid and corresponding leaks or the like are minimized (e.g., eliminated or minimized). Instead, the injection tool, in combination with the plant tissue, provides a sealed or closed environment for residence of the liquid formulations within the plant tissue. The residence of the liquid formulations, delivered for example under passive pressure, facilitates the distribution of the liquid formulation to the plant tissue and absorption through the plant tissue without otherwise actively pressurizing the fluid in a manner that may increase the change of damage to the plant, leaking from the plant or the like.

Numerous active ingredients, which can be employed in the context of this disclosure, are generally available to an art worker. The active ingredients specified herein by their "common name" are known and described, for example, in The Pesticide Manual (18$^{th}$ edition, Ed. Dr. J A Turner (2018), which includes, among other agents, herbicides, fungicides, insecticides, acaricides, nematocides, plant growth regulators, repellants, synergists)) or can be searched in the internet (e.g., alanwood.net/pesticides). Further, the active ingredient can be selected from the following groups of compounds and compositions:

1. Fungicides
1.1 Respiration inhibitors
1.1.1 Inhibitors of complex III at Qo site, for example, azoxystrobin, coumethoxystrobin, coumoxystrobin, dimoxystrobin, enestroburin, fenaminstrobin, fenoxystrobin/flufenoxystrobin, fluoxastrobin, kresoxim-methyl, metominostrobin, orysastrobin, picoxystrobin, pyraclostrobin, pyrametostrobin, pyrao-xystrobin, trifloxystrobin, pyribencarb, triclopyricarb/chlorodincarb, famoxadone, and/or fenamidone;
1.1.2 Inhibitors of complex III at Qi site: cyazofamid and/or amisulbrom;
1.1.3 Inhibitors of complex II: flutolanil, benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane, tecloftalam and/or thifluzamide;
1.1.4 Other respiration inhibitors (e.g. complex I, uncouplers): diflumetorim;
1.1.5 Nitrophenyl derivates: binapacryl, dinobuton, dinocap, fluazinam; ferimzone; organometal compounds: fentin-acetate, fentin chloride and/or fentin hydroxide; ametoctradin; and/or silthiofam;
1.2 Sterol biosynthesis inhibitors (SBI fungicides)
1.2.1. C14 demethylase inhibitors (DMI fungicides): triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole and/or uniconazole;
1.2.2 Imidazoles: imazalil, pefurazoate, prochloraz, triflumizol; pyrimidines, pyridines and piperazines: fenarimol, nuarimol, pyrifenox, triforine; Delta14-reductase inhibitors: aldimorph, dodemorph, dodemorph-acetate, fenpropimorph, tridemorph, fenpropidin, piperalin, spiroxamine; Inhibitors of 3-keto reductase: fenhexamid;
1.3 Nucleic acid synthesis inhibitors:
1.3.1 Phenylamides or acyl amino acid fungicides: benalaxyl, benalaxyl-M, kiral-axyl, metalaxyl, ofurace, oxadixyl; others: hymexazole, octhilinone, oxolinic acid, bupirimate and/or, 5-fluorocytosine;
1.4 Inhibitors of cell division and cytoskeleton
1.4.1 Tubulin inhibitors: benzimidazoles, thiophanates: benomyl, carbendazim, fuberidazole, thiabendazole, thiophanate-methyl; triazolopyrimidines:
1.4.2 Cell division inhibitors: diethofencarb, ethaboxam, pencycuron, fluopicolide, zoxamide, metrafenone and/or, pyriofenone;
1.5 Inhibitors of amino acid and protein synthesis
1.5.1 Methionine synthesis inhibitors (anilino-pyrimidines): cyprodinil, mepanipyrim, pyrimethanil; protein synthesis inhibitors: blasticidin-S, kasugamycin, kasugamycin hydrochloride-hydrate, mildiomycin, streptomycin, oxytetracyclin, polyoxine, validamycin A;
1.6. Signal transduction inhibitors
1.6.1 MAP/histidine kinase inhibitors: fluoroimid, iprodione, procymidone, vinclozolin, fenpiclonil, fludioxonil; G protein inhibitors: quinoxyfen;
1.7 Lipid and membrane synthesis inhibitors
1.7.1 Phospholipid biosynthesis inhibitors: edifenphos, iprobenfos, pyrazophos, isoprothiolane; lipid peroxidation: dicloran, quintozene, tecnazene, tolclofos-methyl, biphenyl, chloroneb, etridiazole; phospholipid biosynthesis and cell wall deposition: dimethomorph, flumorph, mandipropamid, pyrimorph, benthiavalicarb, iprovalicarb, valifenalate;
1.7.2 Compounds affecting cell membrane permeability and fatty acids: propamocarb, propamocarb-hydrochloridfatty acid amide
1.8 Inhibitors with Multi Site Action
1.8.1 Inorganic active substances: Bordeaux mixture, copper acetate, copper hydroxide, copper oxychloride, basic copper sulfate, sulfur; thio- and dithiocarbamates: ferbam, mancozeb, maneb, metam, metiram, propineb, thiram, zineb, ziram; organochlorine compounds (e.g. phthalimides, sulfamides, chloronitriles): anilazine, chlorothalonil, captafol, captan, folpet, dichlofluanid, dichlorophen, hexachlorobenzene, pentachlorphenole and its salts, phthalide, tolylfluanid, and others: guanidine, dodine, dodine free base, guazatine, guazatine-acetate, iminoctadine, iminoctadine-triacetate, iminoctadinetris(albesilate), dithianon;
1.9 Cell wall synthesis inhibitors
1.9.1 Inhibitors of glucan synthesis: validamycin, polyoxin B; melanin synthesis inhibitors: pyroquilon, tricyclazole, carpropamid, dicyclomet and/or fenoxanil;
1.10 Plant defence inducers
1.10.1 Acibenzolar-S-methyl, probenazole, isotianil, tiadinil, prohexadione-calcium; phosphonates: fosetyl, fosetyl-aluminum, phosphorous acid and its salts;
1.11 Unknown mode of action
1.11.1 Bronopol, chinomethionat, cyflufenamid, cymoxanil, dazomet, debacarb, diclomezine, difenzoquat, difenzoquat-methylsulfate, diphenylamin, fenpyrazamine, flumetover, flusulfamide, flutianil, methasulfocarb, nitrapyrin, nitrothal-isopropyl, oxine-copper, picarbutrazox, proquinazid, tebufloquin, tecloftalam and/or triazoxide;
1.12 Antifungal biological Control Agents: *Ampelomyces quisqualis* (e.g. AQ 10® from Intrachem Bio GmbH & Co. KG, Germany), *Aspergillus flavus* (e.g. AFLA-GUARD® from Syngenta, CH), *Aureobasidium pullulans* (e.g. BOTECTOR® from bio-ferm GmbH, Germany), *Bacillus pumilus* (e.g. NRRL Accession No. B-30087 in SONATA® and BALLAD® Plus from AgraQuest Inc., USA), *Bacillus subtilis* (e.g. isolate NRRL-Nr. B-21661 in RHAPSODY®, SERENADE®

MAX and SERENADE® ASO from AgraQuest Inc., USA), *Bacillus subtilis* var. *amyloliquefaciens* FZB24 (e.g. TAEGRO® from Novozyme Biologicals, Inc., USA), *Candida oleophila* I-82 (e.g. ASPIRE® from Ecogen Inc., USA), *Candida saitoana* (e.g. BIO-CURE® (in mixture with lysozyme) and BIOCOAT® from Micro Flo Company, USA (BASF SE) and Arysta), Chitosan (e.g. ARMOUR-ZEN from BotriZen Ltd., NZ), *Clonostachys rosea* f. *catenulata*, also named *Gliocladium catenulatum* (e.g. isolate J1446: PRESTOP® from Verdera, Finland), *Coniothyrium minitans* (e.g. CONTANS® from Prophyta, Germany), *Cryphonectria parasitica* (e.g. *Endothia parasitica* from CNICM, France), *Cryptococcus albidus* (e.g. YIELD PLUS® from Anchor Bio-Technologies, South Africa), *Fusarium oxysporum* (e.g. BIOFOX® from S.I.A.P.A., Italy, FUSACLEAN® from Natural Plant Protection, France), *Metschnikowia fructicola* (e.g. SHEMER® from Agrogreen, Israel), *Microdochium dimerum* (e.g. ANTIBOT® from Agrauxine, France), *Phlebiopsis gigantea* (e.g. ROTSOP® from Verdera, Finland), *Pseudozyma flocculosa* (e.g. SPORODEX® from Plant Products Co. Ltd., Canada), *Pythium oligandrum* DV74 (e.g. POLYVERSUM® from Remeslo SSRO, Biopreparaty, Czech Rep.), *Reynoutria* sachlinensis (e.g. REGALIA® from Marrone Bio-Innovations, USA), *Talaromyces flavus* VI17b (e.g. PROTUS® from Prophyta, Germany), *Trichoderma asperellum* SKT-1 (e.g. ECO-HOPE® from Kumiai Chemical Industry Co., Ltd., Japan), T. atroviride LC52 (e.g. SENTINEL® from Agrimm Technologies Ltd, NZ), *T. harzianum* T-22 (e.g. PLANTSHIELD® der Firma BioWorks Inc., USA), *T. harzianum* TH 35 (e.g. ROOT PRO® from Mycontrol Ltd., Israel), *T. harzianum* T-39 (e.g. TRICHODEX® and *TRICHODERMA* 2000® from Mycontrol Ltd., Israel and Makhteshim Ltd., Israel), *T. harzianum* and *T. viride* (e.g. TRICHOPEL from Agrimm Technologies Ltd, NZ), *T. harzianum* ICCO12 and *T. viride* ICCO80 (e.g. REMEDIER® WP from Isagro Ricerca, Italy), *T. polysporum* and/or *T. harzianum* (e.g. BINAB® from BINAB Bio-Innovation AB, Sweden), T. stromaticum (e.g. TRICOVAB® from C.E.P.L.A.C., Brazil), *T. virens* GL-21 (e.g. SOILGARD® from Certis LLC, USA), *T. viride* (e.g. TRIECO® from Ecosense Labs. (India) Pvt. Ltd., Indien, BIO-CURE® F from T. Stanes & Co. Ltd., Indien), *T. viride* TV1 (e.g. *T. viride* TV1 from Agribiotec srl, Italy), Ulocladium oudemansii HRU3 (e.g. BOTRY-ZEN® from Botry-Zen Ltd, NZ), *Beauveria bassiana* PPRI 5339 (commercially available from Becker Underwood as product "BroadBand"), Metarhizium anisopliae FI-1045 (commercially available from Becker Underwood as product "BioCane"), Metarhizium anisopliae var. acridum FI-985 (commercially available from Becker Underwood as product "GreenGuard"), and/or Metarhizium anisopliae var. acridum IMI 330189 (commercially available from Becker Underwood as product "Green Muscle").

Active ingredients can also include protein or secondary metabolites. The term "protein or secondary metabolites" refers to any compound, substance or by-product of a fermentation of a microorganism that has pesticidal activity. The definition comprises any compound, substance or by-product of a fermentation of a microorganism that has pestocodal, including, fungicidal or insecticidal, activity. Examples of such proteins or secondary metabolites are Harpin (isolated by *Erwinia amylovora*, product known as e.g. Harp-N-Tek™, Messenger®, Employ™, ProAct™); and/or terpene constituents and mixture of terpenes, i.e. a-terpinene, p-cymene and limonene (product known as e.g. Requiem@ from Bayer CropScience LP, US).

Useful proteins may also include antibodies against fungal target proteins, or other proteins with antifungal activity such as defensins and/or proteinase inhibitor. Defensins may include, for example, NaD1, PhD1A, PhD2, Tomdef2, RsAFP2, RsAFP1, RsAFP3 and RsAFP4 from radish, DmAMP1 from dahlia, MsDef1, MtDef2, CtAMP1, PsD1, HsAFP1, VaD1, VrD2, ZmESR6, AhAMP1 and AhAMP4 from *Aesculus* hippocatanum, AfIAFP from alfalfa, NaD2, AX1, AX2, BSD1, EGAD1, HvAMP1, JI-2, PgD1, SD2, SoD2, WT1, p 139 and p1230 from pea. Proteinase inhibitors may include proteinase inhibitor from the following classes: serine-, cysteine-, aspartic- and metallo-proteinase inhibitors and carboxypeptidases such as StPin1A (U.S. Pat. No. 7,462,695) or Bovine Trypsin Inhibitor I-P.

2. Insecticidal compound
  2.1 Acetylcholine esterase inhibitors from the class of carbamates: aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb and/or, triazamate;
  2.2 Acetylcholine esterase inhibitors from the class of organophosphates: acephate, azamethiphos, azinphosethyl, azinphosmethyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl)salicylate, isoxathion, malathion, mecarbam, methamidophos, methidathion, mevinphos, monocrotophos, nalad, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon and/or vamidothion;
  2.3 GABA-gated chloride channel antagonists
  2.4 Cyclodiene organochlorine compounds: endosulfan; orM-2.B fiproles (phenylpyrazoles): ethiprole, fipronil, flufiprole, pyrafluprole, or pyriprole;
  2.5 Sodium channel modulators from the class of pyrethroids: acrinathrin, allethrin, d-cis-trans allethrin, d-trans allethrin, bifenthrin, bioallethrin, bioallethrin S-cylclopentenyl, bioresmethrin, cycloprothrin, cyfluthrin, betacyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, momfluorothrin, empenthrin, esfenvalerate, etofenprox, fenpropathrin, fenvalerate, flucythrinate, flumethrin, tau-fluvalinate, halfenprox, imiprothrin, meperfluthrin, metofluthrin, permethrin, phenothrin, prallethrin, profluthrin, pyrethrin (pyrethrum), resmethrin, silafluofen, tefluthrin, tetramethylfluthrin, tetramethrin, tralomethrin, transfluthrin, DDT and/or, methoxychlor;

2.6 Nicotinic acteylcholine receptor agonists from the class of neonicotinoids: acteamiprid, chlothianidin, cycloxaprid, dinotefuran, flupyradifurone, imidacloprid, nitenpyram, sulfoxaflor, thiacloprid and/or thiamethoxam;

2.7 Allosteric nicotinic acteylcholine receptor activators from the class of spinosyns: spinosad, spinetoram;

2.8 Chloride channel activators from the class of mectins: abamectin, emamectin benzoate, ivermectin, lepimectin and/or milbemectin;

2.9 Juvenile hormone mimics: hydroprene, kinoprene, methoprene, fenoxycarb and/or pyriproxyfen;

2.10 Non-specific multi-site inhibitors: methyl bromide and other alkyl halides, chloropicrin, sulfuryl fluoride, borax and/or tartar emetic;

2.11 Selective homopteran feeding blockers: pymetrozine, flonicamid and/or pyrifluquinazon;

2.12 Mite growth inhibitors: clofentezine, hexythiazox, diflovidazin and/or etoxazole;

2.13 Inhibitors of mitochondrial ATP synthase: diafenthiuron, azocyclotin, cyhexatin, fenbutatin oxide, propargite and/or tetradifon;

2.14 Uncouplers of oxidative phosphorylation: chlorfenapyr, DNOC and/or sulfluramid; M-13 nicotinic acetylcholine receptor channel blockers: bensultap, cartap hydrochloride, thiocyclam and/or thiosultap sodium;

2.15 Inhibitors of the chitin biosynthesis type 0 (benzoylurea class): bistrifluron, chlorfluazuron, diflubenzuron, flucycloxuron, flufenoxuron, hexaflumuron, lufenuron, novaluron, noviflumuron, teflubenzuron and/or, triflumuron;

2.16 Inhibitors of the chitin biosynthesis type 1: buprofezin;

2.17 Moulting disruptors: cyromazine;

2.18 Ecdyson receptor agonists: methoxyfenozide, tebufenozide, halofenozide, fufenozide and/or chromafenozide; 2.19 Octopamin receptor agonists: amitraz;

2.20 Mitochondrial complex III electron transport inhibitors: hydramethylnon, acequinocyl, flometoquin, fluacrypyrim and/or pyriminostrobin;

2.21 Mitochondrial complex I electron transport inhibitors: fenazaquin, fenpyroximate, pyrimidifen, pyridaben, tebufenpyrad, tolfenpyrad, flufenerim and/or rotenone;

2.22 Voltage-dependent sodium channel blockers: indoxacarb and/or metaflumizone 2.23 Inhibitors of the lipid synthesis, inhibitors of acetyl CoA carboxylase: spirodiclofen, spiromesifen and/or spirotetramat;

2.24 Mitochondrial complex II electron transport inhibitors: cyenopyrafen, cyflumetofen and/or pyflubumide;

2.25 Ryanodine receptor-modulators from the class of diamides: flubendiamide, chloranthraniliprole (rynaxypyr) and/or cyanthraniliprole (cyazypyr), 2.26 Others: afidopyropen, 2.27 Insecticidal biological control agents: *Bacillus firmus* (e.g. *Bacillus firmus* CNCM 1-1582, e.g. WO09126473A1 and WO09124707 A2, commercially available as "Votivo") and/or δ-endotoxins from *Bacillus thuringiensis* (Bt).

3. A plant growth regulator:

3.1 Antiauxins: clofibric acid and/or 2,3,5-tri-iodobenzoic acid;

3.2 Auxins: 4-CPA, 2,4-D, 2,4-DB, 2,4-DEP, dichlorprop, fenoprop, IAA (indole-3-acetic acid), IBA, naphthaleneacetamide, α-naphthaleneacetic acid, 1-naphthol, naphthoxyacetic acid, potassium naphthenate, sodium naphthenate and/or 2,4,5-T;

3.3 Cytokinins: 2iP, 6-benzylaminopurine (6-BA), 2,6-dimethylpyridine and/or kinetin, zeatin;

3.4 Defoliants: calcium cyanamide, dimethipin, endothal, merphos, metoxuron, pentachlorophenol, thidiazuron, tribufos and/or tributyl phosphorotrithioate;

3.5 Ethylene modulators: aviglycine, 1-methylcyclopropene (1-MCP), prohexadione (prohexadione calcium) and/or trinexapac (trinexapac-ethyl);

3.6 Ethylene releasers: ACC, etacelasil, ethephon, glyoxime; Gibberellins: gibberelline, gibberellic acid;

3.7 Growth inhibitors: abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat (mepiquat chloride, mepiquat pentaborate), piproctanyl, prohydrojasmon, propham and/or 2,3,5-tri-iodobenzoic acid;

3.8 Morphactins: chlorfluren, chlorflurenol, dichlorflurenol and/or flurenol;

3.9 Growth retardants: chlormequat (chlormequat chloride), daminozide, flurprimidol, mefluidide, paclobutrazol, tetcyclacis, uniconazole and/or metconazole;

3.10 Growth stimulators: brassinolide, forchlorfenuron and/or, hymexazol;

3.11 Unclassified plant growth regulators/classification unknown: amidochlor, benzofluor, buminafos, carvone, choline chloride, ciobutide, clofencet, cloxyfonac, cyanamide, cyclanilide, cycloheximide, cyprosulfamide, epocholeone, ethychlozate, ethylene, fenridazon, fluprimidol, fluthiacet, heptopargil, holosulf, inabenfide, karetazan, lead arsenate, methasulfocarb, pydanon, sintofen and/or, triapenthenol.

In one embodiment, the fungicidal compound is selected from the group consisting of Dimoxystrobin, Pyraclostrobin, Azoxystrobin, Trifloxystrobin, Picoxystrobin, Cyazofamid, Boscalid, Fluoxapyroxad, Fluopyram, Bixafen, Isopyrazam, Benzovindiflupyr, Penthiopyrad, Ametoctradin, Difenoconazole, Metconazole, Prothioconazole, Tebuconazole, Propiconazole, Cyproconazole, Penconazole, Myclobutanil, Tetraconazole, Hexaconazole, Metrafenone, Zoxamid, Pyrimethanil, Cyprodinil, Metalaxyl, Fludioxonil, Dimethomorph, Mandipropamid, Tricyclazole, Copper, Metiram, Chlorothalonil, Dithianon, Fluazinam, Folpet, Fosetyl-A1, Captan, Cymoxanil, Mancozeb, Kresoxim-methyl, Oryzastrobin, Epoxiconazole, Fluquinconazole, Triticonazole, Fenpropimorph and Iprodione.

In one embodiment, the plant growth regulator is selected from the group consisting of 6-benzylaminopurine (=N-6-benzyladenine), chlormequat (chlormequat chloride), choline chloride, cyclanilide, dikegulac, diflufenzopyr, dimethipin, ethephon, flumetralin, fluthiacet, forchlorfenuron, gibberellic acid, inabenfide, maleic hydrazide, mepiquat (mepiquat chloride), 1-methylcyclopropene (1-MCP), paclobutrazol, prohexadione (prohexadione calcium), prohydrojasmon, thidiazuron, triapenthenol, Tributyl phosphorotrithioate, trinexapac-ethyl and uniconazole.

In another embodiment, the active ingredient is a biological control agent such as a bio-pesticide. Compared to conventional synthetic chemical pesticides, bio-pesticides are non-toxic, safe to use, and can have high specificity. These can be used as a preventative (or curative) tool to manage diseases, nematodes and insects and other pests. Bio-pesticides allow for the reduction in the use of traditional chemical-based pesticides without affecting yields.

The use of biological pesticides is compatible with the use for food and feed production and many of the biological agents are approved for consumption. This allows an all year use in food production systems like wine, banana, cocoa, coffee, and fruit plantations etc. where pest control is a major and increasing challenge. In one embodiment, the tools, systems and methods of the disclosure are employed in organic farming.

In one embodiment, the active ingredients are those which provide a systemic effect.

The active ingredient is generally formulated to be suitable for injection/transference into a plant species by a method according to the present disclosure. Examples of typical formulations include water-soluble liquids (SL), emulsifiable concentrates (EC), emulsions in water (EW), suspension concentrates (SC, SE, FS, OD), water-dispersible granules (WG) and fluids (which include one or more of a liquid, gas, gel, vapor, aerosol or the like). These and other possible types of formulation are described, for example, by Crop Life International and in Pesticide Specifications, Manual on development and use of FAO and WHO specifications for pesticides, FAO Plant Production and Protection Papers, prepared by the FAO/WHO Joint Meeting on Pesticide Specifications, 2004, ISBN: 9251048576; "Catalogue of pesticide formulation types and international coding system", Technical Monograph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005. Formulations are prepared e.g. by mixing the active ingredients with one or more suitable additives such as suitable extenders, solvents, spontaneity promoters, carriers, emulsifiers, dispersants, frost protectants, biocides, thickeners, adjuvants or the like. An adjuvant in this context is a component which enhances the biological effect of the formulation, without the component itself having a biological effect. Examples of adjuvants are agents which promote the retention, spreading, or penetration in the target plant. One embodiment of the disclosure comprises a long-term supply of the active ingredient to the plant over the growing season, with an auxiliary being stabilizers, such as low-temperature stabilizers, preservatives, antioxidants, light stabilizers or other agents which improve chemical and/or physical stability.

Examples for suitable auxiliaries are solvents, liquid carriers, surfactants, dispersants, emulsifiers, wetters, adjuvants, solubilizers, penetration enhancers, protective colloids, humectants, repellents, attractants, feeding stimulants, compatibilizers, bactericides, anti-freezing agents, anti-foaming agents, colorants, stabilizers or nutrients, UV protectants, tackifiers and/or binders. Specific examples for each of these auxiliaries are well known to the person of ordinary skill in the art, see for example US 2015/0296801 A1.

The compositions can optionally comprise 0.1-80% stabilizers and/or nutrients and 0.1-10% UV protectants. General examples of suitable ratios for multiple formulation types referenced above are given in Agrow Reports DS243, T&F Informa, London, 2005.

When applying active ingredients, the application can be continuous over a longer period or intervals. The application could also be coupled with a disease monitoring system and be triggered "on demand."

The inventive system can be used with any number of known injection protocols such as, for example, those disclosed in PCT applications WO 2012/114197 or WO 2013/149993 which are incorporated by reference herein. The appropriate protocol will depend upon various factors including the nozzle tip, the tree species, the target (insect, nematode, disease, abiotic stress, etc.), the injection fluid components and/or viscosity, the dose volume required and the injection pressure.

Penetrants which facilitate and/or enhance the uptake and distribution of the active ingredient in the target plant can be used. Suitable penetrants in the present context include all those substances which are typically used in order to enhance the penetration of active agrochemical compounds into plants. Examples include alcohol alkoxylates, such as coconut fatty ethoxylate, isotridecyl ethoxylate, fatty acid esters, such as rapeseed or soybean oil methyl esters, fatty amine alkoxylates, such as tallowamine ethoxylate, or ammonium and/or phosphonium salts, such as ammonium sulphate or diammonium hydrogen phosphate.

The formulations can comprise between 0.5% and 90% by weight of active compound, based on the weight of the formulation.

At certain application rates, the compositions and/or formulations according to the disclosure may also have a strengthening effect in plants. "Plant-strengthening" (resistance-inducing) substances are to be understood as meaning, in the present context, those substances or combinations of substances which are capable of stimulating the defence system of plants in such a way that, when subsequently inoculated with harmful microorganisms, the treated plants display a substantial degree of resistance to these microorganisms.

In some embodiments, the injection tool of the disclosure is inserted into the stem of the plant. The term "stem" is to be understood in the broadest possible sense and includes all parts of the plant which (i) comprise a vascular system connected to the plant and (ii) have a diameter of at least 1 cm, such as at least 2 cm or 3 cm, or at least 4 cm or 5 cm. The term stem includes trunks and branches of tree, large petioles, but also "false stems" or pseudostems of plants like bananas, which consist of tightly packed sheaths. Stems can be woody or non-woody.

Plants that can benefit from application of the products and methods of the subject disclosure are selected from Tree Crops (e.g., Walnuts, Almonds, Pecans, Hazelnuts, Pistachios, etc.), citrus trees (Citrus *spp.* e.g., orange, lemon, grapefruit, mandarins etc.), Fruit Crops (such as pomes, stone fruits or soft fruits, for example apples, pears, plums, peaches, cherries etc.), Vine Crops (e.g., Grapes, Blueberries, Blackberries, etc.), coffee (Coffea spp.), coconut (*Cocos iiucifera*), pineapple (*Ananas comosus*), cocoa (*Theobroma cacao*), tea (*Camellia sinensis*), banana (Musa *spp.*), lauraceous plants (such as avocados (*Persea americana*), cinnamon or camphor), fig (*Ficus casica*), guava (*Psidium guajava*), mango (*Mangifera indica*), olive (*Olea europaea*), papaya (*Carica papaya*), cashew (*Anacardium occidentale*), macadamia (Macadamia *integrifolia*), almond (*Prunus amygdalus*), natural rubber tree, date tree, oil palm tree, ornamentals, forestry (e.g., pine, spruce, *eucalyptus*, poplar, conifers etc) and/or box trees.

Conifers that may be employed in practicing the embodiments are selected from pines such as loblolly pine (*Pinus taeda*), slash pine (*Pinus elliotii*), *ponderosa* pine (*Pinus ponderosa*), lodgepole pine (*Pinus contorta*), and Monterey pine (*Pinus radiata*); Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*);

and cedars such as Western red cedar (*Thuja plicata*) and/or Alaska yellow-cedar (Chamaeeyparis *nootkatensis*).

Palm trees that may be treated are selected from *Archontophoenix alexandrae* (king Alexander palm), Arenga spp. (Dwarf sugar palm), *Borassus flabellifer* (Lontar palm), *Brahea armata* (blue *hesper* palm), *Brahea edulis* (Guadalupe palm), *Butia* capitate (pindo palm), *Chamaerops humilis* (European fan palm), Carpentaria spp (*Carpenteria* palm), Chamaedorea elegans (parlor palm), C. erupens (bamboo palm), *C. seifrizii* (reed palm), Chrysalidocarpus *lutescens* (*areca* palm), *Coccothrinax argentata* (silver palm), C. crinite (old man palm), *Cocos nucifera* (coconut palm), *Elaeis guineensis* (African oil palm), Howea *forsterana* (*kentia* palm), *Livistona rotundifolia* (round leaf fan palm), *Neodypsis decaryi* (triangle palm); *Normanbya* normanbi (Queensland black); Pinanga *insignis; Phoenix canariensis* (Canary Island date); Ptychosperma macarthuri (Macarthur palm); Rhopalostylis *spp* (shaving brush p.); *Roystonea elata* (Florida royal palm), *R. regia* Cuban (royal palm), Sabal spp (Cabbage/palmetto), *Syagrus romanzoffiana* (queen palm), Trachycarpus fortune (windmill palm), Trythrinax acanthocoma (spiny fiber palm), *Washingtonia filifera* (petticoat palm) and/or *W. robusta* (Washington/Mexican fan palm). One embodiment includes the prevention or cure of bud rot of palm trees caused, for example, by *Phytophthora palmivora, Thielaviopsis paradoxa* and/or bacteria. Unlike most trees, which have many points where new growth emerges, palms rely on their single terminal bud. If the terminal bud or heart becomes diseased and dies, the tree will not be able to put out any new leaf growth and will die. That is why preventative care is needed to maintain a healthy palm tree.

One embodiment comprises a method for reducing damage of plants and/or plant parts or losses in harvested fruits or plant produce caused by phytopathogenic fungi by controlling such phytopathogenic fungi, comprising applying the tools, system, agents/formulations or methods of the disclosure to the plant. Advantageously, the disclosure is for controlling, preventing, or curing the following fungal plant diseases selected from the group:

*Botrytis cinerea* (teleomorph: *Botryotinia fuckeliana*: grey mold) on fruits and berries (e.g. strawberries), rape, vines, forestry plants; *Ceratocystis* (syn. *Ophiostoma*) *spp*. (rot or wilt) on broad-leaved trees and evergreens, e.g. *C. ulmi* (Dutch elm disease) on elms; Cercospora spp. (*Cercospora* leaf spots) on coffee; *Colletotrichum* (teleomorph: *Glomerella*) *spp*. (anthracnose) on soft fruits; Cycloconium spp., e.g. *C. oleaginum* on olive trees; Cylindrocarpon spp. (e.g. fruit tree canker or young vine decline, teleomorph: *Nectria* or Neonectria spp.) on fruit trees, vines (e.g. *C. liriodendri*, teleomorph: *Neonectria liriodendri*: Black Foot Disease) and ornamentals; Esca (dieback, apoplexy) on vines, caused by Formitiporia (syn. *Phellinus*) *punctata, F. mediterranea, Phaeomoniella chlamydospora* (earlier *Phaeoacremonium chlamydosporum*), *Phaeoacremonium aleophilum* and/or *Botryosphaeria* obtuse; Elsinoe spp. on pome fruits (E. pyn), soft fruits (*E. veneta*: anthracnose) and vines (*E. ampelina*: anthracnose); *Eutypa lata* (*Eutypa* canker or dieback, anamorph: *Cytosporina lata*, syn. *Libertella blepharis*) on fruit trees, vines and ornamental woods; *Fusarium* (teleomorph: *Gibberella*) *spp*. (wilt, root or stem rot) on various plants; *Glomerella cingulata* on vines, pome fruits and other plants; *Guignardia bidwellii* (black rot) on vines; Gymnosporangium spp. on rosaceous plants and junipers, e.g. *G. sabinae* (rust) on pears; Hemileia spp., e.g. *H. vastatrix* (coffee leaf rust) on coffee; *Isariopsis clavispora* (syn. *Cladosporium vitis*) on vines; Monilinia *spp.*, e.g.

M. taxa, M. fructicola and M. fructigena (bloom and twig blight, brown rot) on stone fruits and other rosaceous plants; *Mycosphaerella spp*. on bananas, soft fruits, such as e.g. *M. fijiensis* (black Sigatoka disease) on bananas; Phialophora spp. e.g. on vines (e.g. *P. tracheiphila* and *P. tetraspora*); Phomopsis spp. on vines (e.g. P. viticola: can and leaf spot); Phytophthora spp. (wilt, root, leaf, fruit and stem root) on various plants, such as broad-leaved trees (e.g. *P. ramorum*: sudden oak death); Plasmopara *spp*., e.g. P. viticola (grapevine downy mildew) on vines; Podosphaera spp. (powdery mildew) on rosaceous plants, hop, pome and soft fruits, e.g. *P. leucotricha* on apples; *Pseudopezicula tracheiphila* (red fire disease or rotbrenner', anamorph: *Phialophora*) on vines; Ramularia *spp*., e.g. R. collo-*cygni* (Ramularia leaf spots, Physiological leaf spots) on barley and *R. beticola* on sugar beets; Rhizoctonia spp. on cotton, rice, potatoes, turf, corn, rape, potatoes, sugar beets, vegetables and various other plants, e.g. *R. solani* (root and stem rot) on soybeans, *R. solani* (sheath blight) on rice or *R. cerealis* (*Rhizoctonia* spring blight) on wheat or barley; *Rhizopus stolonifer* (black mold, soft rot) on vines; Uncinula (syn. *Erysiphe*) necator (powdery mildew, anamorph: Oidium *tuckeri*) on vines; Taphrina spp., e.g. T. deformans (leaf curl disease) on peaches and *T. pruni* (plum pocket) on plums; Thielaviopsis spp. (black root rot) on pome fruits; Venturia spp. (scab) on apples (e.g. *V. inaequalis*) and pears; and/or Verticillium spp. (wilt) on various plants, such as fruits and ornamentals, vines, soft fruits.

The disclosed subject matter is employed for controlling, preventing, or curing the diseases in plants selected from:

Diseases of apple: blossom blight (*Monilinia mali*), powdery mildew (*Podosphaera leucotricha*), Alternaria leaf spot/*Alternaria* blotch (*Alteraaria alternata* apple pathotype), scab (*Venturia inaequalis*), bitter rot (*Colletotrichum acutatum*), anthrax (*Colletotrieiium acutatum*), decomposed disease (*Valsa ceratosperma*), and/or crown rot (*Phytophtora cactorum*);

Diseases of pear: scab (*Venturia nashicola, V.* pirina), black spot/purple blotch (*Alternaria* alternate Japanese pear pathotype). rust/frogeye (*Gymnosporangium* haraeanum), and/or *phytophthora* fruit rot (*Phytophtora cactorum*);

Diseases of peach: brown rot (Monilinia fructicola), black spot disease/scab (*Cladosporium carpophilum*), and/or *phomopsis* rot (*Phomopsis* sp.);

Diseases of grape: anthracnose (*Elsinoe ampelina*), powdery mildew (Uncinula necator), ripe rot (*Glomerella cingulata*), black rot (*Guignardia* bidwelli i), downy mildew (Plasmopara viticola), rust (*Phakopsora ampelopsidis*), and/or gray mold (*Botrytis cinerea*);

Diseases of Japanese persimmon: anthracnose (Gloeosporium kaki) and/or leaf spot (*Cercospora* kaki, *Mycosphaerella* nawae);

Diseases of cruciferous vegetables: *Alternaria* leaf spot (*Alternaria japonica*), white spot (Cercosporella *brassicae*), and/or downy mildew (*Peronospora parasitica*); Diseases of rapeseed: *sclerotinia* rot (*Sclerotinia sclerotiorum*) and/or gray leaf spot (*Alternaria brassicae*);

Diseases of rose: black spot (Diplocarpon *rosae*) and/or powdery mildew (Sphaerotheca *pannosa*);

Disease of banana: sigatoka (*Mycosphaerella fijiensis, Mycosphaerella musicola, Pseudocercospora musae*); and/or Colletotrichum musae, Armillaria mellea, Armillaria tabescens, Pseudomonas solanacearum, Phyllachora musicola, Mycosphaerella fijiensis, Rosellinia bunodes, Pseudomas spp., Pestalotiopsis leprogena, Cercospora hayi, *Pseudomonas solanacearum, Ceratocystis paradoxa, Verticillium theobromae, Trachysphaera fructigena, Cladosporium musae, Junghuhnia vincta, Cordana johnstonii, Cordana musae, Fusarium pallidoroseum, Colletotrichum musae, Verticillium theobromae, Fusarium spp Acremonium spp., Cylindrocladium spp., Deightoniella torulosa, Nattrassia mangiferae, Dreschslera gigantean, Guignardia musae, Botryosphaeria ribis, Fusarium solani, Nectria haematococca, Fusarium oxysporum, Rhizoctonia spp., Colletotrichum musae, Uredo musae, Uromyces musae, Acrodontium simplex, Curvularia eragrostidis, Drechslera musae-sapientum, Leptosphaeria musarum, Pestalotiopsis disseminate, Ceratocystis paradoxa, Haplobasidion musae, Marasmiellus inoderma, Pseudomonas solanacearum, Radopholus similis, Lasiodiplodia theobromae, Fusarium pallidoroseum, Verticillium theobromae, Pestalotiopsis palmarum, Phaeoseptoria musae, Pyricularia grisea, Fusarium moniliforme, Gibberella fujikuroi, Erwinia carotovora, Erwinia chrysanthemi, Cylindrocarpon musae, Meloidogyne arenaria, Meloidogyne incognita, Meloidogyne javanica, Pratylenchus coffeae, Pratylenchus goodeyi, Pratylenchus brachyurus, Pratylenchus reniformia, Sclerotinia sclerotiorum, Nectria foliicola, Mycosphaerella musicola, Pseudocercosporamusae, Limacinula tenuis, Mycosphaerella musae, Helicotylenchus multicinctus, Helicotylenchus dihystera, Nigrospora sphaerica, Trachysphaera frutigena, Ramichloridium musae, Verticillium theobromae;*

Disease of citrus fruits: black spot disease (*Diaporthe citri*), scab (*Elsinoe* fawcetti), and/or fruit rot (*Penicillium digitatum, P. italicum*);

Disease of tea: net rice disease (*Exobasidium reticulatum*), disease victory (*Elsinoe leucospila*), ring leaf spot (*Pestalotiopsis* sp.), anthracnose (*Colletotrichum* theaesinensis;

Disease of plam trees: Bud Rot, Crown Rot, Red Ring, Pudricion de Cogollo, Lethal Yellowing;

Diseases of box tree: boxwood blight fungus (*Cylindrocladium buxicola* also called *Calonectria pseudonaviculata*), *Volutella buxi, Fusarium buxicola.*

The methods of the disclosure can be used to reduce damage caused by a wide range of insect pests. Target insects can be selected from the order of Lepidoptera, Coleoptera, Diptera, Thysanoptera, Hymenoptera, Orthoptera, Acarina, Siphonaptera, Thysanura, Chilopoda, Dermaptera, Phthiraptera, Hemipteras, Homoptera, Isoptera and/or Aptero. Examples of such pests include, but are not limited to, Arthropods, including, for example, Lepidoptera (for example, Plutellidae, Noctuidae, Pyralidae, Tortricidae, Lyonetiidae, Carposinidae, Gelechiidae, Crambidae, Arctiidae, and/or Lymantriidae), Hemiptera (for example, Cicadellidae, Delphacidae, Psyllidae, Aphididae, A!eyrodidas, Orthezidae, Miridae, Tingidae, Pentatomidae, and/or Lygaiedae), Coleoptera (for example, Scarabaeidae, Elateridae, Coccinellidae, Cerambycidae, Chrysomelidae, and/or Curculionidae), Diptera (for example, Muscidae, Calliphoridae, Sarcophagidae, Anthomyiidae, Tephritidae, Opomyzoidea, and/or Carnoidea), Orthoptera (for example, Acrididae, Catantopidae, and Pyrgomorphidae), Thysanoptera (for example, Thripidae, Aeolothripidae, and Merothripidae), Tylenchida (for example, Aphelenchoididae and/or Neotylechidae), Collembola (for example, Onychiurus and lsotomidae), Acarina (for example, Tetranychidae, Dermanyssidae, Acaridae, and/or Sarcoptidae), Stylommatophora (for example, Philomycidae and/or Bradybaenidae), Ascaridida (for example, Ascaridida and/or Anisakidae), Opisthorchiida, Strigeidida, Blattodea (for example, Blaberidae, Cryptocercidae, and/or Panesthiidae), Thysanura (for example, Lepismatidae, Lepidotrichidae, and/or Nicoletiidae) and/or box tree moth/box tree caterpillar (Cydalima perspectalis).

The disclosure is also useful against bacterial pathogens that attack, consume (in whole or in part), or impede the growth and/or development of plants and/or act as transmission vectors to the plant and/or other plants caused by such bacterial pathogens. The bacterial pathogens can include *Agrobacterium, Agrobacterium tumefaciens, Erwinia, Erwinia amylovora, Xanthomonas, Xanthomonas campestris, Pseudomonas, Pseudomonas syringae, Ralstonia solanacearum, Corynebacterium, Streptomyces, Streptomyces* scabies, Actinobacteria, Micoplasmas, Spiroplasmas and/or Fitoplasmas.

The disclosure is also useful for mitigating, controlling and/or eradicating viral pathogens that attack, consume (in whole or in part), or impede the growth and/or development of the plant and/or act as transmission vectors to the plant and/or other plants caused by such viral pathogens. Such viral pathogens can include Carlaviridae, Closteroviridae, viruses that attack citrus fruits, Cucumoviridae, Ilarviridae, dwarf virus attacking prunes, Luteoviridae, Nepoviridae, Potexviridae, Potyviridae, Tobamoviridae, Caulimoviridae, as well as other viruses that attack vegetation and crops.

Plant growth-regulating compounds can be used, for example, to inhibit the vegetative growth of the plants. Such inhibition of growth is of economic interest, for example, the inhibition of the growth of herbaceous and woody plants on roadsides and in the vicinity of pipelines or overhead cables, or quite generally in areas where vigorous plant growth is unwanted. Inhibition of the vegetative plant growth may also lead to enhanced yields because the nutrients and assimilates are of more benefit to flower and fruit formation than to the vegetative parts of the plants. Frequently, growth regulators can also be used to promote vegetative growth.

This is of great benefit when harvesting the vegetative plant parts. However, promoting vegetative growth may also promote generative growth in that more assimilates are formed, resulting in more or larger fruits.

Use of growth regulators can control the branching of the plants. On the one hand, by breaking apical dominance, it is possible to promote the development of side shoots, which may be highly desirable particularly in the cultivation of ornamental plants, also in combination with an inhibition of growth. On the other hand, however, it is also possible to inhibit the growth of the side shoots. This effect is of particular interest, for example, in the cultivation of tobacco or in the cultivation of tomatoes. Under the influence of growth regulators, the amount of leaves on the plants can be controlled such that defoliation of the plants is achieved at a desired time. Such defoliation plays a major role in the mechanical harvesting of cotton, but is also of interest for facilitating harvesting in other crops, for example in viticulture.

Growth regulators can also be used to achieve faster or delayed ripening of the harvested material before or after harvest. This is particularly advantageous as it allows optimal adjustment to the requirements of the market. Moreover, growth regulators in some cases can improve fruit color. In addition, growth regulators can also be used to concentrate maturation within a certain period of time. This establishes the prerequisites for complete mechanical or manual harvesting in a single operation, for example in coffee.

By using growth regulators, it is additionally possible to influence the resting of seed or buds of the plants, such that plants, including pineapple or ornamental plants in nurseries, for example, germinate, sprout or flower at a time when they are normally not inclined to do so.

Further, growth regulators can induce resistance of the plants to frost, drought or high salinity of the soil. This allows the cultivation of plants in regions which are normally unsuitable. The compositions and/or formulations according to the disclosure also exhibit a potent strengthening effect in plants. Accordingly, they can be used for mobilizing the defences of the plant against attack by undesirable microorganisms. Plant-strengthening (resistance-inducing) substances are to be understood as meaning, in the present context, those substances which are capable of stimulating the defence system of plants in such a way that the treated plants, when subsequently inoculated with undesirable microorganisms, develop a high degree of resistance to these microorganisms. The active compounds according to the disclosure are also suitable for increasing the yield of crops. In addition, they show reduced toxicity and are well tolerated by plants.

Further, in context with the present disclosure plant physiology effects comprise the following (all of which can be modulated by the compositions, methods and devices provided herein): Abiotic stress tolerance, comprising temperature tolerance, drought tolerance and recovery after drought stress, water use efficiency (correlating to reduced water consumption), flood tolerance, ozone stress and UV tolerance, tolerance towards chemicals like heavy metals, salts, pesticides (safener) etc.

Biotic stress tolerance, comprising increased resistance fungal diseases, increased resistance against nematodes, viruses and bacteria.

Increased plant vigor, comprising plant health, plant quality, seed vigor, reduced stand failure, improved appearance, increased recovery, improved greening effect and improved photosynthetic efficiency.

In addition, the inventive treatment can reduce the mycotoxin content in the harvested material and the foods and feeds prepared therefrom.

In another embodiment of the disclosure the tools, system, compositions/formulations and methods are employed to provide to the plant nutritional elements like nitrogen, phosphorous and potassium, as well as mineral elements, including but not limited to, silicium, calcium, magnesium and manganese.

EXAMPLES

The trunk injection devices have been tested regarding the use with different types of trunks, the speed of absorption, distribution of product within the plant, and the continuing usage of an injection device within a trunk. The injection devices have been tested with trunks with a diameter between 2 cm and 30 cm. The tests have been conducted with box, vine, hazelnut, walnut, maple, beach and oak. Further, trees such as date palm, citrus tree, and banana tree would be suitable as well.' Speed of absorption is influenced by factors such as weather, season, time of day and injection pressure. Within tests conducted under ideal conditions, an injection pressure of 2.5 bars, and 10 ml of test substance, absorption times below 2 minutes have been achieved.

Distribution within plants has been tested injecting a solution comprising 2% Brilliant Blue E 133 (CAS reg. No. 3844-45-9.) as a test substance. Trees have afterwards been felled and cut in pieces to analyze the distribution of the test substance over time within the plant. The test substance did typically distribute over 5 meters within the stem over 24 hours.

Furthermore conventional active ingredients may be applied, e.g. the commercial products Maag Perfekthion® and Maag Kendo® for box tree.

Maag Perfekthion® (40% Dimethoate Stock solution), depending on the size of the box tree, a 10 ml to 100 ml injection with a 0.1% to 0.3% dilution can be used.

Various Notes and Aspects

Aspect 1 can include subject matter such as A plant injection system comprising: an injection tool configured to penetrate a plant and distribute a liquid formulation to the plant, the injection tool includes: a base having an inlet port; a penetrating distribution body extending along a longitudinal body axis and having a body profile, the penetrating distribution body includes: a penetrating element; at least one distribution reservoir within the body profile; and one or more distribution ports in communication with the inlet port and the at least one distribution reservoir, the one or more distribution ports are spaced from the penetrating element; and wherein the injection tool includes penetrating and distribution configurations: in the penetrating configuration the penetrating element is configured to penetrate the plant along the longitudinal body axis; and in the distribution configuration the one or more distribution ports are configured to distribute the liquid formulation transversely relative to the longitudinal body axis within the at least one distribution reservoir proximate to the plant.

Aspect 2 can include, or can optionally be combined with the subject matter of Aspect 1, to optionally include wherein the one or more distribution ports are laterally spaced from the longitudinal body axis.

Aspect 3 can include, or can optionally be combined with the subject matter of one or any combination of Aspects 1 or 2 to optionally include wherein the penetration element includes a penetration profile, and the one or more distribution ports are within the penetration profile and proximal relative to the penetration profile.

Aspect 4 can include, or can optionally be combined with the subject matter of one or any combination of Aspects 1-3 to optionally include wherein the one or more distribution ports are recessed within the penetration profile.

Aspect 5 can include, or can optionally be combined with the subject matter of one or any combination of Aspects 1-4 to optionally include wherein in the penetrating configuration the penetrating element interrupts engagement of the one or more distribution ports with the plant.

Aspect 6 can include, or can optionally be combined with the subject matter of Aspects 1-5 to optionally include wherein the one or more distribution ports are recessed from an exterior of the body profile.

Aspect 7 can include, or can optionally be combined with the subject matter of Aspects 1-6 to optionally include wherein in the distribution configuration the one or more distribution ports are configured to distribute the liquid formulation toward the exterior of the body profile.

Aspect 8 can include, or can optionally be combined with the subject matter of Aspects 1-7 to optionally include wherein in the distribution configuration the one or more distribution ports are configured to distribute the liquid formulation remotely relative to the penetrating element.

Aspect 9 can include, or can optionally be combined with the subject matter of Aspects 1-8 to optionally include wherein in the distribution configuration the one or more distribution ports are configured to distribute the liquid formulation at a proximal location along the penetrating distribution body relative to the penetrating element.

Aspect 10 can include, or can optionally be combined with the subject matter of Aspects 1-9 to optionally include wherein in the distribution configuration the penetrating distribution body having the at least one distribution reservoir is configured to retain the liquid formulation along a plant tissue of the plant.

Aspect 11 can include, or can optionally be combined with the subject matter of Aspects 1-10 to optionally include a retained configuration wherein the penetrating distribution body is retained in an ongoing state in the plant with an anchor element.

Aspect 12 can include, or can optionally be combined with the subject matter of Aspects 1-11 to optionally include wherein in the distribution configuration the one or more distribution ports are configured to distribute the liquid formulation to the plant in an ongoing state.

Aspect 13 can include, or can optionally be combined with the subject matter of Aspects 1-12 to optionally include wherein the ongoing state includes a plurality of distributions of the liquid formulation from the one or more distribution ports over one or more hours.

Aspect 14 can include, or can optionally be combined with the subject matter of Aspects 1-13 to optionally include wherein the plurality of distributions includes a continuous distribution of the liquid formulation.

Aspect 15 can include, or can optionally be combined with the subject matter of Aspects 1-14 to optionally include wherein the penetrating element includes one or more of a cutting element, a wedge profile or a spike profile.

Aspect 16 can include, or can optionally be combined with the subject matter of Aspects 1-15 to optionally include a method for distribution of a liquid formulation to a plant, the method comprising: penetrating a plant with an injection tool having a penetrating distribution body extending along a longitudinal body axis, penetrating includes: piercing the plant with a penetrating element of the penetrating distribution body; isolating one or more distribution ports from the plant with the penetrating distribution body; and distributing the liquid formulation to the penetrated plant, distributing the liquid formulation includes: transmitting the liquid formulation from an inlet port of the injection tool to the one or more distribution ports; delivering the liquid formulation from the one or more distribution ports to at least one distribution reservoir in communication with the penetrated plant, the at least one distribution reservoir within a body profile of the penetrating distribution body.

Aspect 17 can include, or can optionally be combined with the subject matter of Aspects 1-16 to optionally include wherein isolating the one or more distribution ports from the plant includes isolating the one or more distribution ports from the plant with a penetration profile of the penetration element.

Aspect 18 can include, or can optionally be combined with the subject matter of Aspects 1-17 to optionally include wherein the one or more distribution ports are within the body profile of the penetrating distribution body; and isolating the one or more distribution ports from the plant includes isolating the one or more distribution ports with the body profile.

Aspect 19 can include, or can optionally be combined with the subject matter of Aspects 1-18 to optionally include wherein the one or more distribution ports are within a body profile of the penetrating distribution body; and penetrating the plant with the injection tool includes interrupting the engagement of the one or more distribution ports with the plant.

Aspect 20 can include, or can optionally be combined with the subject matter of Aspects 1-19 to optionally include wherein the penetrating element includes a cutting element; and piercing the plant with the penetrating element includes cutting the plant with the cutting element.

Aspect 21 can include, or can optionally be combined with the subject matter of Aspects 1-20 to optionally include wherein the penetrating element includes a wedge profile; and piercing the plant with the penetrating element includes cutting the plant with the wedge profile.

Aspect 22 can include, or can optionally be combined with the subject matter of Aspects 1-21 to optionally include wherein the penetrating distribution body includes a body profile, and the one or more distribution ports are recessed from the body profile; and delivering the liquid formulation from the one or more distribution ports includes transversely delivering the liquid formulation relative to a longitudinal body axis of the penetrating distribution body.

Aspect 23 can include, or can optionally be combined with the subject matter of Aspects 1-22 to optionally include retaining the liquid formulation along a plant tissue of the plant.

Aspect 24 can include, or can optionally be combined with the subject matter of Aspects 1-23 to optionally include wherein the one or more distribution ports are remote from the penetrating element; and delivering the liquid formulation from the one or more distribution ports includes delivering the liquid formulation remotely relative to the penetration element.

Aspect 25 can include, or can optionally be combined with the subject matter of Aspects 1-24 to optionally include wherein delivering the liquid formulation remotely includes delivery the liquid formulation at a proximal location along the penetrating distribution body relative to the penetrating element.

Aspect 26 can include, or can optionally be combined with the subject matter of Aspects 1-25 to optionally include retaining the penetrating distribution body in the plant with an anchor element.

Aspect 27 can include, or can optionally be combined with the subject matter of Aspects 1-26 to optionally include wherein delivering the liquid formulation from the one or more distribution ports includes ongoing delivery of the liquid formulation.

Aspect 28 can include, or can optionally be combined with the subject matter of Aspects 1-27 to optionally include wherein ongoing delivery of the liquid formulation includes ongoing delivery of the liquid formulation over one or more hours.

Aspect 29 can include, or can optionally be combined with the subject matter of Aspects 1-28 to optionally include wherein ongoing delivery of the liquid formulation includes a plurality of distributions.

Aspect 30 can include, or can optionally be combined with the subject matter of Aspects 1-29 to optionally include wherein delivering the liquid formulation includes passive delivering of the liquid formulation.

Aspect 31 can include, or can optionally be combined with the subject matter of Aspects 1-30 to optionally include wherein passive delivering of the liquid formulation includes delivering of the liquid formulation based on a hydrostatic pressure of the liquid formulation.

Aspect 32 can include, or can optionally be combined with the subject matter of Aspects 1-31 to optionally include a plant injection system comprising: an injection tool configured to penetrate a plant and distribute a liquid formulation to the plant, the injection tool includes: a base having an inlet port; a penetrating distribution body extending along a longitudinal body axis, the penetrating distribution body includes: a penetrating element; and one or more distribution ports in communication with the inlet port, the one or more distribution ports are spaced from the penetrating element; and wherein the injection tool includes penetrating and distribution configurations: in the penetrating configuration the penetrating element is configured to penetrate the plant along the longitudinal body axis; and in the distribution configuration the one or more distribution ports are configured to distribute the liquid formulation to the plant transversely relative to the longitudinal body axis.

Aspect 33 can include, or can optionally be combined with the subject matter of Aspects 1-32 to optionally include wherein the one or more distribution ports are laterally spaced from the longitudinal body axis.

Aspect 34 can include, or can optionally be combined with the subject matter of Aspects 1-33 to optionally include wherein the penetration element includes a penetration profile, and the one or more distribution ports are within the penetration profile and proximal relative to the penetration profile.

Aspect 35 can include, or can optionally be combined with the subject matter of Aspects 1-34 to optionally include wherein the one or more distribution ports are recessed within the penetration profile.

Aspect 36 can include, or can optionally be combined with the subject matter of Aspects 1-35 to optionally include wherein in the penetrating configuration the penetrating element interrupts engagement of the one or more distribution ports with the plant.

Aspect 37 can include, or can optionally be combined with the subject matter of Aspects 1-36 to optionally include wherein the penetrating distribution body includes a body profile, and the one or more distribution ports are recessed from an exterior of the body profile.

Aspect 38 can include, or can optionally be combined with the subject matter of Aspects 1-37 to optionally include wherein in the distribution configuration the one or more distribution ports are configured to distribute the liquid formulation toward the exterior of the body profile. Aspect 39 can include, or can optionally be combined with the subject matter of Aspects 1-38 to optionally include wherein in the distribution configuration the one or more distribution ports are configured to distribute the liquid formulation remotely relative to the penetrating element.

Aspect 40 can include, or can optionally be combined with the subject matter of Aspects 1-39 to optionally include wherein in the distribution configuration the one or more distribution ports are configured to distribute the liquid formulation at a proximal location along the penetrating distribution body relative to the penetrating element.

Aspect 41 can include, or can optionally be combined with the subject matter of Aspects 1-40 to optionally include wherein the penetrating distribution includes a body profile and at least one distribution reservoir within the body profile; and in the distribution configuration the one or more distribution ports are configured to distribute the liquid formulation into the least one distribution reservoir.

Aspect 42 can include, or can optionally be combined with the subject matter of Aspects 1-41 to optionally include wherein in the distribution configuration the penetrating distribution body having the at least one distribution reservoir is configured to retain the liquid formulation along a plant tissue of the plant.

Aspect 43 can include, or can optionally be combined with the subject matter of Aspects 1-42 to optionally include a retained configuration wherein the penetrating distribution body is retained in an ongoing state in the plant with an anchor element.

Aspect 44 can include, or can optionally be combined with the subject matter of Aspects 1-43 to optionally include wherein in the distribution configuration the one or more distribution ports are configured to distribute the liquid formulation to the plant in an ongoing state.

Aspect 45 can include, or can optionally be combined with the subject matter of Aspects 1-44 to optionally include wherein the ongoing state includes a plurality of distributions of the liquid formulation from the one or more distribution ports over one or more hours.

Aspect 46 can include, or can optionally be combined with the subject matter of Aspects 1-45 to optionally include wherein the plurality of distributions includes a continuous distribution of the liquid formulation.

Aspect 47 can include, or can optionally be combined with the subject matter of Aspects 1-46 to optionally include wherein the penetrating element includes one or more of a cutting element, a wedge profile or a spike profile.

Aspect 48 can include, or can optionally be combined with the subject matter of Aspects 1-47 to optionally include a plant injection system comprising: an injection tool configured to penetrate a plant and distribute a liquid formulation to the plant, the injection tool includes: a base having an inlet port configured to receive the liquid formulation; a penetrating distribution body extending from the base along a longitudinal body axis, the penetrating distribution body having a body profile, the penetrating distribution body includes: a penetrating element proximate a distal portion of the penetrating distribution body; a distribution element along the penetrating distribution body, the distribution element includes one or more distribution ports; and wherein the one or more distribution ports open laterally along the penetrating distribution body relative to the longitudinal body axis.

Aspect 49 can include, or can optionally be combined with the subject matter of Aspects 1-48 to optionally include wherein the body profile includes a shaft profile having one or more cutting elements along the penetrating element.

Aspect 50 can include, or can optionally be combined with the subject matter of Aspects 1-49 to optionally include wherein the body profile includes a wedge profile tapering toward the distal portion.

Aspect 51 can include, or can optionally be combined with the subject matter of Aspects 1-50 to optionally include wherein the penetrating distribution body includes an anchor element configured to retain the injection tool within a penetrated plant.

Aspect 52 can include, or can optionally be combined with the subject matter of Aspects 1-51 to optionally include wherein the anchor element includes one or more of threading, flutes, cleats, or a wedge profile.

Aspect 53 can include, or can optionally be combined with the subject matter of Aspects 1-52 to optionally include wherein the penetrating distribution body includes an inlet passage extending from the inlet port to the one or more distribution ports.

Aspect 54 can include, or can optionally be combined with the subject matter of Aspects 1-53 to optionally include wherein the one or more distribution ports are recessed from an exterior of the body profile.

Aspect 55 can include, or can optionally be combined with the subject matter of Aspects 1-54 to optionally include wherein the one or more distribution ports include a plurality of distribution ports.

Aspect 56 can include, or can optionally be combined with the subject matter of Aspects 1-55 to optionally include wherein the one or more distribution ports extend away from the longitudinal body axis.

Aspect 57 can include, or can optionally be combined with the subject matter of Aspects 1-56 to optionally include wherein the one or more distribution ports extend toward the base and extend away from the distal portion of the penetrating distribution body.

Aspect 58 can include, or can optionally be combined with the subject matter of Aspects 1-57 to optionally include wherein the injection tool includes a distribution configuration having the one or more distribution ports configured to distribute the liquid formulation to the plant transversely relative to the longitudinal body axis.

Aspect 59 can include, or can optionally be combined with the subject matter of Aspects 1-58 to optionally include wherein the body profile includes at least one distribution reservoir, and the one or more distribution ports open into the at least one distribution reservoir.

Aspect 60 can include, or can optionally be combined with the subject matter of Aspects 1-59 to optionally include wherein the at least one distribution reservoir is spaced from a leading edge of the penetrating element.

Aspect 61 can include, or can optionally be combined with the subject matter of Aspects 1-60 to optionally include wherein the at least one distribution reservoir is recessed from an exterior of the body profile.

Aspect 62 can include, or can optionally be combined with the subject matter of Aspects 1-61 to optionally include a delivery device in communication with the injection tool, the delivery device includes: a container configured to store the liquid formulation; and an attachment interface in communication with the container, the attachment interface is configured for coupling with the inlet port of the injection tool.

Aspect 63 can include, or can optionally be combined with the subject matter of Aspects 1-62 to optionally include wherein the delivery device includes a dosing device interposed between the container and the attachment interface, the dosing device is configured to deliver a specified quantity of the liquid formulation to the injection tool for lateral distribution from the one or more distribution ports.

Aspect 64 can include, or can optionally be combined with the subject matter of Aspects 1-63 to optionally include a plant injection system comprising: an injection tool configured to penetrate a plant and distribute a liquid formulation to the plant, the injection tool includes: a base having an inlet port configured to receive the liquid formulation; a penetrating distribution body extending from the base along a longitudinal body axis, the penetrating distribution body having a body profile, the penetrating distribution body includes: a penetrating element proximate a distal portion of the penetrating distribution body; an anchor element along the penetrating distribution body, the anchor element is configured to retain the injection tool within the penetrated plant; a distribution element along the penetrating distribution body, the distribution element includes one or more distribution ports; and wherein the one or more distribution ports are in communication with the inlet port, and the one or more distribution ports are laterally spaced from the longitudinal body axis.

Aspect 65 can include, or can optionally be combined with the subject matter of Aspects 1-64 to optionally include wherein the body profile includes a shaft profile, and the penetrating element includes one or more cutting elements.

Aspect 66 can include, or can optionally be combined with the subject matter of Aspects 1-65 to optionally include wherein the body profile includes a wedge profile tapering toward the distal portion.

Aspect 67 can include, or can optionally be combined with the subject matter of Aspects 1-66 to optionally include wherein the anchor element includes one or more of threading, flutes, cleats or a wedge profile.

Aspect 68 can include, or can optionally be combined with the subject matter of Aspects 1-67 to optionally include wherein the penetrating distribution body includes an inlet passage extending from the inlet port to the one or more distribution ports.

Aspect 69 can include, or can optionally be combined with the subject matter of Aspects 1-68 to optionally include wherein the one or more distribution ports are recessed from an exterior of the body profile.

Aspect 70 can include, or can optionally be combined with the subject matter of Aspects 1-69 to optionally include wherein the one or more distribution ports are remotely located relative to the penetrating element.

Aspect 71 can include, or can optionally be combined with the subject matter of Aspects 1-70 to optionally include wherein the one or more distribution ports extend away from the longitudinal body axis.

Aspect 72 can include, or can optionally be combined with the subject matter of Aspects 1-71 to optionally include wherein the one or more distribution ports extend toward the base and extend away from the distal portion of the penetrating distribution body.

Aspect 73 can include, or can optionally be combined with the subject matter of Aspects 1-72 to optionally include wherein the injection tool includes a distribution configuration having the one or more distribution ports configured to distribute the liquid formulation to the plant transversely relative to the longitudinal body axis.

Aspect 74 can include, or can optionally be combined with the subject matter of Aspects 1-73 to optionally include wherein the body profile includes at least one distribution reservoir, and the one or more distribution ports open into the at least one distribution reservoir.

Aspect 75 can include, or can optionally be combined with the subject matter of Aspects 1-74 to optionally include wherein the penetrating distribution body surrounds the at least one distribution reservoir.

Aspect 76 can include, or can optionally be combined with the subject matter of Aspects 1-75 to optionally include wherein the penetrating distribution body includes one or more scalloped surfaces, and the at least one distribution reservoir extends along the one or more scalloped surfaces.

Aspect 77 can include, or can optionally be combined with the subject matter of Aspects 1-76 to optionally include wherein the penetrating distribution body includes one or more cavities, and the at least one distribution reservoir is within the one or more cavities.

Aspect 78 can include, or can optionally be combined with the subject matter of Aspects 1-77 to optionally include wherein the at least one distribution reservoir is spaced from a leading edge of the penetrating element.

Aspect 79 can include, or can optionally be combined with the subject matter of Aspects 1-78 to optionally include wherein the at least one distribution reservoir is recessed from an exterior of the body profile.

Aspect 80 can include, or can optionally be combined with the subject matter of Aspects 1-79 to optionally include a method for distribution of a liquid formulation to a plant, the method comprising: penetrating a plant with an injection tool having a penetrating distribution body extending along a longitudinal body axis, penetrating includes: piercing the plant with a penetrating element of the penetrating distribution body, wherein the penetrating element is moved along the longitudinal body axis; distributing the liquid formulation to the penetrated plant, distributing the liquid formulation includes: transmitting the liquid formulation from an inlet port of the injection tool to one or more distribution ports of the penetrating distribution body; delivering the liquid formulation from the one or more distribution ports transversely relative to the longitudinal body axis.

Aspect 81 can include, or can optionally be combined with the subject matter of Aspects 1-80 to optionally include wherein penetrating the plant with the injection tool includes isolating the one or more distribution ports from the plant with a penetration profile of the penetration element.

Aspect 82 can include, or can optionally be combined with the subject matter of Aspects 1-81 to optionally include wherein the one or more distribution ports are within a body profile of the penetrating distribution body; and penetrating the plant with the injection tool includes isolating the one or more distribution ports from the plant with the body profile.

Aspect 83 can include, or can optionally be combined with the subject matter of Aspects 1-82 to optionally include wherein the one or more distribution ports are within a body profile of the penetrating distribution body; and penetrating the plant with the injection tool includes interrupting the engagement of the one or more distribution ports with the plant.

Aspect 84 can include, or can optionally be combined with the subject matter of Aspects 1-83 to optionally include wherein the penetrating element includes a cutting element; and piercing the plant with the penetrating element includes cutting the plant with the cutting element.

Aspect 85 can include, or can optionally be combined with the subject matter of Aspects 1-84 to optionally include wherein the penetrating element includes a wedge profile; and piercing the plant with the penetrating element includes cutting the plant with the wedge profile.

Aspect 86 can include, or can optionally be combined with the subject matter of Aspects 1-85 to optionally include wherein the penetrating distribution body includes a body profile, and the one or more distribution ports are recessed from the body profile; and delivering the liquid formulation from the one or more distribution ports transversely includes delivering the liquid formulation into the body profile.

Aspect 87 can include, or can optionally be combined with the subject matter of Aspects 1-86 to optionally include wherein the penetrating distribution body includes at least one distribution reservoir; and delivering the liquid formulation from the one or more distribution ports transversely includes delivering the liquid formulation into the at least one distribution reservoir.

Aspect 88 can include, or can optionally be combined with the subject matter of Aspects 1-87 to optionally include retaining the liquid formulation along a plant tissue of the plant.

Aspect 89 can include, or can optionally be combined with the subject matter of Aspects 1-88 to optionally include wherein the one or more distribution ports are remote from the penetrating element; and delivering the liquid formulation from the one or more distribution ports includes delivering the liquid formulation remotely relative to the penetration element.

Aspect 90 can include, or can optionally be combined with the subject matter of Aspects 1-89 to optionally include wherein delivering the liquid formulation remotely includes delivery the liquid formulation at a proximal location along the penetrating distribution body relative to the penetrating element.

Aspect 91 can include, or can optionally be combined with the subject matter of Aspects 1-90 to optionally include retaining the penetrating distribution body in the plant with an anchor element.

Aspect 92 can include, or can optionally be combined with the subject matter of Aspects 1-91 to optionally include delivering the liquid formulation from the one or more distribution ports includes ongoing delivery of the liquid formulation.

Aspect 93 can include, or can optionally be combined with the subject matter of Aspects 1-92 to optionally include wherein ongoing delivery of the liquid formulation includes ongoing delivery of the liquid formulation over one or more hours.

Aspect 94 can include, or can optionally be combined with the subject matter of Aspects 1-93 to optionally include wherein ongoing delivery of the liquid formulation includes a plurality of distributions.

Aspect 95 can include, or can optionally be combined with the subject matter of Aspects 1-94 to optionally include wherein delivering the liquid formulation includes passive delivering of the liquid formulation.

Aspect 96 can include, or can optionally be combined with the subject matter of Aspects 1-95 to optionally include wherein passive delivering of the liquid formulation includes delivering of the liquid formulation based on a hydrostatic pressure of the liquid formulation.

Aspect 97 can include, or can optionally be combined with the subject matter of Aspects 1-96 to optionally include a plant injection system comprising: an injection tool configured to penetrate a plant and distribute a liquid formulation to the plant, the injection tool includes: a base having an inlet port; a penetrating distribution body extending from the base along a longitudinal body axis, the penetrating distribution body having a body profile, the penetrating distribution body includes: a penetrating element proximate a distal portion of the penetrating distribution body; a distribution element along the penetrating distribution body, the distribution element includes one or more distribution ports directed laterally relative to the longitudinal body axis, the one or more distribution ports in communication with the inlet port; and a delivery device in communication with the injection tool, the delivery device includes: a container configured to store the liquid formulation; and an attachment interface in communication with the container, the attachment interface is configured for coupling with the inlet port.

Aspect 98 can include, or can optionally be combined with the subject matter of Aspects 1-97 to optionally include wherein the delivery device includes a dosing device interposed between the container and the attachment interface, the dosing device is configured to deliver a specified quantity of the liquid formulation to the injection tool for lateral distribution from the one or more distribution ports.

Aspect 99 can include, or can optionally be combined with the subject matter of Aspects 1-98 to optionally include wherein the one or more distribution ports are recessed from an exterior surface of the body profile.

Aspect 100 can include, or can optionally be combined with the subject matter of Aspects 1-99 to optionally include wherein the body profile includes at least one distribution reservoir, and the one or more distribution ports open into the at least one distribution reservoir.

Aspect 101 can include, or can optionally be combined with the subject matter of Aspects 1-100 to optionally include wherein the at least one distribution reservoir is spaced from a leading edge of the penetrating element.

Aspect 102 can include, or can optionally be combined with the subject matter of Aspects 1-101 to optionally include wherein the at least one distribution reservoir is recessed from an exterior surface of the body profile.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

This description and the accompanying drawings that illustrate aspects and embodiments of the present disclosure should not be taken as limitingthe claims defining the protected disclosure. In other words, while the disclosure has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the disclosure. Thus, it will be understood that changes and modifications may be made by those of ordinary skill within the scope and spirit of the following claims. In particular, the present disclosure covers further embodiments with any combination of features from different embodiments described above and below.

The disclosure also covers all further features shown in the Figures individually although they may not have been described in the afore or following description. Also, single alternatives of the embodiments described in the figures and the description and single alternatives of features thereof can be disclaimed from the subject matter of the disclosure or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope of the claims.

What is claimed is:

1. An injection tool comprising:
a base having a first width in a first plane and a second width in a second plane, the first plane and the second plane both oriented to include a longitudinal axis of the injection tool, the base comprising:
an inlet port; and
a main channel that runs longitudinally through the center of the base; and
a penetrating distribution body comprising a distal end away from the base and a proximal end near the base, the penetrating distribution body having a third width in the first plane greater than the first width and a fourth width in the second plane less than the second width, wherein the penetrating distribution body comprises:
a cutting edge at the distal end of the penetrating distribution body;
a penetrating element that extends from the cutting edge to the proximal end of the penetrating distribution body, wherein the cutting edge and the penetrating element form a wedge type body profile extending along the longitudinal axis of the injection tool;
opposing faces that extend from the base and meet at the cutting edge; and
a distribution element that comprises:
one or more distribution ports; and
one or more distribution reservoirs, wherein each distribution reservoir defines a tapered shape from a first end of the distribution reservoir to a second, opposite end of the distribution reservoir in the first plane and wherein each distribution reservoir is an opening that extends through both opposing faces of the penetrating distribution body.

2. The injection tool of claim 1, wherein the one or more distribution ports are configured to receive a liquid formulation from the main channel and direct the liquid formulation into the one or more distribution reservoirs.

3. An injection tool comprising:
a base having a first width in a first plane and a second width in a second plane, the first plane and the second plane both oriented to include a longitudinal axis of the injection tool, the base comprising:
an inlet port; and
a main channel that runs longitudinally through the center of the base; and
a penetrating distribution body comprising a distal end away from the base and a proximal end near the base, the penetrating distribution body having a third width in the first plane greater than the first width and a fourth width in the second plane less than the second width, wherein the penetrating distribution body comprises:
a cutting edge at the distal end of the penetrating distribution body;
a penetrating element that extends from the cutting edge to the proximal end of the penetrating distribution body, wherein the cutting edge and the penetrating element form a wedge type body profile extending along the longitudinal axis of the injection tool;
opposing faces that extend from the base and meet at the cutting edge; and
a distribution element that comprises:
one or more distribution ports; and
one or more distribution reservoirs, wherein each distribution reservoir is an opening that extends through both opposing faces of the penetrating distribution body; and
wherein the one or more distribution ports are oriented at an angle between around 100 degrees to around 180 degrees relative to a penetrating movement direction.

4. The injection tool of claim 1, wherein the injection tool is configured to direct a liquid formulation from the inlet port to the main channel, from the main channel to the one or more distribution ports, and from the one or more distribution ports into the one or more distribution reservoirs.

5. The injection tool of claim 1, wherein the base comprises a ribbed outer structure.

6. The injection tool of claim 1, wherein a transition between the base and the penetrating distribution body forms an abutting face that extends away from the longitudinal axis of the injection tool.

7. A plant injection system comprising:
an injection tool of claim 1; and
a delivery device connected to the injection tool, wherein the delivery device comprises a container configured to store a liquid formulation.

8. The plant injection system of claim 7, further comprising: an attachment interface connected to the container, wherein the attachment interface is configured for coupling with the inlet port of the injection tool.

9. The plant injection system of claim 8, wherein the delivery device further comprises a dosing device interposed between the container and the attachment interface, wherein the dosing device is configured to deliver a specified quantity of the liquid formulation to the injection tool for lateral distribution from one or more distribution ports.

10. A method of distributing a liquid formulation to a plant, the method comprising:
penetrating the plant with an injection tool of claim 1; and
distributing the liquid formulation through the injection tool to the plant.

11. The method of claim 10, wherein penetrating the plant comprises:
piercing the plant with the cutting edge, wherein the penetrating element is moved along the longitudinal axis of the injection tool.

12. The method of claim 10, wherein distributing the liquid formulation to the plant comprises:
transmitting the liquid formulation from the inlet port of the injection tool to the one or more distribution ports of the penetrating distribution body; and
delivering the liquid formulation from the one or more distribution ports transversely relative to the longitudinal axis of the injection tool into the one or more distribution reservoirs.

13. The method of claim 10, further comprising: retaining the liquid formulation along a plant tissue of the plant.

14. The method of claim 10, wherein the liquid formulation is distributed over one or more hours.

15. The method of claim 10, wherein the liquid formulation is continuously distributed.

* * * * *